(12) United States Patent
Bhattad et al.

(10) Patent No.: US 10,674,509 B2
(45) Date of Patent: Jun. 2, 2020

(54) RESOURCE ALLOCATION FOR NARROWBAND COMMUNICATIONS USING AN EXPANDED BANDWIDTH

(71) Applicant: QUALCOMM Incorporated, San Diego, CA (US)

(72) Inventors: Kapil Bhattad, Bangalore (IN); Gowrisankar Somichetty, Bangalore (IN); Shashidhar Vummintala, Bangalore (IN); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 15/718,314

(22) Filed: Sep. 28, 2017

(65) Prior Publication Data
US 2018/0220422 A1 Aug. 2, 2018

(30) Foreign Application Priority Data
Jan. 27, 2017 (IN) .............................. 201741003034

(51) Int. Cl.
*H04W 72/04* (2009.01)
*H04L 5/00* (2006.01)
*H04W 88/08* (2009.01)

(52) U.S. Cl.
CPC ....... *H04W 72/0453* (2013.01); *H04L 5/0094* (2013.01); *H04L 5/0007* (2013.01); *H04L 5/0044* (2013.01); *H04L 5/0053* (2013.01); *H04W 72/042* (2013.01); *H04W 88/08* (2013.01)

(58) Field of Classification Search
CPC ........... H04W 72/0453; H04W 72/042; H04W 88/08; H04L 5/0094; H04L 5/0007; H04L 5/0053; H04L 5/0044
See application file for complete search history.

(56) References Cited

U.S. PATENT DOCUMENTS

| 2012/0021753 A1 | 1/2012 | Damnjanovic et al. |
| 2012/0087331 A1 | 4/2012 | Seo et al. |
| 2015/0009939 A1 | 1/2015 | Zhang et al. |

(Continued)

FOREIGN PATENT DOCUMENTS

| WO | 2017058096 A2 | 4/2017 |
| WO | 2017086868 A1 | 5/2017 |
| WO | 2017108111 A1 | 6/2017 |

OTHER PUBLICATIONS

Huawei, HiSilicon; 3GPP TSG RAN WG1 Meeting #82bis, Malmo, Sweden, Oct. 5-9, 2015, R1-155125 (Year: 2015).*

(Continued)

*Primary Examiner* — Shailendra Kumar
(74) *Attorney, Agent, or Firm* — Arent Fox, LLP and Qualcomm, Incorporated

(57) ABSTRACT

A method, a computer-readable medium, and an apparatus are provided. The apparatus may allocate one or more narrowbands for at least one downlink transmission to a UE. The apparatus may transmit information associated with the one or more narrowbands and a RIV to the UE. In one aspect, the RIV may indicate a common starting RB and a common set of RBs allocated for the at least one downlink transmission in each of the one or more narrowbands.

88 Claims, 25 Drawing Sheets

(56) References Cited

U.S. PATENT DOCUMENTS

| | | | |
|---|---|---|---|
| 2016/0183243 A1 | 6/2016 | Park et al. | |
| 2018/0069672 A1* | 3/2018 | Horiuchi | H04L 5/0048 |
| 2018/0248668 A1* | 8/2018 | Hwang | H04W 4/00 |
| 2019/0174285 A1* | 6/2019 | Hwang | H04W 72/0446 |

OTHER PUBLICATIONS

LG Electronics, Larger channel bandwidth for FeMTC, TSG RAN WG1 Meeting #86bis, Lisbon, Portugal, Oct. 10-14, 2016, R1-1609205 (Year: 2016).*

MCC Support, "Final Report of 3GPP TSG RAN WG1 #81 v1.0.0 (Fukuoka, Japan, May 25-29, 2015)", 3GPP TSG RAN WG1 Meeting #82, Beijing, China, Aug. 24-28, 2015, R1-153701. (Year: 2015).*

International Search Report and Written Opinion—PCT/US2018/013597—ISA/EPO—dated Aug. 6, 2018.

Huawei, et al., "On Initialization of Physical Downlink Control Channel for MTC," 3GPP Draft, R1-155125, 3rd Generation Partnership Project (3GPP), Mobile Competence Centre; 650, Route Des Lucioles; F-06921, Sophia-Antipolis Cedex; France, vol. RAN WG1, No. Malmo, Sweden; Oct. 5, 2015-Oct. 9, 2015, Oct. 4, 2015, 7 pages, XP051002109, Retrieved from the Internet: URL: http://www.3gpp.org/ftp/Meetings_3GPP_SYNC/RAN1/Docs/ [retrieved on Oct. 4, 2015].

LG Electronics: "Larger Channel Bandwidth for FeMTC," 3GPP Draft, R1-1609205, Larger Channel Bandwidth for FEMTC, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, 4 pages, XP051149251, Retrieved from the Internet: URL: http://www.3gpp.org/ftp/Meetings_3GPP_SYNC/RAN1/Docs/ [retrieved on Oct. 9, 2016].

Partial International Search Report—PCT/US2018/013597—ISA/EPO—dated Jun. 4, 2018.

\* cited by examiner

RESOURCE ALLOCATION FOR NARROWBAND COMMUNICATIONS USING AN EXPANDED BANDWIDTH

CROSS-REFERENCE TO RELATED APPLICATION

This application claims the benefit of Indian Application Serial No. 201741003034, entitled "RESOURCE ALLOCATION FOR NARROWBAND COMMUNICATIONS USING AN EXPANDED BANDWIDTH" and filed on Jan. 27, 2017, which is expressly incorporated by reference herein in its entirety.

BACKGROUND

Field

The present disclosure relates generally to communication systems, and more particularly, to resource allocation for narrowband communications enabled with an expanded bandwidth (e.g., 1.4 MHz, 3 MHz, 5 MHz, 10 MHz, 15 MHz, 20 MHz, etc.) as compared to conventional narrowband communications (e.g., 6 RB bandwidth).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Cellular technologies, such as LTE, play an important role in delivering reliable, secure, interoperable communications with ubiquitous coverage for narrowband devices such as smart gas meters, smart parking meters, smart water meters, etc. Narrowband wireless communication involves communicating with a limited frequency dimension. One example of narrowband wireless communication is narrowband (NB) IoT (NB-IoT) communication, which is limited to a single resource block (RB) of system bandwidth, e.g., 180 kHz. Another example of narrowband wireless communication is enhanced machine-type communication (eMTC), which is limited to six RBs of system bandwidth.

While NB-IoT communication and eMTC may reduce device complexity, enable multi-year battery life, and provide deeper coverage to reach challenging locations such as deep inside buildings, the limited bandwidth used in narrowband wireless communication may be unable to support certain types of services such as voice over LTE (VoLTE) and/or multicast messaging. There is a need to enable narrowband wireless communication that uses a larger channel bandwidth in order to support services such as VoLTE and/or multicast messaging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Cellular technologies, such as LTE, play an important role in delivering reliable, secure, interoperable communications with ubiquitous coverage for narrowband devices such as smart gas meters, smart parking meters, smart water meters, etc. Narrowband wireless communication involves communicating with a limited frequency dimension. One example of narrowband wireless communication is NB-IoT communication, which is limited to a single RB of system bandwidth, e.g., 180 kHz. Another example of narrowband wireless communication is eMTC, which is limited to six RBs of system bandwidth.

While NB-IoT communication and eMTC may reduce device complexity, enable multi-year battery life, and provide deeper coverage to reach challenging locations such as deep inside buildings, the limited bandwidth used in narrowband wireless communication may be unable to support certain types of services such as VoLTE and/or multicast messaging. There is a need to enable narrowband wireless communication that uses a larger channel bandwidth in order to support services such as VoLTE and/or multicast messaging.

The present disclosure provides a solution by allocating resources in one or more narrowbands that make up a larger bandwidth and/or repeating a transmission in the frequency domain. In one aspect, the narrowband channel bandwidth supported by the present disclosure may be a 5 MHz bandwidth for uplink (UL) and downlink (DL) communications (e.g., as compared to the 6 RB bandwidth supported by conventional narrowband communication systems). In another aspect, the narrowband channel bandwidth supported by the present disclosure may be a 20 MHz bandwidth for DL communications (e.g., as compared to the 6 RB bandwidth supported by conventional narrowband communication systems).

In an aspect of the disclosure, a method, a computer-readable medium, and an apparatus are provided. The apparatus may allocate RBs to a UE for use in transmitting a least one uplink communication to the base station. In one aspect, the RBs allocated to the UE being restricted to a 5 MHz bandwidth. In another aspect, a number of RBs allocated to the UE may be restricted to a multiple of $2^a \times 3^b \times 5^c$, where a, b, and c are each non-negative integers. The apparatus may also transmit information associated with the RBs to the UE. In an aspect, the information may indicate a starting RB and a number of RBs allocated to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
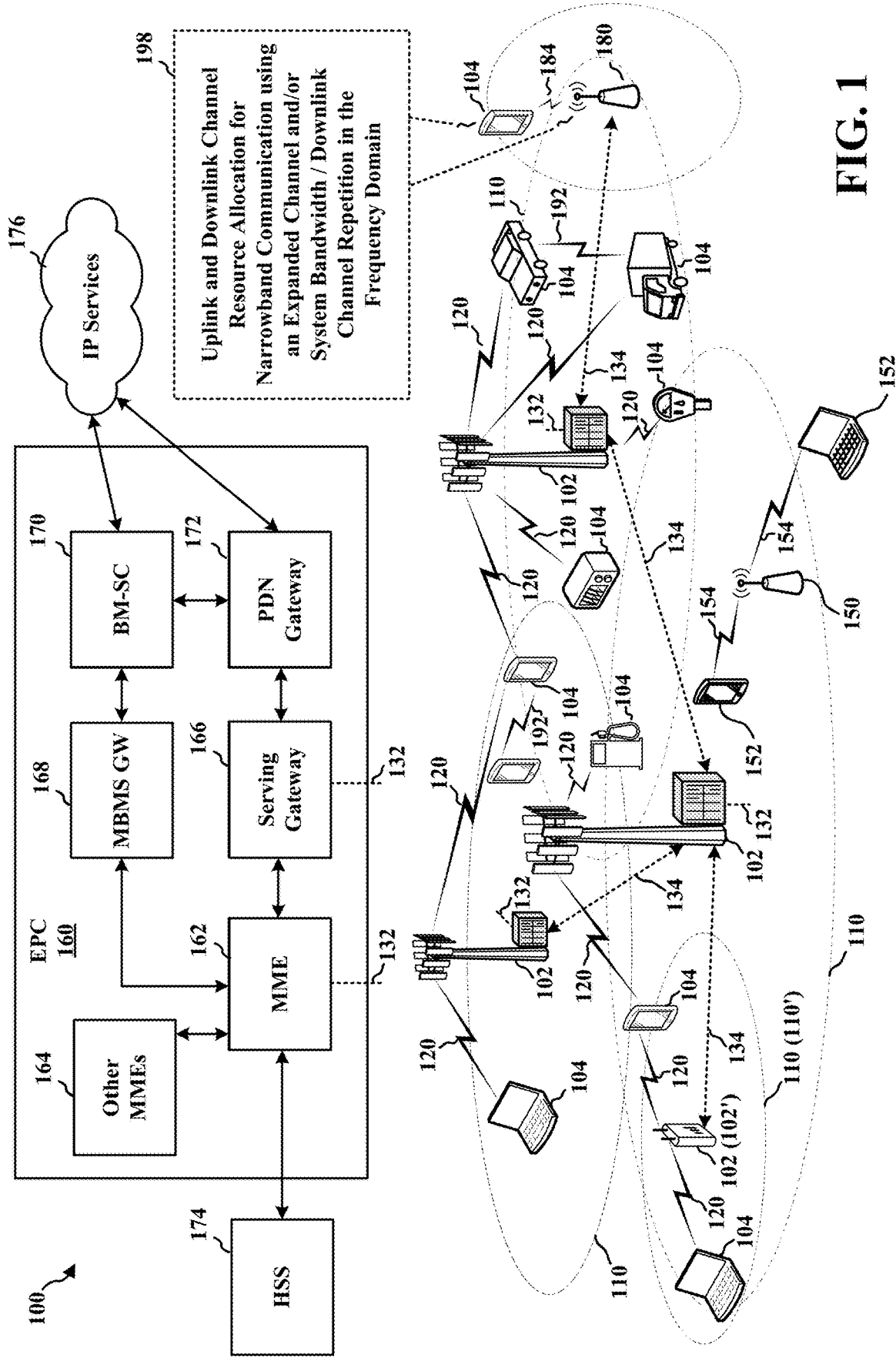
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be configured to support UL and DL channel resource allocation for narrowband communications using a 5 MHz and/or a 20 MHz bandwidth (198), e.g., as described below in connection with any of FIGS. 3-24. Additionally and/or alternatively, the base station 102 may be configured to repeat a DL channel transmission in the frequency domain, or in the frequency domain and in the time domain (198), e.g. as described below in connection with any of FIGS. 3-24.

Figure 2:
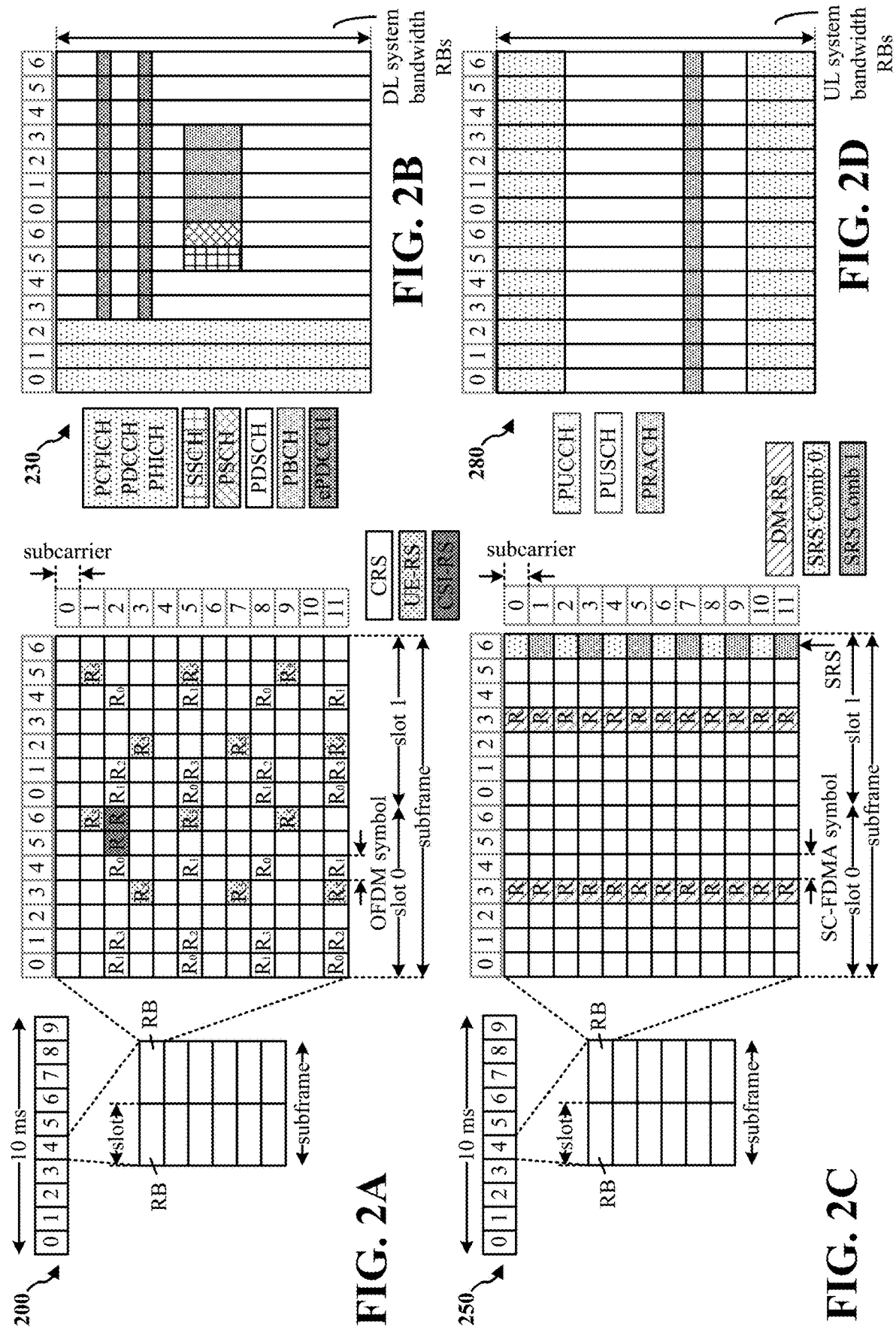
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
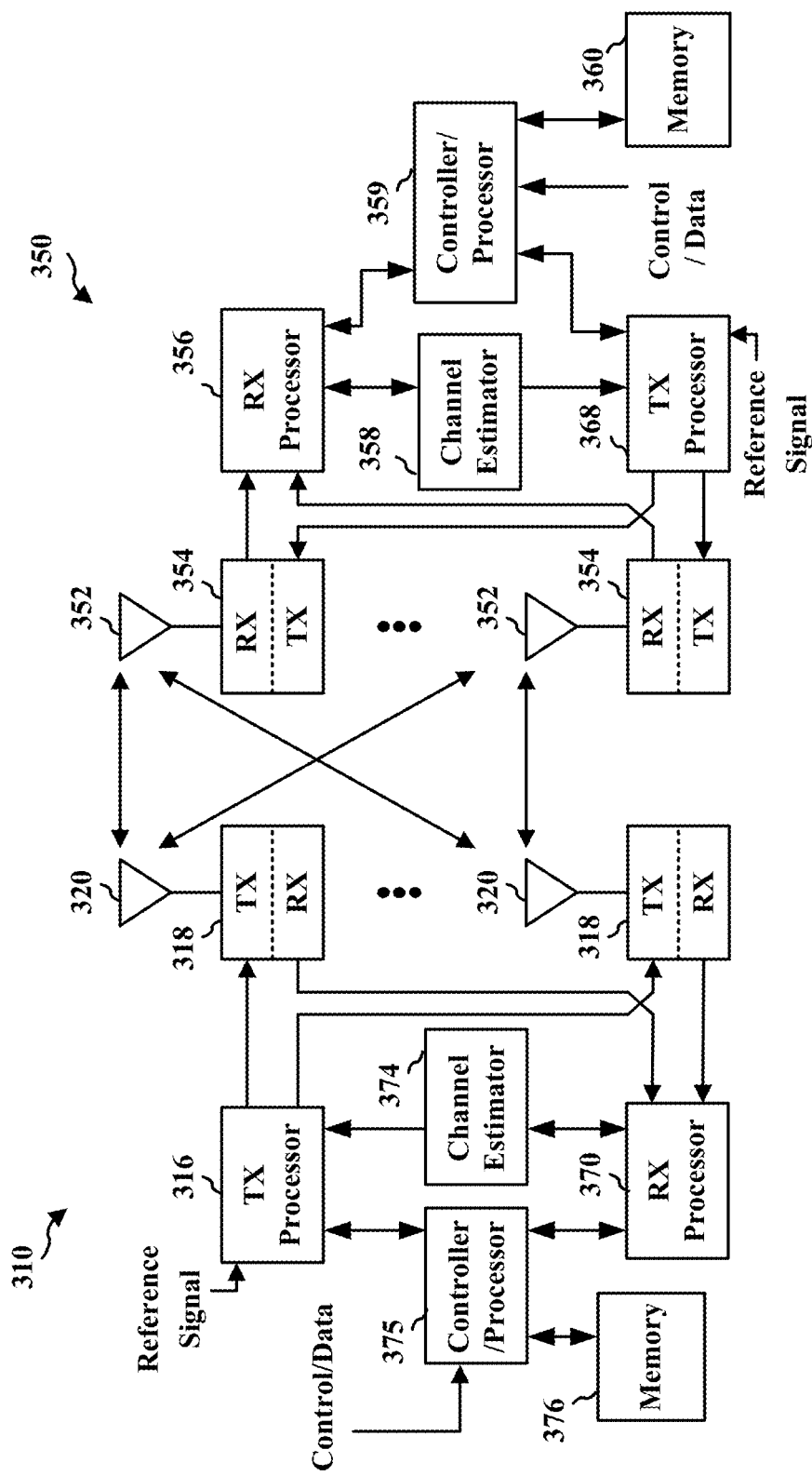
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Cellular technologies, such as LTE, play an important role in delivering reliable, secure, interoperable communications with ubiquitous coverage for narrowband devices such as smart gas meters, smart parking meters, smart water meters, etc. Narrowband wireless communication involves communicating with a limited frequency dimension. One example of narrowband wireless communication is NB-IoT communication, which is limited to a single RB of system bandwidth, e.g., 180 kHz. Another example of narrowband wireless communication is eMTC, which is limited to six RBs of system bandwidth.

While NB-IoT communication and eMTC may reduce device complexity, enable multi-year battery life, and provide deeper coverage to reach challenging locations such as deep inside buildings, the limited bandwidth used in narrowband wireless communication may be unable to support certain types of services such as VoLTE and/or multicast messaging. There is a need to enable narrowband wireless communication that uses a larger channel bandwidth in order to support services such as VoLTE and/or multicast messaging.

In aspects of the present disclosure resources may be allocated in one or more narrowbands that make up a larger bandwidth and/or repeating a transmission in the frequency domain. In one aspect, the channel bandwidth supported by the present disclosure may be a 5 MHz bandwidth for UL and DL communications (e.g., as compared to the 6 RB bandwidth supported by conventional narrowband communication systems). In another aspect, the channel bandwidth supported by the present disclosure may be a 20 MHz bandwidth for DL communications (e.g., as compared to the 6 RB bandwidth supported by conventional narrowband communication systems).

Figure 4A:
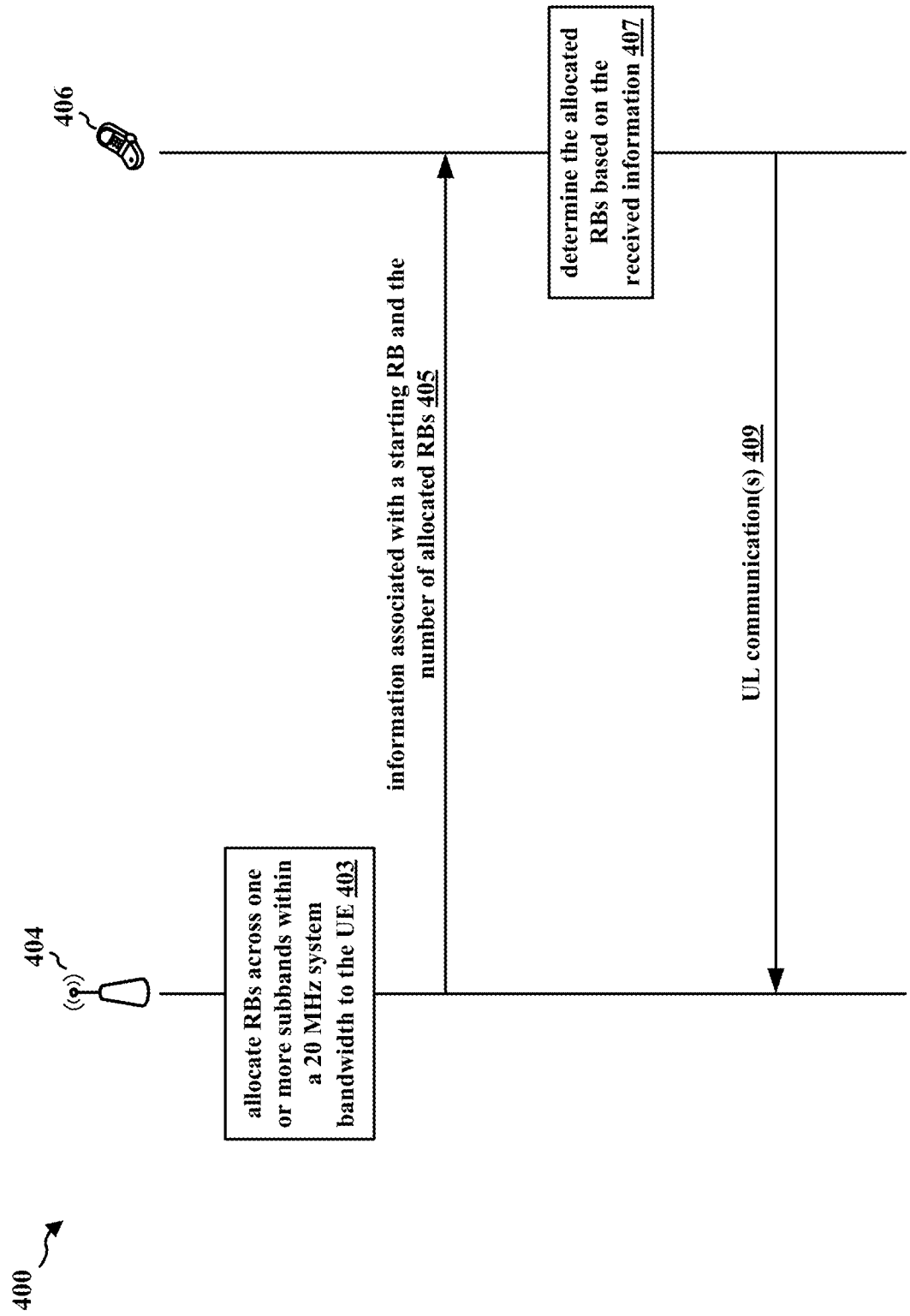
FIG. 4A illustrates a data flow that may be used for narrowband communications in accordance with certain aspects of the disclosure.

FIG. 4A illustrates a data flow 400 that may be used for narrowband communications that may enable base station 404 to allocate resources to UE 406 for UL narrowband communications when the channel bandwidth (e.g., 1.4 MHz, 3 MHz, 5 MHz, 10 MHz, 15 MHz, 20 MHz, etc.) is larger than the channel bandwidth of traditional narrowband communication systems (e.g., 6 RB or 200 Hz). By supporting a larger channel bandwidth for narrowband communications, services such as VoLTE and/or multicast messaging that were previously not supported for narrowband UEs (e.g., NB-IoT devices and/or eMTC devices) may be supported. Base station 404 may correspond to, e.g., base station 102, 180, 504, 604, 1150, 1750, 2350, eNB 310, the apparatus 802/802', 1402/1402', 2002/2002'. UE 406 may correspond to, e.g., UE 104, 350, 506, 606, 850, 1450, 2050, the apparatus 1102/1102', 1702/1702', 2302/2302'.

Figure 4B:
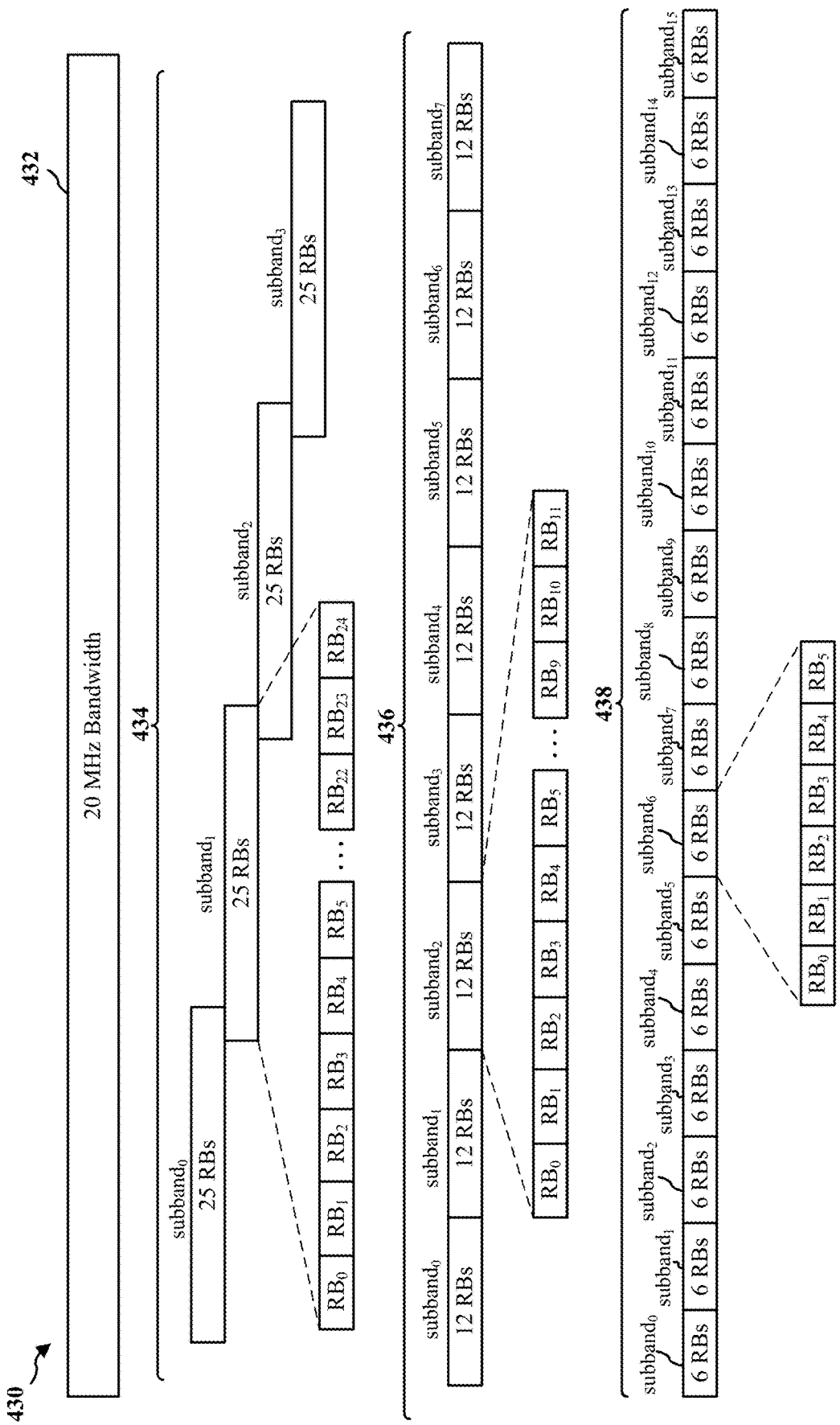
FIG. 4B is a diagram illustrating subbands configured for narrowband communications in accordance with certain aspects of the disclosure.

FIG. 4B is a diagram 430 illustrating various subbands within a 20 MHz system bandwidth 432 that may be selected by base station 404 for allocating RBs to UE 406 for UL communications. In a first aspect, the 20 MHz bandwidth 432 may include four 5 MHz subbands 434 that each include 25 RBs. In a second aspect, the 20 MHz bandwidth 432 may include eight 3 MHz subbands that each include 12 RBs. In a third aspect, the 20 MHz bandwidth 432 may include sixteen 1.4 MHz subbands that each include 6 RBs.

Referring to FIG. 4A, to enable narrowband communications that employ a larger system and/or channel bandwidth, the base station 404 may allocate RBs 403 across one or more subbands within a 20 MHz system bandwidth to the UE 406.

First Example

In a first example, base station 404 may restrict the starting RB and the number of RB allocated to the UE 406 to be within a 5 MHz bandwidth. Due to system requirements, the base station 404 may restrict the number of RBs allocated to the UE 406 to a multiple of $2^a \times 3^b \times 5^c$, where a, b, and c are each non-negative integers. When the base station 404 restricts the number of RBs allocated to the UE 406 to a multiple of $2^a \times 3^b \times 5^c$, there are sixteen possible allocation sizes (e.g., {1, 2, 3, 4, 5, 6, 8, 9, 12, 15, 16, 18, 20, 24, 25}) for a bandwidth of 5 MHz. Information 405 (e.g., signaling) associated with a starting RB and the number of allocated RBs may be transmitted by the base station 404 to the UE 406. UE 406 may use the information 405 received from the base station 404 to determine 407 the allocated RBs and then transmit one or more UL communications 409 to the base station 404 using the allocated RBs.

In one configuration, the UL channel bandwidth enabled at UE 406 may be less than or equal to 5 MHz. Assuming the allocation of RBs may start on any RB in the 5 MHz bandwidth (e.g. to provide full flexibility), base station 404 may use 9 bits to indicate the number of allocated RBs and the starting RB to UE 406 (e.g., 4 bits for the number of allocated RBs and 5 bits for the starting RB). Alternatively, base station 404 may jointly code the bits associated with the number of allocated RBs and the bits associated with the starting RB to reduce the number of bits from 9 to 8. In one aspect, the number of bits used in joint coding may be the same as that of communicating starting RB and the number RBs independently. When the system bandwidth is less than 5 MHz, legacy LTE resource indication value (RIV) mapping may be used to signal the allocation of RBs to the UE 406. An RIV may be a number that may be used to specify UL resource allocation to UE 406. Conventionally, a base station uses two values (i.e., a number of RBs and a starting RB) to indicate the resource allocation to a UE. However, with RIV, a base station may indicate the number of allocated RBs and the allocated starting RB in a single value.

In another configuration, the UL channel bandwidth enabled at the UE 406 may be greater than or equal to 5 MHz (e.g., 6 MHz, 10 MHz, 15 MHz, 20 MHz, etc.). Base station 404 may restrict the allocated RBs to be within a 5 MHz subband of the 20 MHz system bandwidth. Assuming that the allocation of RBs may start on any RB in the 20 MHz system bandwidth, base station 404 may use 11 bits to signal the allocation of RBs (e.g., 4 bits for the number of allocated RBs and 7 bits for the starting RB) to the UE 406. For example, the allocation of RBs may be signaled to the UE 406 using a starting RB given by ceil(log 2(NUM_RB_SYSTEM)) bits and number of allocated RBs using 4 bits that maps to one of the 16 valid number of RBs={1, 2, 3, 4, 5, 6, 8, 9, 12, 15, 16, 18, 20, 24, 25}).

Second Example

In a second example, base station 404 may allocate RBs 403 to the UE 406 by determining four 5 MHz subbands within a maximum system bandwidth of 20 MHz, and restrict the allocation of the RBs to be within one of the four 5 MHz subbands (e.g., $subband_0$, $subband_1$, $subband_2$, or $subband_3$). Each of the four 5 MHz subbands may include 25 RBs (e.g., $RB_0$-$RB_{24}$).

For example, $subband_0$ may occupy the frequency range 0 MHz to 5 MHz, $subband_1$ may occupy the frequency range 5 MHz to 10 MHz, $subband_2$ may occupy the frequency range 10 MHz to 15 MHz, and $subband_3$ may occupy the frequency range 15 MHz to 20 MHz. In one aspect, the allocation of RBs within one of $subband_0$, $subband_1$, $subband_2$, or $subband_3$ may be fully flexible in that the starting RB is not restricted to a particular RB and/or subband.

In the second example embodiment, the information 405 transmitted by the base station 404 may include a joint coding (e.g., 8 bits) of the number of RBs and starting RB, and indicate within which of the four 5 MHz subbands the starting RB and the number of RBs are allocated. An illustration of four 5 MHz subbands 434 within a 20 MHz system bandwidth 432 is depicted in FIG. 4B. In one aspect, the four 5 MHz subbands may be overlapping subbands (e.g., as shown in FIG. 4B) or non-overlapping subbands (not shown in FIG. 4B) within the 20 MHz bandwidth.

For example, assume that base station 404 allocates $RB_2$-$RB_{20}$ in $subband_0$ to UE 406. Then, the information 405 transmitted by the base station 404 may indicate that 19 RBs beginning with $RB_2$ in $suband_0$ are allocated to UE 406, and the UE 406 may use the information 405 to determine 407 that $RB_2$-$RB_{20}$ in $subband_0$ are allocated for UL communications. UE 406 may transmit one or more UL communications 409 to the base station 404 using $RB_2$-$RB_{20}$ in $subband_0$.

Third Example

In a third example, base station 404 may allocate the RBs 403 by restricting the allocation to a minimum number of subbands within sixteen 1.4 MHz subbands (e.g., $subband_0$-$suband_{15}$) that each include 6 RBs (e.g., $RB_0$-$RB_5$). An illustration of sixteen 1.4 MHz subbands 438 within a 20 MHz system bandwidth 432 is illustrated in FIG. 4B.

In a first aspect of the third example, the base station 404 may restrict the RBs allocated to UE 406 to a single subband within the sixteen subbands 438 when the number of allocated RBs is less than or equal to 6 RBs. For example, assume that base station 404 allocates 3 RBs in $subband_2$ to UE 406. In this example, the starting RB may not be greater than $RB_3$ in $subband_2$ so that the allocated RBs do not spill into a second subband (e.g., $subband_3$). In addition, assume that the allocated RBs start with $RB_1$ in $subband_2$. Therefore, $RB_1$-$RB_3$ in $subband_2$ are allocated to UE 406. Here, the information 405 transmitted by base station 404 may indicate that 3 RBs starting with $RB_1$ in $subband_2$ are allocated to UE 406, and the UE 406 may use the information 405 to determine 407 that $RB_1$-$RB_3$ in $subband_2$ are allocated for UL communications. UE 406 may transmit one or more UL communications 409 to the base station 404 using $RB_1$-$RB_3$ in $subband_2$.

In a second aspect of the third example, the base station 404 may restrict the RBs allocated to UE 406 to two consecutive subbands within the sixteen subbands 438 when the number of allocated RBs is between 7 RBs and 12 RBs. For example, assume that base station 404 allocates 8 RBs across $suband_7$ and $subband_8$ to UE 406. In this example, the starting RB may not be greater than $RB_4$ in $subband_7$ so that the allocated RBs do not spill into a third subband (e.g., $subband_9$). In addition, assume that the allocated RBs start with $RB_3$ in $subband_7$. Therefore, $RB_3$-$RB_5$ in $subband_7$ and $RB_0$-$RB_4$ in $subband_8$ are allocated to UE 406. Here, the information 405 transmitted by base station 404 may indicate that 8 RBs starting with $RB_3$ in $subband_7$ are allocated to UE 406, and the UE 406 may use the information 405 to determine 407 that $RB_3$-$RB_5$ in $subband_7$ and $RB_0$-$RB_4$ in $subband_8$ are allocated for UL communications. UE 406 may transmit one or more UL communications 409 to the base station 404 using $RB_3$-$RB_5$ in $subband_7$ and $RB_0$-$RB_4$ in $subband_8$.

In a third aspect of the third example, the base station 404 may restrict the RBs allocated to UE 406 to three consecutive subbands within the sixteen subbands 438 when the number of RBs is between 13 RBs and 18 RBs. For example, assume that base station 404 allocates 14 RBs across $subband_{10}$, $subband_{11}$, and $subband_{12}$ to UE 406. In this example, the starting RB may not be later than $RB_4$ in $subband_{10}$ so that the allocated RBs do not spill into a fourth subband (e.g., $subband_{13}$). In addition, assume that the allocated RBs start with $RB_0$ in $subband_{10}$. Therefore, $RB_0$-$RB_5$ in $subband_{10}$, $RB_0$-$RB_5$ in $subband_{11}$, and $RB_0$-$RB_1$ in $subband_{12}$ are allocated to UE 406. Here, the information 405 transmitted by the base station 404 may indicate that 14 RBs starting with $RB_0$ in $subband_{10}$ are allocated to UE 406, and the UE 406 may use the information 405 to determine 407 that $RB_0$-$RB_5$ in $subband_{10}$, $RB_0$-$RB_5$ in $subband_{11}$, and $RB_0$-$RB_1$ in $subband_{12}$ are allocated for UL communications. UE 406 may transmit one or more UL communications 409 to the base station 404 using $RB_0$-$RB_5$ in $subband_{10}$, $RB_0$-$RB_5$ in $subband_{11}$, and $RB_0$-$RB_1$ in $subband_{12}$.

In a fourth aspect of the third example, the base station 404 may restrict the RBs allocated to UE 406 to four consecutive subbands within the sixteen subbands 438 when the number of allocated RBs is between 19 RBs and 24 RBs. For example, assume that base station 404 allocates 22 RBs across $subband_3$, $subband_4$, $subband_5$, and $subband_6$ to UE 406. In this example, the starting RB may not be later than $RB_2$ in $subband_3$ so that the allocated RBs do not spill into a fifth subband (e.g., $subband_7$). In addition, assume that the allocated RBs start with $RB_1$ in $subband_3$. Therefore, $RB_1$-$RB_5$ in $subband_3$, $RB_0$-$RB_5$ in $subband_4$, $RB_0$-$RB_5$ in $subband_5$, and $RB_0$-$RB_4$ in $subband_6$ are allocated to UE 406. Here, the information 405 transmitted by the base station 404 may indicate that 22 RBs starting with $RB_1$ in $subband_3$ are allocated to UE 406, and the UE 406 may use the information 405 to determine 407 that $RB_1$-$RB_5$ in $subband_3$, $RB_0$-$RB_5$ in $subband_4$, $RB_0$-$RB_5$ in $subband_5$, and $RB_0$-$RB_4$ in $subband_6$ are allocated for UL communications. UE 406 may transmit one or more UL communications 409 to the base station 404 using $RB_1$-$RB_5$ in $subband_3$, $RB_0$-$RB_5$ in $subband_4$, $RB_0$-$RB_5$ in $subband_5$, and $RB_0$-$RB_4$ in $subband_6$.

In a fifth aspect of the third example, the base station 404 may restrict the RBs allocated to UE 406 to four consecutive subbands and a single spill over RB in a fifth subband when the number of RBs is 25 RBs. For example, assume that base station 404 allocates 25 RBs across $subband_7$, $subband_8$, $subband_9$, $subband_{10}$, and $subband_{11}$ to UE 406. In this example, the starting RB may not be later than $RB_0$ in $subband_7$ so that only one RB spills into $subband_{11}$. Therefore, $RB_0$-$RB_5$ in $subband_7$, $RB_0$-$RB_5$ in $subband_8$, $RB_0$-$RB_5$ in $subband_9$, $RB_0$-$RB_5$ in $subband_{10}$, and $RB_0$ in $subband_{11}$ are allocated to UE 406. Here, the information 405 transmitted by the base station 404 may indicate that 25 RBs starting with $RB_0$ in $subband_7$ are allocated to the UE 406, and the UE 406 may use the information 405 to determine 407 that $RB_0$-$RB_5$ in $subband_7$, $RB_0$-$RB_5$ in $subband_8$, $RB_0$-$RB_5$ in $subband_9$, $RB_0$-$RB_5$ in $subband_{10}$, and $RB_0$ in $subband_{11}$ are allocated for UL communications. UE 406 may transmit one or more UL communications 409 to the base station 404 using $RB_0$-$RB_5$ in $subband_7$, $RB_0$-$RB_5$ in $subband_8$, $RB_0$-$RB_5$ in $subband_9$, $RB_0$-$RB_5$ in $subband_{10}$, and $RB_0$ in $subband_{11}$.

Fourth Example

In a fourth example, base station 404 may allocate the RBs 403 by determining a plurality of subbands within a 20 MHz system bandwidth, and restrict the allocation of the RBs to two consecutive subbands in the plurality of subbands. In addition, a first subband of the two consecutive subbands may be restricted to a subband with an even numbered index. By restricting the allocated RBs to two consecutive subbands beginning with an even indexed subband, all of the allocated RBs may fit within the system bandwidth. In one configuration, the RBs allocated to UE 406 may be in two consecutive subbands selected from a group of eight 3 MHz subbands. An illustration of eight 3 MHz subbands 436 within a 20 MHz system bandwidth 432 is illustrated in FIG. 4B. In another configuration, the RBs allocated to UE 406 may be in two consecutive subbands selected from a group of four 5 MHz subbands. An illustration of four 5 MHz subbands 434 within a 20 MHz system bandwidth 432 is depicted in FIG. 4B.

In a first aspect of the fourth example, when the number of RBs allocated to the UE 406 is between 7 RBs and 12 RBs, the base station 404 may restrict the allocation of RBs to two consecutive subbands from within a group of eight 3 MHz subbands 436 (e.g., $subband_0$-$subband_7$) that each include 12 RBs (e.g., $RB_0$-$RB_{11}$)—a 3 Mhz subband refers to a 12 RB subband which occupies a bit less than 3 Mhz. In other words, the number of RBs may be restricted to $subband_0$-$subband_1$, $subband_2$-$subband_3$, $subband_4$-$subband_5$, or $subband_6$-$subband_7$. For example, assume that base station 404 allocates 12 RBs across $suband_6$ and $subband_7$ to UE 406. In addition, assume that the allocated RBs start with $RB_3$ in $subband_6$. Therefore, $RB_3$-$RB_{11}$ in $subband_6$ and $RB_0$-$RB_2$ in $subband_7$ are allocated to UE 406. Here, the information 405 transmitted by the base station 404 may indicate that 12 RBs starting with $RB_3$ in $subband_6$ are allocated to the UE 406, and the UE 406 may use the information 405 to determine 407 that $RB_3$-$RB_{11}$ in $subband_6$ and $RB_0$-$RB_2$ in $subband_7$ are allocated for UL communications. UE 406 may transmit one or more UL communications 409 to the base station 404 using $RB_3$-$RB_{11}$ in $subband_6$ and $RB_0$-$RB_2$ in $subband_7$.

In a second aspect of the fourth example, when the number of RBs allocated to the UE 406 is between 13 RBs and 25 RBs, the base station 404 may restrict the allocation of RBs to two consecutive subbands from within a group of four 5 MHz subbands (e.g., $subband_0$-$subband_3$) that each include 25 RBs (e.g., $RB_0$-$RB_{24}$). In other words, the number of RBs may be restricted to $subband_0$-$subband_1$ or $subband_2$-$subband_3$. For example, assume that base station 404 allocates 23 RBs across $suband_0$ and $subband_1$ to UE 406. In addition, assume that the allocated RBs start with $RB_6$ in $subband_0$. Therefore, $RB_6$-$RB_{24}$ in $subband_0$ and $RB_0$-$RB_3$ in $subband_1$ are allocated to UE 406. Here, the information 405 transmitted by the base station 404 may indicate that 23 RBs starting with $RB_6$ in $subband_0$ are allocated to the UE 406, and the UE 406 may use the information 405 to determine 407 that $RB_6$-$RB_{24}$ in $subband_0$ and $RB_0$-$RB_3$ in $subband_1$ are allocated for UL communications. UE 406 may transmit one or more UL communications 409 to the base station 404 using $RB_6$-$RB_{24}$ in $subband_0$ and $RB_0$-$RB_3$ in $subband_1$.

Table 1 seen below provides a comparison of the number of bits that a base station may use to indicate allocated RBs to a UE supporting legacy eMTC (e.g., which supports a maximum of 6 RB allocation) versus UE 406 that supports UL communications with a larger bandwidth (e.g., 1.4 MHz, 3 MHz, 5 MHz, 10 MHz, 15 MHz, 20 MHz) in accordance with certain aspects of the present disclosure.

As seen below in Table 1, the first example discussed supra may provide full flexibility. As also seen below in Table 1, the second example discussed supra may have reduced flexibility in starting RB and also use joint coding of the starting RB, the number of RBs, and the RIV mapping used in legacy LTE to indicate the allocated RBs to UE 406. As further seen below in Table 1, the third and fourth examples discussed supra may assume a "look up table" approach for the allocation of RBs to determine an optimal number of bits used to indicate the allocated RBs to the UE 406.

TABLE 1

Number of bits for UL resource allocation for UE with max UL BW of 5 MHz

| Proposal | Max Allocation (RBs) | System Bandwidth | | | | | |
| --- | --- | --- | --- | --- | --- | --- | --- |
| | | 1.4 MHz | 3 MHz | 5 MHz | 10 MHz | 15 MHz | 20 MHz |
| Legacy eMTC | 6 | 5 | 6 | 7 | 8 | 9 | 9 |
| Full Flexibility optimal size | 25 | 5 | 7 | 8 | 10 | 11 | 11 |
| 1$^{st}$ Example: Full flexibility, No joint coding of start RB, num RB | 25 | NA | NA | 9 | 10 | 11 | 11 |
| 2$^{nd}$ Example: Allocation Restricted to 5 Mhz subbands + joint coding of start RB, num RB | 25 | NA | NA | 8 | 9 | 10 | 10 |
| 3$^{rd}$ Example: full flexibility + allocation minimizes #NBs used | 25 | 5 | 6 | 8 | 9 | 10 | 10 |
| 4$^{th}$ Example: Allocation restricted to 6RB, 12RB or 25RB subbands | | 5 | 6 | 8 | 9 | 9 | 10 |
| Legacy LTE RIV | 100 | 5 | 7 | 9 | 11 | 12 | 13 |

Figure 5:
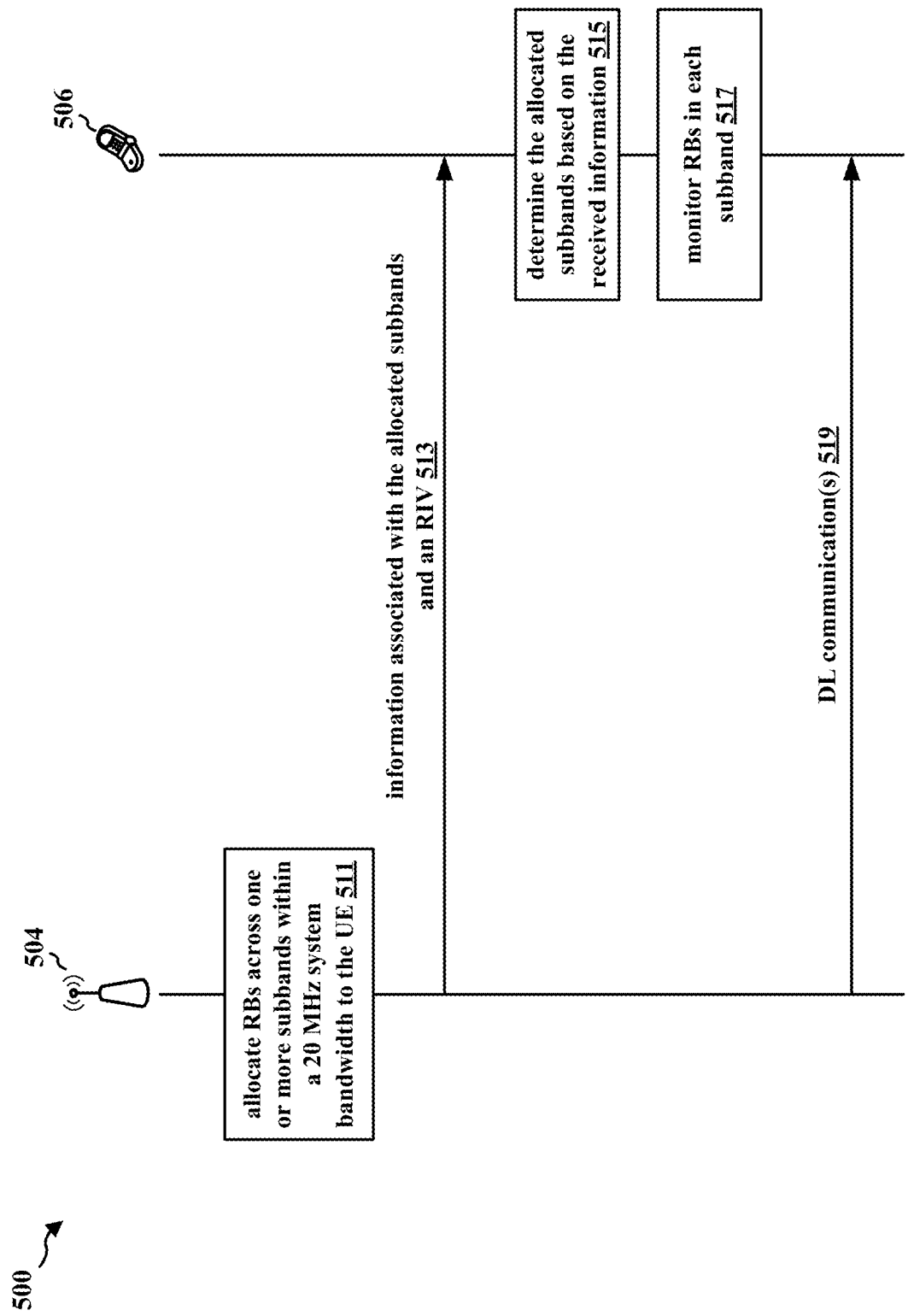
FIG. 5 illustrates a data flow that may be used for narrowband communications in accordance with certain aspects of the disclosure.

FIG. 5 illustrates a data flow 500 that may be used for narrowband communications that may enable base station 504 to allocate resources for DL narrowband communications to UE 506 when the channel bandwidth (e.g., 1.4 MHz, 3 MHz, 5 MHz, 10 MHz, 15 MHz, 20 MHz, etc.) is larger than the channel bandwidth of traditional narrowband communication systems (e.g., 6 RB or 180 kHz). By supporting a larger channel bandwidth for narrowband communications, services such as VoLTE and/or multicast messaging that were previously not supported for narrowband UEs (e.g., NB-IoT device, eMTC devices, etc.) may be supported. Base station 504 may correspond to, e.g., base station 102, 180, 404, 604 1150, 1750, 2350, eNB 310, the apparatus 802/802', 1402/1402', 2002/2002'. UE 506 may correspond to, e.g., UE 104, 350, 406, 606 850, 1450, 2050, the apparatus 1102/1102', 1702/1702', 2302/2302'.

To enable narrowband communications that employ a larger channel bandwidth, the base station 504 may allocate RBs 511 across one or more subbands within a 20 MHz system bandwidth for DL communications with UE 506.

Base station 404 may allocate a combination of subbands up to $N_{NB}^{UE}$ subbands, where $N_{NB}^{UE}$ is the maximum number of contiguous subbands the UE 506 may be able to monitor simultaneously. In one configuration, to reduce the payload size for the 20 MHz channel bandwidth case, base station 404 may indicate the allocated subbands to the UE 506 using a combination of one or more of type 0, type 1, or type 2 resource allocation types. In addition, the base station 404 may allocate a common starting RB and a common set of RBs in each of the one or more subbands (e.g., narrowbands).

In addition, base station 404 may transmit information 513 (e.g., DCI) associated with the allocated subbands and an RIV to the UE 506 that indicate which subbands and which RBs within the subbands the UE 506 should monitor for one or more DL communications. In one aspect, base station 404 may use a same RIV for each of the subbands allocated for the DL communications to indicate that the starting RB and allocated RBs are the same for each subband. The UE 506 may determine the starting RB and the allocated RBs in the one or more subbands based on equations (1), (2), and (3) seen below. As seen below, $N_{RB}^{DL}$ may include the total number of RBs available for allocation in each subband, $L_{CRBs}$ may include the number of RBs allocated for a downlink transmission in each of the one or more subbands, and $RB_{start}$ may include the starting RB allocated for the DL communication in each of the one or more subbands.

For PDCCH DCI format 1A, 1B, or 1D, or for ePDCCH DCI format 1A, 1B, or 1D, the UE 506 may determine based on the information included in the DCI:

if $(L_{CRBs}-1) \leq [N_{RB}^{DL}/2]$ then      equation (1)

$RIV = N_{RB}^{DL}(L_{CRBs}-1) + RB_{start}$      equation (2)

else $RIV = N_{RB}^{DL}(N_{RB}^{DL} - L_{CRBs} + 1) + (N_{RB}^{DL} - 1 - RB_{start})$      equation (3).

In a first configuration, the RIV for each of the subbands has all possible valid combinations of starting RBs and number of RBs that may be allocated for DL communications in that particular subband. When full mobility and channel state information (CSI) feedback are supported by UE 506 (e.g., coverage enhancement (CE) mode A), the information 513 may use 5 bits to indicate which subbands and which RBs in each of the subbands are allocated for DL communications. When UE 506 supports limited mobility and/or does not support CSI feedback (e.g., CE mode B), the information 513 may use 1 bit to indicate which subbands and which RBs in each of the subbands are allocated for DL communications. The first configuration may be employed when the channel bandwidth is less than or equal to 20 MHz when the UE 506 is operating in CE mode A. The first configuration may also be employed when the channel bandwidth is less than or equal to 5 MHz when UE 506 is operating in CE mode B.

In a second configuration, the RIV for each of the subbands may be limited to a subset of all possible valid combinations of starting RBs and number of RBs that may be allocated for DL communications in that subband to reduce the RIV payload. In an aspect, the subset includes less than all possible valid combinations. For CE mode A, base station 504 may allocate the following combinations for number of RBs, starting RB: [{1,0}, {1,1}, {1,2}, {1,3}, {1,4}, {1,5}, {2,0}, {2,2}, {2,4}, {3,0}, {3,3}, {4,0}, {4,2}, {5,0}, {5,1}, {6,1}] and reduce RIV payload by 1 bit compared to legacy narrowband communication. Similarly for CE mode B, base station 504 may allocate all 6 RBs in each subband and include a bit for RIV in the information 513 transmitted to UE 506.

5 MHz UE

When UE 506 is configured for narrowband communications with a maximum channel bandwidth of 5 MHz, the combination of subbands allocated by base station 504 may be limited to a group of four contiguous subbands selected from a set of sixteen 1.4 MHz subbands (e.g., see 438 in FIG. 4B). In other words, the allocation of RBs may be communicated to UE 506 in units of subbands and a common set of RBs within each subband. In one aspect, full flexibility of subband allocation (e.g., allocation of any of the subbands within the set of sixteen 1.4 MHz subbands) may be desirable.

For example, assume that base station 504 allocates 4 RBs starting with $RB_1$ in $suband_7$, $subband_8$, $subband_9$, and $subband_{10}$ (e.g., see 438 in FIG. 4B) to UE 506. In other words, $RB_1$-$RB_5$ in each of $suband_7$, $subband_8$, $subband_9$, and $subband_{10}$ are allocated for DL communications. Here, the information 513 transmitted by base station 504 may include an RIV that indicates that 4 RBs starting with $RB_1$ in each of $subband_7$-$subband_{10}$ are allocated for DL communications, and the UE 506 may use the information 513 to determine 515 that $RB_1$-$RB_5$ in each of $suband_7$, $subband_8$, $subband_9$, and $subband_{10}$ are allocated for DL communications 519. UE 506 may monitor 517 $RB_1$-$RB_5$ in each of $suband_7$, $subband_8$, $subband_9$, and $subband_{10}$ for the DL communications 519 from base station 404.

Table 2 seen below summarizes possible subband allocation configurations that may be used by base station 504 and a mapping from a subband allocation bitmap ($b_i$ is 1 is NB i is allocated). The mapping may take into account that the allocation of subbands is restricted to 4 contiguous subbands, has at least 1 subband allocated, and does not wrap around in the edges of the system bandwidth.

TABLE 2

Possible Subband Allocation Configurations

| BW (MHz) | #NB ($N_{NB}$) | # Possible NB Allocations ($M_{NB}$) | NB_ALLOCATION_STATE mapping |
|---|---|---|---|
| 1.4 | 1 | 1 | Always 0 |
| 3 | 2 | 3 | BIN2DEC($b_0 b_1$) − 1 |
| 5 | 4 | 1 * 8 + 7 | k = min(start NB index, $N_{NB}$ − 3) |
| 10 | 8 | 5 * 8 + 7 | if(k < $N_{NB}$ − 3) |

TABLE 2-continued

Possible Subband Allocation Configurations

| BW (MHz) | #NB ($N_{NB}$) | # Possible NB Allocations ($M_{NB}$) | NB_ALLOCATION_STATE mapping |
|---|---|---|---|
| 15 | 12 | 9 * 8 + 7 | NB_ALLOCATION_STATE = 8k + BIN2DEC $(b_{k+1}b_{k+2}b_{k+3})$ else NB_ALLOCATION_STATE = 8k + BIN2DEC $(b_k b_{k+1} b_{k+2})$ − 1 |
| 20 | 16 | 13 * 8 + 7 | |

In one configuration, the number of states for subband allocation may be reduced by defining 5 MHz non-overlapping subbands and restricting allocation of RBs to within those subbands. In this configuration, the number of subband allocation configurations may be {1, 3, 15, 30, 45, 50} respectively for a channel bandwidth of {1.4 MHz, 3 MHz, 5 MHz, 10 MHz, 15 MHz, 20 MHz} respectively.

In one aspect, the allocation of RBs within each subband may be specified using the formula NB_ALLOCATION_STATE*NUM_VALID_RIV+RIV, where NB_ALLOCATION_STATE takes the value specified in the Table 2 above. For CE mode A, NUM_VALID_RIV may be 21 if reusing the legacy eMTC RIV and 16 if using the reduced RIV discussed supra. For CE mode B, NUM_VALID_RIV may be 2 if reusing the legacy eMTC RIV and 1 if using the reduced RIV discussed supra.

Base station 404 may indicate the allocation of subbands and/or RBs using $\log_2$(NUM_VALID_RIV×MNB) number of bits in the information 513 transmitted to UE 506.

Table 3 seen below provides a comparison of the number of bits a base station may use to indicate the allocated subbands and RBs to a UE operating in CE mode A for legacy eMTC (e.g., which supports a maximum of 6 RB allocation) versus a UE 506 operating in CE mode A for narrowband communications with a larger bandwidth (e.g., 1.4 MHz, 3 MHz, 5 MHz, 10 MHz, 15 MHz, 20 MHz, etc.) in accordance with the present disclosure.

TABLE 3

DL Resource Allocation options for 5 MHz UE in CE Mode A

| Proposal/ | Max Allocation (RBs) | System Bandwidth | | | | | |
|---|---|---|---|---|---|---|---|
| | | 1.4 MHz | 3 MHz | 5 MHz | 10 MHz | 15 MHz | 20 MHz |
| Legacy eMTC | 6 | 5 | 6 | 7 | 8 | 9 | 9 |
| Full Flexibility in NB | 24 | 5 | 6 | 9 | 10 | 11 | 12 |
| allocation + Release 13 eMTC RIV | | | | | | | |
| Full Flexibility in NB allocation + Reduced RIV | 24 | 4 | 6 | 8 | 10 | 11 | 11 |
| Restricted to 5 Mhz subband + Release 13 RIV | 24 | 5 | 6 | 9 | 10 | 10 | 11 |
| Restricted to 5 Mhz subband + Reduced RIV | 24 | 4 | 6 | 8 | 9 | 10 | 10 |
| Proposal: Reduced RIV for BW of 20 Mhz. Legacy eMTC RIV for BW < 20 Mhz | 24 | 5 | 6 | 9 | 10 | 11 | 11 |

Table 4 seen below provides a comparison of the number of bits a base station may use to indicate the allocated subbands and RBs to a UE operating in CE mode B for legacy eMTC (e.g., which supports a maximum of 6 RB allocation) versus a UE 506 operating in CE mode B for narrowband communications with a larger bandwidth (e.g., 1.4 MHz, 3 MHz, 5 MHz, 10 MHz, 15 MHz, 20 MHz, etc.) in accordance with the present disclosure.

TABLE 4

PDSCH Resource Allocation options for 5 MHz UE in CE Mode B

| Proposal | Max Allocation (RBs) | System Bandwidth | | | | | |
|---|---|---|---|---|---|---|---|
| | | 1.4 MHz | 3 MHz | 5 MHz | 10 MHz | 15 MHz | 20 MHz |
| Legacy eMTC | 6 | 1 | 2 | 3 | 4 | 5 | 5 |
| Full Flexibility in NB allocation + Release 13 eMTC RIV | 24 | 1 | 3 | 5 | 7 | 8 | 8 |

TABLE 4-continued

PDSCH Resource Allocation options for 5 MHz UE in CE Mode B

| | | System Bandwidth | | | | | |
|---|---|---|---|---|---|---|---|
| Proposal | Max Allocation (RBs) | 1.4 MHz | 3 MHz | 5 MHz | 10 MHz | 15 MHz | 20 MHz |
| Full Flexibility in NB allocation + Reduced RIV | 24 | 0 | 2 | 4 | 6 | 7 | 7 |
| Restricted to 5 Mhz subband + Release 13 RIV | 24 | 1 | 3 | 5 | 6 | 7 | 7 |
| Restricted to 5 Mhz subband + Reduced RIV | 24 | 0 | 2 | 4 | 5 | 6 | 6 |
| Proposal: Reduced RIV for BW > 5 Mhz. Legacy eMTC RIV for BW <= 5 Mhz | 24 | 1 | 3 | 5 | 6 | 7 | 7 |

20 MHz UE

When UE 506 is configured for narrowband communications with a 20 MHz channel bandwidth and the DL channel bandwidth used by base station 504 is less than or equal to 5 MHz, the resource allocation mapping described supra with respect to a UE enabled with a 5 MHz DL channel bandwidth may be reused.

Alternatively, when UE 506 is configured for narrowband communications using a 20 MHz channel bandwidth and the bandwidth used by base station 504 for DL communications is greater than 5 MHz (e.g., 10 MHz, 15 MHz, 20 MHz), subband allocation may be in groups of two contiguous subbands. Here, base station 504 may allocate 511 subbands by allocating one or more groups of two contiguous subbands from a set of sixteen 1.4 MHz subbands. The information 513 transmitted to the UE 506 may indicate the allocated groups of two contiguous subbands, an allocated common set of RBs in each subband, and a starting RB in each subband for DL communications. By indicating the allocation of subbands in groups of two, the number of bits used to indicate subband allocation may be reduced by half. In an aspect, information 513 may include joint coding of the RIV and the information associated with the allocated groups of two contiguous subbands.

For example, assume that base station 504 allocates 4 RBs starting with $RB_1$ in each subband in subband $group_1$ (e.g., $suband_7$, $subband_8$) and subband $group_2$ (e.g., $subband_9$, $subband_{10}$) to UE 506 (e.g., see 438 in FIG. 4B). In other words, $RB_1$-$RB_4$ in each of $suband_7$, $subband_8$, $subband_9$, and $subband_{10}$ are allocated for DL communications. Here, the information 513 transmitted by the base station 504 may include an RIV that indicates that 4 RBs starting with $RB_1$ in each subband in subband $group_1$ and subband $group_2$ of $subband_7$-$subband_{10}$ are allocated for DL communications, and the UE 506 may use the information 513 to determine 515 that $RB_1$-$RB_4$ in each of $suband_7$, $subband_8$, $subband_9$, and $subband_{10}$ are allocated for DL communications 519. UE 506 may monitor 517 $RB_1$-$RB_4$ in each of $suband_7$, $subband_8$, $subband_9$, and $subband_{10}$ for the DL communications 519 from base station 404.

Table 5 seen below provides a comparison of the number of bits a base station may use to indicate the allocated subbands and RBs to a UE operating in CE mode B for legacy eMTC (e.g., which supports a maximum of 6 RB allocation) versus a UE 506 operating in CE mode A for narrowband communications with a larger bandwidth (e.g., 10 MHz, 15 MHz, 20 MHz, etc.) in accordance with the present disclosure.

TABLE 5

DL Resource Allocation options for 20 MHz UE in CE Mode A

| | System Bandwidth | | |
|---|---|---|---|
| Proposal | 10 MHz | 15 MHz | 20 MHz |
| Legacy eMTC | 8 | 9 | 9 |
| eMTC RIV + bitmap for each NB | 13 | 17 | 21 |
| eMTC RIV + bitmap for NBG, with NBG size P = 2 | 9 | 11 | 13 |
| Reduced RIV + bitmap for NBG, with NBG size P = 2 | 8 | 10 | 12 |
| For Reference: Legacy Type 0 allocation: RBG size 3 for 10 Mhz, 4 for 15, 20 MHz | 17 | 19 | 25 |

Table 6 seen below provides a comparison of the number of bits a base station may use to indicate the allocated subbands and RBs to a UE operating in CE mode B for legacy eMTC (e.g., which supports a maximum of 6 RB allocation) versus a UE 506 operating in CE mode B for narrowband communications with a larger bandwidth (e.g., 10 MHz, 15 MHz, 20 MHz, etc.) in accordance with the present disclosure.

TABLE 6

PDSCH Resource Allocation options for 20 MHz UE in CE Mode B

| | System Bandwidth | | |
|---|---|---|---|
| Proposal | 10 MHz | 15 MHz | 20 MHz |
| Legacy eMTC | 4 | 5 | 5 |
| eMTC RIV + bitmap for each NB | 9 | 13 | 17 |
| eMTC RIV + bitmap for NBG, with NBG size of 2 | 5 | 7 | 9 |
| Reduced RIV + bitmap for NBG, with NBG size of 2 | 4 | 6 | 8 |

Figure 6:
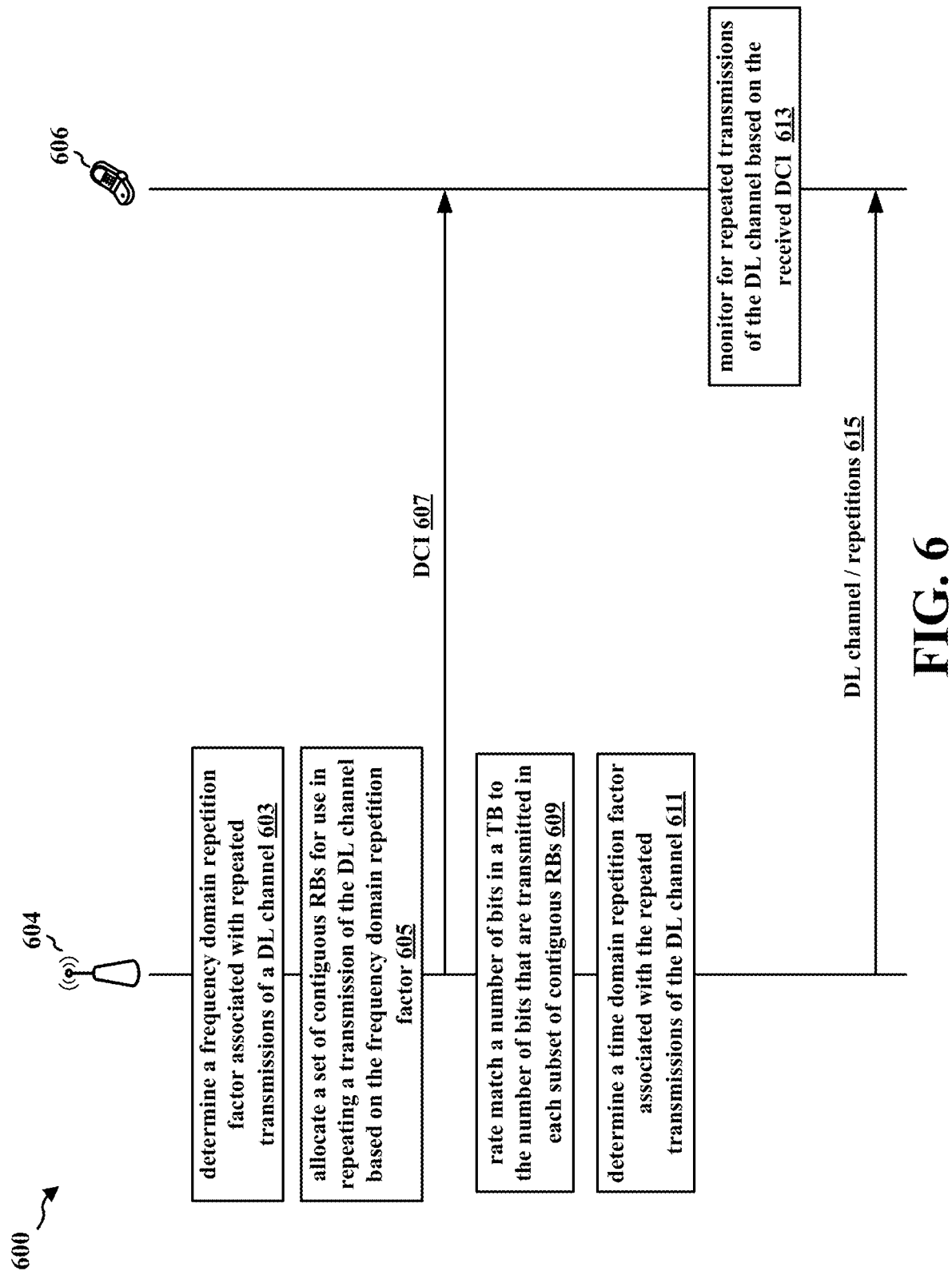
FIG. 6 illustrates a data flow that may be used for narrowband communications in accordance with certain aspects of the disclosure.

FIG. 6 illustrates a data flow 600 that may be used for narrowband communications that may enable repeated transmissions of a DL channel (e.g., PDSCH) in the frequency domain. Optionally, the transmissions of the DL channel may also be repeated in the time domain. By repeating transmissions of a DL channel in the frequency domain, services such as VoLTE and/or multicast messaging that were previously not supported for narrowband UEs (e.g., NB-IoT device, eMTC devices, etc.) may be supported. Base station 604 may correspond to, e.g., base station 102, 180, 404, 504, 1150, 1750, 2350, eNB 310, the apparatus 802/802', 1402/1402', 2002/2002'. UE 606 may correspond to, e.g., UE 104, 350, 406, 506, 850, 1450, 2050, the apparatus 1102/1102', 1702/1702', 2302/2302'.

In applications like VoLTE, the coverage enhancement that may be achieved using CE modes may be limited since the rate of arrival of the VoLTE packets limits repetitions of the DL channel to no more than 16 (e.g., assuming one packet every 40 ms) in Half Duplex FDD. With increased bandwidth support from the UE 506, the coverage may be increased by introducing new MCS levels with reliability better than the existing lowest MCS level (MCS 0). Alternately or additionally, a new repetition value field (e.g., included in DCI 607) may be introduced to indicate repetition in frequency domain to UE 606.

For example, base station 604 may determine 603 a frequency domain repetition factor associated with repeated transmissions of a DL channel. For example, the frequency domain repetition factor may be in units of RBs. To account for deep fades over multiple RBs (e.g., when UE 606 is located in a basement), base station 404 may repeat transmissions of the entire DL channel as one entity instead of repeating each part of the DL channel separately. In one aspect, the frequency domain repetition factor may be associated with at least one of a coverage mode (e.g., a fixed repetition of 2 in the frequency domain assumed for CE Mode B), a modulation and coding scheme (MCS) (e.g., repetition in frequency domain supported for MCS<x), a resource allocation (e.g., repetition assumed if number of RBs>x and configured time domain repetition factor=1), or a time domain repetition factor (e.g., if time domain repetition factor is >4, freq_rep_factor=2, and # subframes=time repetition factor/freq_rep_factor), or new bits added to the DCI.

In another aspect, base station 604 may allocate 605 a set of contiguous RBs for use in repeating a transmission of the DL channel based on the frequency domain repetition factor. For example, each repeated transmission of the DL channel may be associated with a subset of RBs in the set of contiguous RBs.

In one aspect, base station 604 may transmit information associated with the frequency domain repetition factor and the set of contiguous RBs in a DCI 607 to UE 606, and UE 606 may monitor 613 for repeated transmissions of the DL channel based on the DCI 607 transmitted by base station 604.

Further, base station 604 may rate match 609 a number of bits in a transport block (TB) to the number of bits that are transmitted in each subset of contiguous RBs. In one aspect, a size of the TB may be a function of the frequency domain repetition factor, a number of RBs in each subset of contiguous RBs, and an MCS. For example, the TB size in conventional systems is a function of number of RBs and MCS. However, the TB size may also be a function of the frequency domain repetition factor. For example, TB size may be determined by the base station 604 using the same look up table (LUT) and by replacing the input number of RBs by # RBs/freq_rep_factor. In other words, TB size=LUT(MCS, # RBs/freq_rep_factor) instead of only LUT(MCS, # RBs). In one configuration, functionality similar to repetition in frequency domain may be achieved by changing the TB size formula to use a reduced number of RBs as mentioned above and having rate matching done using the original number of RBs instead of performing rate matching using the reduced number of RBs followed by repetition.

The DL channel 615 may be transmitted using each subset of contiguous RBs in the set of contiguous RBs. In an aspect, a repetition of the DL channel may be distributed in frequency in blocks of rate matched RBs. That is, if the DL channel without repetition requires $N_0$ RBs (e.g., a subset of the contiguous RBs), then the base station 604 may perform rate matching of the DL channel over the first $N_0$ RBs of the allocation, and then repeat the DL channel transmission for the next $N_0$ RBs and so on until all the sets of contiguous RBs in the allocation of RBs are used.

Optionally, base station 604 may also determine 611 a time domain repetition factor associated with the repeated transmissions of the DL channel. Here, the transmission of the DL channel 615 may be repeated across frequency resources and time resources.

In one aspect, repeating transmissions of the DL channel in the frequency domain may save power at UE 606 for small data transfers. For example if signal-to-noise ratio (SNR) conditions are such that UE 606 is able to support MCS 0 with repetition of 16 and base station 604 has 256 bits of data to send in the physical layer, based on the current MCS table, base station 604 may send the 256 bits of data by scheduling MCS0 with 10 PRBs and with repetition over sixteen subframes. Repetition in the frequency domain may allow base station 604 to send 256 bits in 40 PRBs and 4 subframes thereby reducing the number of subframes that the UE 606 monitors, recuing power consumption at the UE 606.

Figure 7:
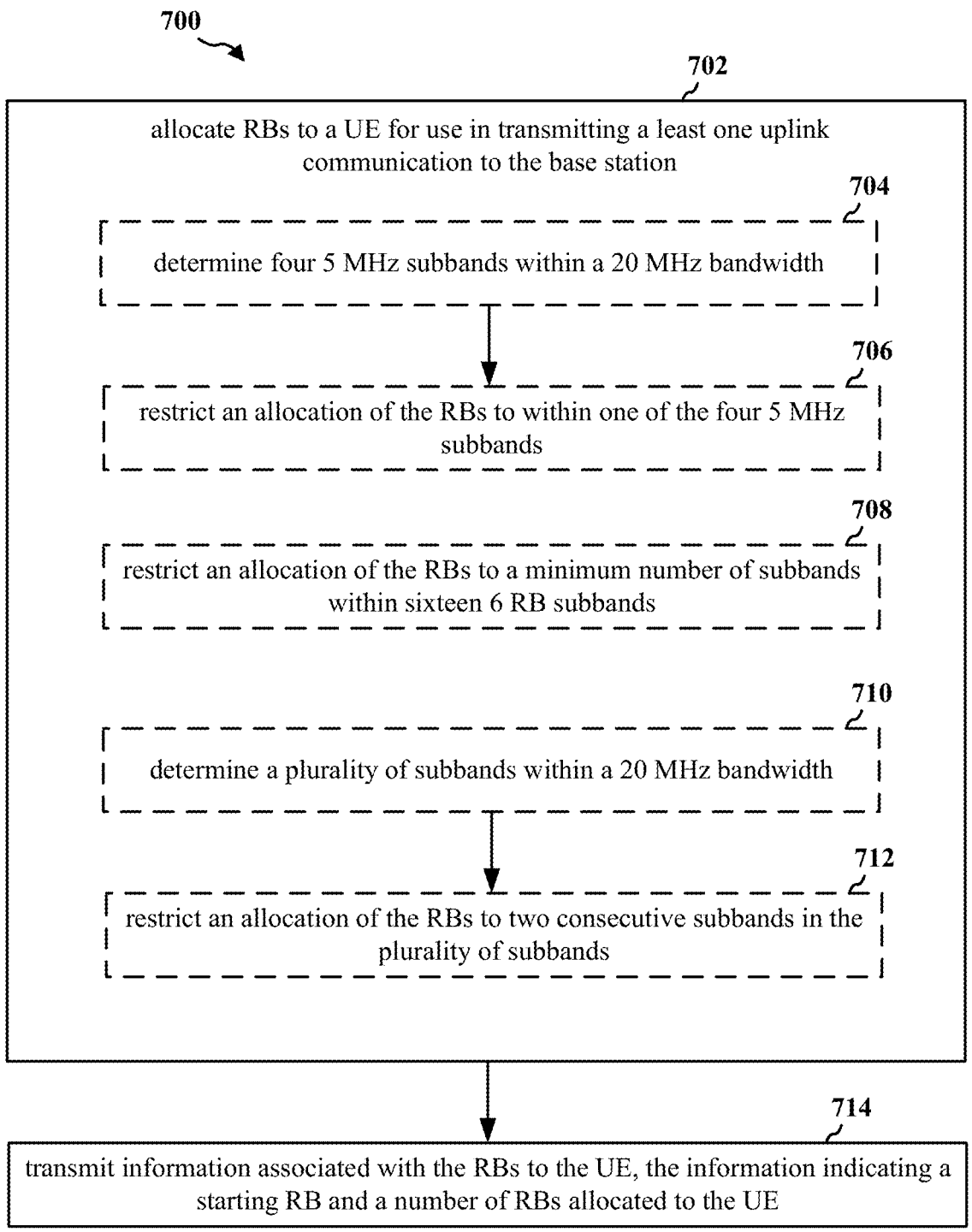
FIG. 7 is a flowchart of a method of wireless communication in accordance with certain aspects of the disclosure.

FIG. 7 is a flowchart 700 of a method of wireless communication. The method may be performed by a base station (e.g., e.g., base station 102, 180, 404, 504, 604, 1150, 1750, 2350, eNB 310, the apparatus 802/802', 1402/1402', 2002/2002'). In FIG. 7, optional operations are indicated with dashed lines.

At 702, the base station may allocate RBs to a UE for use in transmitting a least one uplink communication to the base station. In an aspect, the RBs allocated to the UE may be restricted to a 5 MHz bandwidth. In another aspect, a number of RBs allocated to the UE may be restricted to a multiple of $2^a \times 3^b \times 5^c$, where a, b, and c are each non-negative integers. For example, referring to FIG. 4A, base station 404 may restrict the starting RB and the number of RB allocated to the UE 406 to be within a 5 MHz bandwidth. Due to system requirements, the base station 404 may restrict the number of RBs allocated to the UE 406 to a multiple of $2^a \times 3^b \times 5^c$, where a, b, and c are each non-negative integers. When the base station 404 restricts the number of RBs allocated to the UE 406 to a multiple of $2^a \times 3^b \times 5^c$, there are sixteen possible allocation sizes (e.g., {1, 2, 3, 4, 5, 6, 8, 9, 12, 15, 16, 18, 20, 24, 25}) for a bandwidth of 5 MHz.

At 704, the base station may allocate RBs by determining four 5 MHz subbands within a 20 MHz bandwidth. In an aspect, the four 5 MHz subbands may be non-overlapping subbands within the 20 MHz bandwidth. For example, referring to FIG. 4A, base station 404 may allocate RBs 403 to the UE 406 by determining four 5 MHz subbands within a maximum system bandwidth of 20 MHz, and restricting the allocation of the RBs to be within one of the four 5 MHz subbands (e.g., subband$_0$, subband$_1$, subband$_2$, or subband$_3$). Each of the four 5 MHz subbands may include 25 RBs (e.g., $RB_0$-$RB_{24}$). For example, subband$_0$ may occupy the frequency range 0 MHz to 5 MHz, subband$_1$ may occupy the frequency range 5 MHz to 10 MHz, subband$_2$ may occupy the frequency range 10 MHz to 15 MHz, and subband$_3$ may occupy the frequency range 15 MHz to 20 MHz. In one aspect, the allocation of RBs within one of subband$_0$, subband$_1$, subband$_2$, or subband$_3$ may be fully flexible in that the starting RB is not restricted to a particular RB and/or subband. An illustration of four 5 MHz subbands 434 within a 20 MHz system bandwidth 432 is seen in FIG. 4B.

At 706, the base station may allocate the RBs by restricting an allocation of the RBs to within one of the four 5 MHz subbands. For example, referring to FIGS. 4A and 4B, base station 404 may restrict the allocation of the RBs to within one of the four 5 MHz subbands (e.g., subband$_0$, subband$_1$, subband$_2$, or subband$_3$). Each of the four 5 MHz subbands may include 25 RBs (e.g., RB$_0$-RB$_{24}$).

At 708, the base station may allocate the RBs by restricting an allocation of the RBs to a minimum number of subbands within sixteen 6 RB subbands. For example, referring to FIG. 4A, base station 404 may allocate the RBs 403 by restricting the allocation to a minimum number of subbands within sixteen 1.4 MHz subbands (e.g., subband$_0$-suband$_{15}$) that each include 6 RBs (e.g., RB$_0$-RB$_5$). An illustration of sixteen 1.4 MHz subbands 438 within a 20 MHz system bandwidth 432 is seen in FIG. 4B.

In a first aspect at 708, the RBs may be restricted to a single subband when the number of RBs is less than or equal 6 RBs. For example, referring to FIGS. 4A and 4B, base station 404 may restrict the RBs allocated to UE 406 to a single subband within the sixteen subbands 438 when the number of allocated RBs is less than or equal to 6 RBs. For example, assume that base station 404 allocates 3 RBs in subband$_2$ to UE 406. In this example, the starting RB may not be greater than RB$_3$ in subband$_2$ so that the allocated RBs do not spill into a second subband (e.g., subband$_3$). In addition, assume that the allocated RBs start with RB$_1$ in subband$_2$. Therefore, RB$_1$-RB$_3$ in subband$_2$ are allocated to UE 406. Here, the information 405 transmitted by base station 404 may indicate that 3 RBs starting with RB$_1$ in subband$_2$ are allocated to UE 406, and the UE 406 may use the information 405 to determine 407 that RB$_1$-RB$_3$ in subband$_2$ are allocated for UL communications. UE 406 may transmit one or more UL communications 409 to the base station 404 using RB$_1$-RB$_3$ in subband$_2$.

In a second aspect at 708, the RBs may be restricted to two consecutive subbands when the number of RBs is between 7 RBs and 12 RBs. For example, referring to FIGS. 4A and 4B, base station 404 may restrict the RBs allocated to UE 406 to two consecutive subbands within the sixteen subbands 438 when the number of allocated RBs is between 7 RBs and 12 RBs. For example, assume that base station 404 allocates 8 RBs across suband$_7$ and subband$_8$ to UE 406. In this example, the starting RB may not be greater than RB$_4$ in subband$_7$ so that the allocated RBs do not spill into a third subband (e.g., subband$_9$). In addition, assume that the allocated RBs start with RB$_3$ in subband$_7$. Therefore, RB$_3$-RB$_5$ in subband$_7$ and RB$_0$-RB$_4$ in subband$_8$ are allocated to UE 406. Here, the information 405 transmitted by base station 404 may indicate that 8 RBs starting with RB$_3$ in subband$_7$ are allocated to UE 406, and the UE 406 may use the information 405 to determine 407 that RB$_3$-RB$_5$ in subband$_7$ and RB$_0$-RB$_4$ in subband$_8$ are allocated for UL communications. UE 406 may transmit one or more UL communications 409 to the base station 404 using RB$_3$-RB$_5$ in subband$_7$ and RB$_0$-RB$_4$ in subband$_8$.

In a third aspect at 708, the RBs may be restricted to three consecutive subbands when the number of RBs is between 13 RBs and 18 RBs. For example, referring to FIGS. 4A and 4B, base station 404 may restrict the RBs allocated to UE 406 to three consecutive subbands within the sixteen subbands 438 when the number of RBs is between 13 RBs and 18 RBs. For example, assume that base station 404 allocates 14 RBs across subband$_{10}$, subband$_{11}$, and subband$_{12}$ to UE 406. In this example, the starting RB may not be later than RB$_4$ in subband$_{10}$ so that the allocated RBs do not spill into a fourth subband (e.g., subband$_{13}$). In addition, assume that the allocated RBs start with RB$_0$ in subband$_{10}$. Therefore, RB$_0$-RB$_5$ in subband$_{10}$, RB$_0$-RB$_5$ in subband$_{11}$, and RB$_0$-RB$_1$ in subband$_{12}$ are allocated to UE 406. Here, the information 405 transmitted by the base station 404 may indicate that 14 RBs starting with RB$_0$ in subband$_{10}$ are allocated to UE 406, and the UE 406 may use the information 405 to determine 407 that RB$_0$-RB$_5$ in subband$_{10}$, RB$_0$-RB$_5$ in subband$_{11}$, and RB$_0$-RB$_1$ in subband$_{12}$ are allocated for UL communications. UE 406 may transmit one or more UL communications 409 to the base station 404 using RB$_0$-RB$_5$ in subband$_{10}$, RB$_0$-RB$_5$ in subband$_{11}$, and RB$_0$-RB$_1$ in subband$_{12}$.

In a fourth aspect at 708, the RBs may be restricted to four consecutive subbands when the number of RBs is between 19 RBs and 24 RBs. For example, referring to FIGS. 4A and 4B, base station 404 may restrict the RBs allocated to UE 406 to four consecutive subbands within the sixteen subbands 438 when the number of allocated RBs is between 19 RBs and 24 RBs. For example, assume that base station 404 allocates 22 RBs across subband$_3$, subband$_4$, subband$_5$, and subband$_6$ to UE 406. In this example, the starting RB may not be later than RB$_2$ in subband$_3$ so that the allocated RBs do not spill into a fifth subband (e.g., subband$_7$). In addition, assume that the allocated RBs start with RB$_1$ in subband$_3$. Therefore, RB$_1$-RB$_5$ in subband$_3$, RB$_0$-RB$_5$ in subband$_4$, RB$_0$-RB$_5$ in subband$_5$, and RB$_0$-RB$_4$ in subband$_6$ are allocated to UE 406. Here, the information 405 transmitted by the base station 404 may indicate that 22 RBs starting with RB$_1$ in subband$_3$ are allocated to UE 406, and the UE 406 may use the information 405 to determine 407 that RB$_1$-RB$_5$ in subband$_3$, RB$_0$-RB$_5$ in subband$_4$, RB$_0$-RB$_5$ in subband$_5$, and RB$_0$-RB$_4$ in subband$_6$ are allocated for UL communications. UE 406 may transmit one or more UL communications 409 to the base station 404 using RB$_1$-RB$_5$ in subband$_3$, RB$_0$-RB$_5$ in subband$_4$, RB$_0$-RB$_5$ in subband$_5$, and RB$_0$-RB$_4$ in subband$_6$.

In a fifth aspect at 708, the RBs may be restricted to four consecutive subbands and a spill over RB in another subband when the number of RBs is 25 RBs. For example, referring to FIGS. 4A and 4B, base station 404 may restrict the RBs allocated to UE 406 to four consecutive subbands and a single spill over RB in a fifth subband when the number of RBs is 25 RBs. For example, assume that base station 404 allocates 25 RBs across subband$_7$, subband$_8$, subband$_9$, subband$_{10}$, and subband$_{11}$ to UE 406. In this example, the starting RB may not be later than RB$_0$ in subband$_7$ so that only one RB spills into subband$_{11}$. Therefore, RB$_0$-RB$_5$ in subband$_7$, RB$_0$-RB$_5$ in subband$_8$, RB$_0$-RB$_5$ in subband$_9$, RB$_0$-RB$_5$ in subband$_{10}$, and RB$_0$ in subband$_{11}$ are allocated to UE 406. Here, the information 405 transmitted by the base station 404 may indicate that 25 RBs starting with RB$_0$ in subband$_7$ are allocated to the UE 406, and the UE 406 may use the information 405 to determine 407 that RB$_0$-RB$_5$ in subband$_7$, RB$_0$-RB$_5$ in subband$_8$, RB$_0$-RB$_5$ in subband$_9$, RB$_0$-RB$_5$ in subband$_{10}$, and RB$_0$ in subband$_{11}$ are allocated for UL communications. UE 406 may transmit one or more UL communications 409 to the base station 404 using $RB_0$-$RB_5$ in $subband_7$, $RB_0$-$RB_5$ in $subband_8$, $RB_0$-$RB_5$ in $subband_9$, $RB_0$-$RB_5$ in $subband_{10}$, and $RB_0$ in $subband_{11}$.

At 710, the base station may allocate the RBs by determining a plurality of subbands within a 20 MHz bandwidth. In one aspect, the plurality of subbands may include eight 12 RB subbands when the number of RBs allocated to the UE is between 7 RBs and 12 RBs. In another aspect, the plurality of subbands may include four 25 RB subbands when the number of RBs allocated to the UE is between 13 RBs and 25 RBs. For example, referring to FIG. 4A, base station 404 may allocate the RBs 403 by determining a plurality of subbands within a 20 MHz system bandwidth. In one configuration, the RBs allocated to UE 406 may be in two consecutive subbands selected from a group of eight 3 MHz subbands. An illustration of eight 3 MHz subbands 436 within a 20 MHz system bandwidth 432 is seen in FIG. 4B. In another configuration, the RBs allocated to UE 406 may be in two consecutive subbands selected from a group of four 5 MHz subbands. An illustration of four 5 MHz subbands 434 within a 20 MHz system bandwidth 432 is seen in FIG. 4B.

At 712, the base station may allocate the RBs by restricting an allocation of the RBs to two consecutive subbands in the plurality of subbands. In an aspect, a first subband of the two consecutive subbands may have an even numbered index. For example, referring to FIGS. 4A and 4B, base station 404 may restrict the allocation of the RBs to two consecutive subbands in the plurality of subbands. In addition, a first subband of the two consecutive subbands may be restricted to a subband with an even numbered index. By restricting the allocated RBs to two consecutive subbands beginning with an even indexed subband, all of the allocated RBs may fit within the system bandwidth. In one configuration, the RBs allocated to UE 406 may be in two consecutive subbands selected from a group of eight 3 MHz subbands. An illustration of eight 3 MHz subbands 436 within a 20 MHz system bandwidth 432 is seen in FIG. 4B. In another configuration, the RBs allocated to UE 406 may be in two consecutive subbands selected from a group of four 5 MHz subbands. An illustration of four 5 MHz subbands 434 within a 20 MHz system bandwidth 432 is seen in FIG. 4B.

In a first aspect at 712, when the number of RBs allocated to the UE is between 7 RBs and 12 RBs, the base station may restrict the allocation of RBs to two consecutive subbands from within a group of eight 12 RB subbands. For example, referring to FIGS. 4A and 4B, the base station 404 may restrict the allocation of RBs to two consecutive subbands from within a group of eight 3 MHz subbands 436 (e.g., $subband_0$-$subband_7$) that each include 12 RBs (e.g., $RB_0$-$RB_{11}$) when the number of RBs allocated to the UE 406 is between 7 RBs and 12 RBs. In other words, the number of RBs may be restricted to $subband_0$-$subband_1$, $subband_2$-$subband_3$, $subband_4$-$subband_5$, or $subband_6$-$subband_7$. For example, assume that base station 404 allocates 12 RBs across $subband_6$ and $subband_7$ to UE 406. In addition, assume that the allocated RBs start with $RB_3$ in $subband_6$. Therefore, $RB_3$-$RB_{11}$ in $subband_6$ and $RB_0$-$RB_2$ in $subband_7$ are allocated to UE 406. Here, the information 405 transmitted by the base station 404 may indicate that 12 RBs starting with $RB_3$ in $subband_6$ are allocated to the UE 406, and the UE 406 may use the information 405 to determine 407 that $RB_3$-$RB_{11}$ in $subband_6$ and $RB_0$-$RB_2$ in $subband_7$ are allocated for UL communications. UE 406 may transmit one or more UL communications 409 to the base station 404 using $RB_3$-$RB_{11}$ in $subband_6$ and $RB_0$-$RB_2$ in $subband_7$.

In a second aspect at 712, when the number of RBs allocated to the UE is between 13 RBs and 25 RBs, base station may restrict the allocation of RBs to two consecutive subbands from within a group of four 25 RB subbands. For example, referring to FIGS. 4A and 4B, the base station 404 may restrict the allocation of RBs to two consecutive subbands from within a group of four 5 MHz subbands (e.g., $subband_0$-$subband_3$) that each include 25 RBs (e.g., $RB_0$-$RB_{24}$) when the number of RBs allocated to the UE 406 is between 13 RBs and 25 RBs. In other words, the number of RBs may be restricted to $subband_0$-$subband_1$ or $subband_2$-$subband_3$. For example, assume that base station 404 allocates 23 RBs across $subband_0$ and $subband_1$ to UE 406. In addition, assume that the allocated RBs start with $RB_6$ in $subband_0$. Therefore, $RB_6$-$RB_{24}$ in $subband_0$ and $RB_0$-$RB_3$ in $subband_1$ are allocated to UE 406. Here, the information 405 transmitted by the base station 404 may indicate that 23 RBs starting with $RB_6$ in $subband_0$ are allocated to the UE 406, and the UE 406 may use the information 405 to determine 407 that $RB_6$-$RB_{24}$ in $subband_0$ and $RB_0$-$RB_3$ in $subband_1$ are allocated for UL communications. UE 406 may transmit one or more UL communications 409 to the base station 404 using $RB_6$-$RB_{24}$ in $subband_0$ and $RB_0$-$RB_3$ in $subband_1$.

At 714, the base station may transmit information associated with the RBs to the UE. In one aspect, the information may indicate a starting RB and a number of RBs allocated to the UE. In another aspect, the information transmitted to the UE may include jointly coded information associated with the starting RB and the number of RBs. In a further aspect, the information transmitted to the UE may indicate within which of the four 5 MHz subbands the starting RB and the number of RBs are allocated. For example, referring to FIG. 4A, information 405 (e.g., signaling) associated with a starting RB and the number of allocated RBs may be transmitted by the base station 404 to the UE 406. Further, base station 404 may jointly code the bits associated with the number of allocated RBs and the bits associated with the starting RB to reduce the number of bits from 9 to 8. In one aspect, the number of bits used in joint coding may be the same as that of communicating starting RB and the number RBs independently. When the system bandwidth is less than 5 MHz, a legacy LTE resource indication value (RIV) mapping may be used to signal the allocation of RBs to the UE 406. An RIV may be a number that is used to specify UL resource allocation to UE 406. Conventionally, a base station uses two values (i.e., number of RBs and starting RB) to indicate the resource allocation to a UE. However, with RIV, a base station may indicate the number of allocated RBs and allocated starting RB in a single value.

Figure 8:
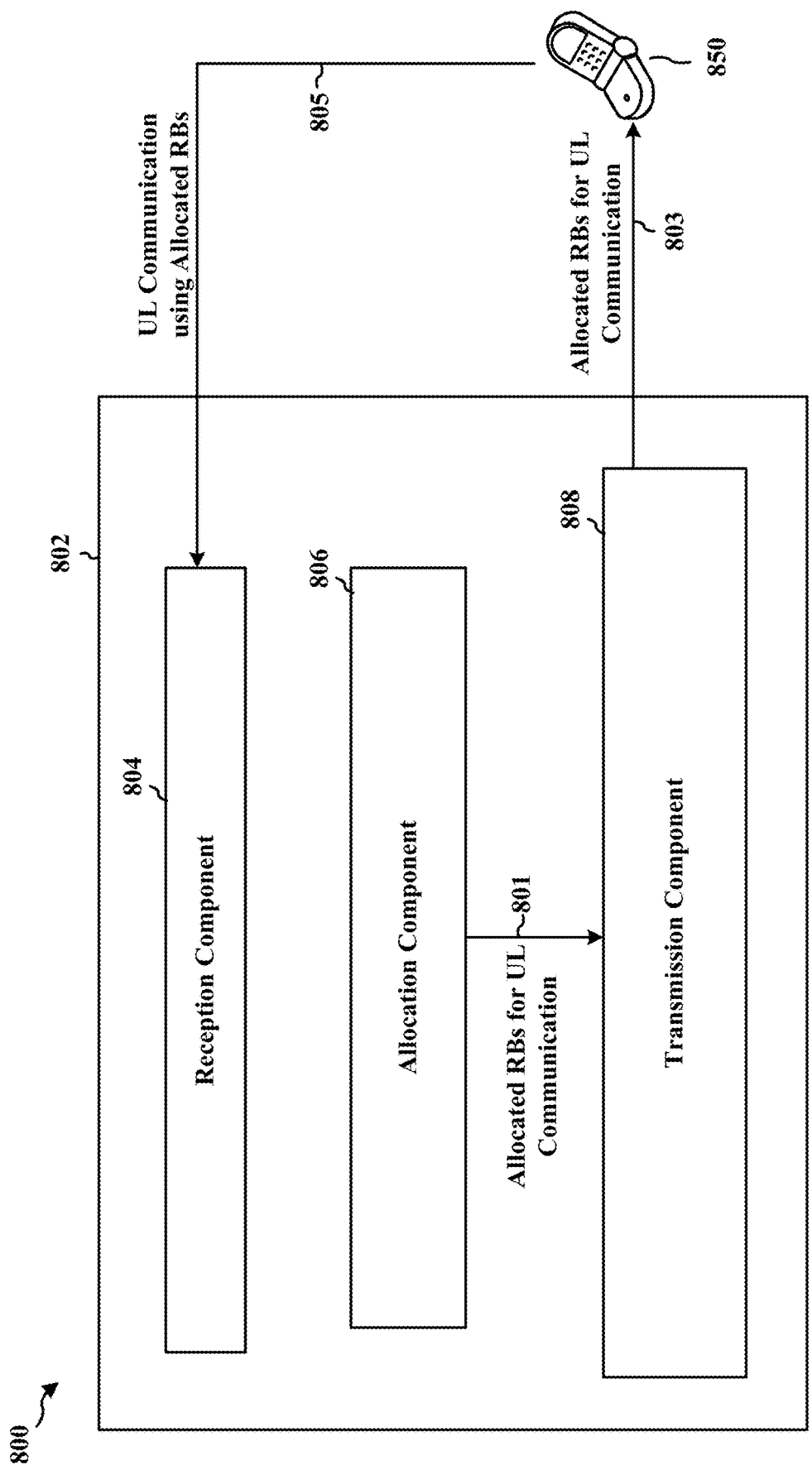
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a base station (e.g., e.g., base station 102, 180, 404, 504, 604, 1150, 1750, 2350, eNB 310, the apparatus 802', 1402/1402', 2002/2002') in communication with a UE 850 (e.g., e.g., UE 104, 350, 406, 506, 606, 1450, 2050, the apparatus 1102/1102', 1702/1702', 2302/2302').

The apparatus may include a reception component 804, an allocation component 806, and a transmission component 808.

In certain configurations, the allocation component 806 may be configured to allocate RBs to the UE 850 for use in transmitting a least one uplink communication to the base station. In an aspect, the RBs allocated to the UE may be restricted to a 5 MHz bandwidth. In another aspect, a number of RBs allocated to the UE may be restricted to a multiple of $2^a \times 3^b \times 5^c$, where a, b, and c are each non-negative integers.

In certain aspects, the allocation component 806 may be configured to allocate RBs by determining four 5 MHz subbands within a 20 MHz bandwidth. In an aspect, the four 5 MHz subbands may be non-overlapping subbands within the 20 MHz bandwidth. In certain other aspects, the allocation component 806 may be configured to allocate the RBs by restricting an allocation of the RBs to within one of the four 5 MHz subbands. In certain other aspects, the allocation component 806 may be configured to allocate the RBs by restricting an allocation of the RBs to a minimum number of subbands within sixteen 6 RB subbands.

In certain implementation, the RBs may be restricted to a single subband when the number of RBs is less than or equal 6 RBs. In certain other implementations, the RBs may be restricted to two consecutive subbands when the number of RBs is between 7 RBs and 12 RBs. In certain other implementations, the RBs may be restricted to three consecutive subbands when the number of RBs is between 13 RBs and 18 RBs. In certain other implementations, the RBs may be restricted to four consecutive subbands when the number of RBs is between 19 RBs and 24 RBs. In certain other implementations, the RBs may be restricted to four consecutive subbands and a spill over RB in another subband when the number of RBs is 25 RBs.

In certain other aspects, the allocation component 806 may be configured to allocate the RBs by determining a plurality of subbands within a 20 MHz bandwidth. In one aspect, the plurality of subbands may include eight 12 RB subbands when the number of RBs allocated to the UE is between 7 RBs and 12 RBs. In another aspect, the plurality of subbands may include four 25 RB subbands when the number of RBs allocated to the UE is between 13 RBs and 25 RBs. In certain other aspects, the allocation component 806 may be configured to allocate the RBs by restricting an allocation of the RBs to two consecutive subbands in the plurality of subbands. In an aspect, a first subband of the two consecutive subbands may have an even numbered index.

In certain aspects, when the number of RBs allocated to the UE is between 7 RBs and 12 RBs, the allocation component 806 may be configured to restrict the allocation of RBs to two consecutive subbands from within a group of eight 12 RB subbands. In certain other aspects, when the number of RBs allocated to the UE is between 13 RBs and 25 RBs, the allocation component 806 may be configured to restrict the allocation of RBs to two consecutive subbands from within a group of four 25 RB subbands.

In certain configurations, the allocation component 806 may be configured to send a signal 801 associated with the allocated RBs to the transmission component 808.

In certain configurations, the transmission component 808 may be configured to transmit information 803 associated with the RBs to the UE 850. In one aspect, the information may indicate a starting RB and a number of RBs allocated to the UE 850. In another aspect, the information transmitted to the UE 850 may include jointly coded information associated with the starting RB and the number of RBs. In a further aspect, the information transmitted to the UE 850 may indicate within which of the four 5 MHz subbands the starting RB and the number of RBs are allocated.

In certain configurations, the reception component 804 may be configured to receive an uplink communication 805 on the allocated RBs.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
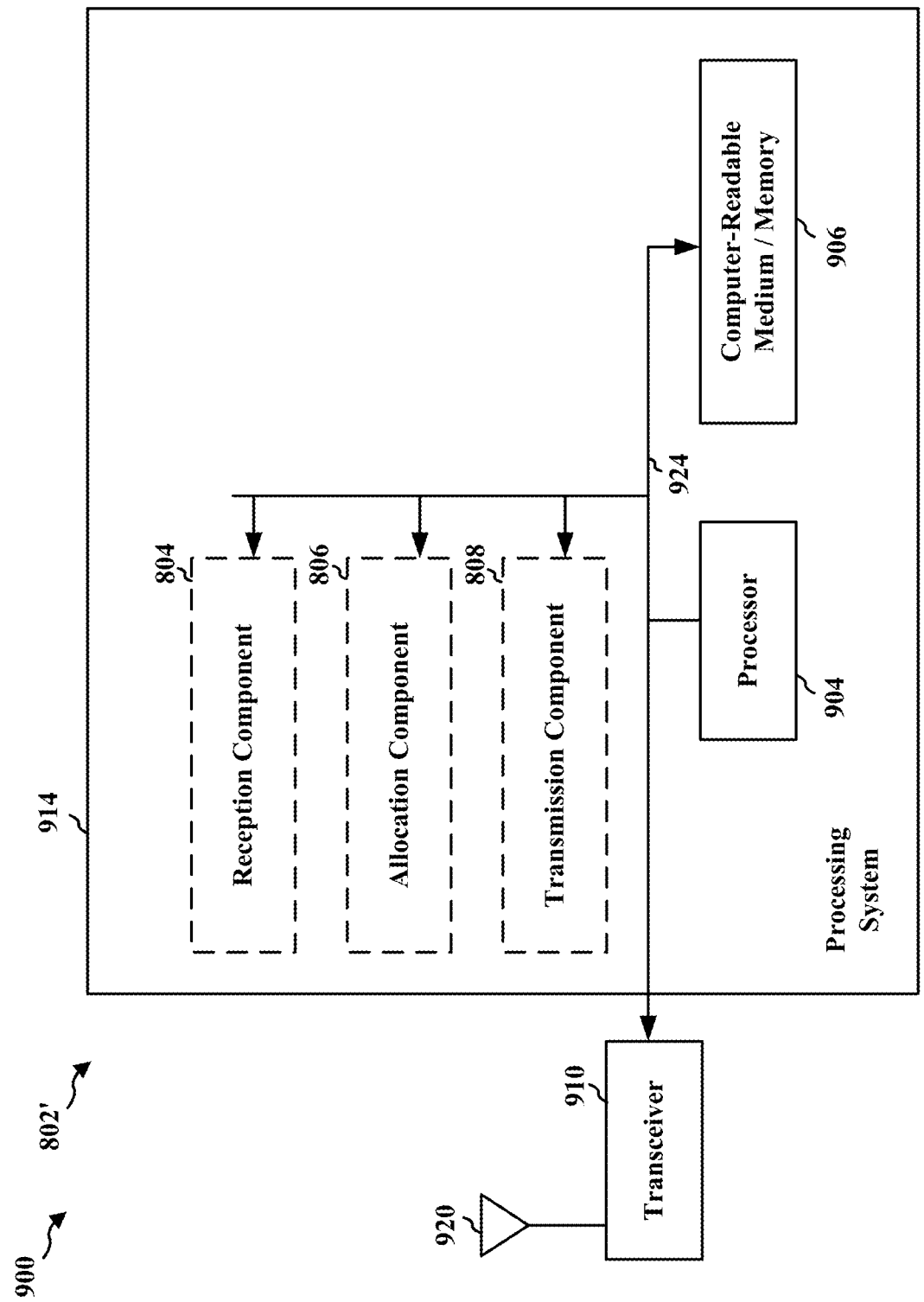
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 808, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In certain configurations, the apparatus 802/802' for wireless communication may include means for allocating RBs to a UE for use in transmitting a least one uplink communication to the base station. In an aspect, the RBs allocated to the UE may be restricted to a 5 MHz bandwidth. In another aspect, a number of RBs allocated to the UE may be restricted to a multiple of $2^a \times 3^b \times 5^c$, where a, b, and c are each non-negative integers. In certain aspects, the means for allocating RBs may be configured to determine four 5 MHz subbands within a 20 MHz bandwidth. In an aspect, the four 5 MHz subbands may be non-overlapping subbands within the 20 MHz bandwidth. In certain other aspects, the means for allocating RBs may be configured to restrict an allocation of the RBs to within one of the four 5 MHz subbands. In certain other aspects, the means for allocating the RBs may be configured to restrict an allocation of the RBs to a minimum number of subbands within sixteen 6 RB subbands. In certain implementations, the RBs may be restricted to a single subband when the number of RBs is less than or equal 6 RBs. In certain other implementations, the RBs may be restricted to two consecutive subbands when the number of RBs is between 7 RBs and 12 RBs. In certain other implementations, the RBs may be restricted to three consecutive subbands when the number of RBs is between 13 RBs and 18 RBs. In certain other implementations, the RBs may be restricted to four consecutive subbands when the number of RBs is between 19 RBs and 24 RBs. In certain other implementations, the RBs may be restricted to four consecutive subbands and a spill over RB in another subband when the number of RBs is 25 RBs. In certain other aspects, the means for allocating the RBs may be configured to determine a plurality of subbands within a 20 MHz bandwidth. In one aspect, the plurality of subbands may include eight 12 RB subbands when the number of RBs allocated to the UE is between 7 RBs and 12 RBs. In another aspect, the plurality of subbands may include four 25 RB subbands when the number of RBs allocated to the UE is between 13 RBs and 25 RBs. In certain other aspects, the means for allocating the RBs may be configured to restrict an allocation of the RBs to two consecutive subbands in the plurality of subbands. In an aspect, a first subband of the two consecutive subbands may have an even numbered index. In certain implementations, when the number of RBs allocated to the UE is between 7 RBs and 12 RBs, the means for allocating the RBs may be configured to restrict the allocation of RBs to two consecutive subbands from within a group of eight 12 RB subbands. In certain implementations, when the number of RBs allocated to the UE is between 13 RBs and 25 RBs, the means for allocating the RBs may be configured to restrict the allocation of RBs to two consecutive subbands from within a group of four 25 RB subbands. In certain configurations, the apparatus 802/802' for wireless communication may include means for transmitting information associated with the RBs to the UE. In one aspect, the information may indicate a starting RB and a number of RBs allocated to the UE. In another aspect, the information transmitted to the UE may include jointly coded information associated with the starting RB and the number of RBs. In a further aspect, the information transmitted to the UE may indicate within which of the four 5 MHz subbands the starting RB and the number of RBs are allocated. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
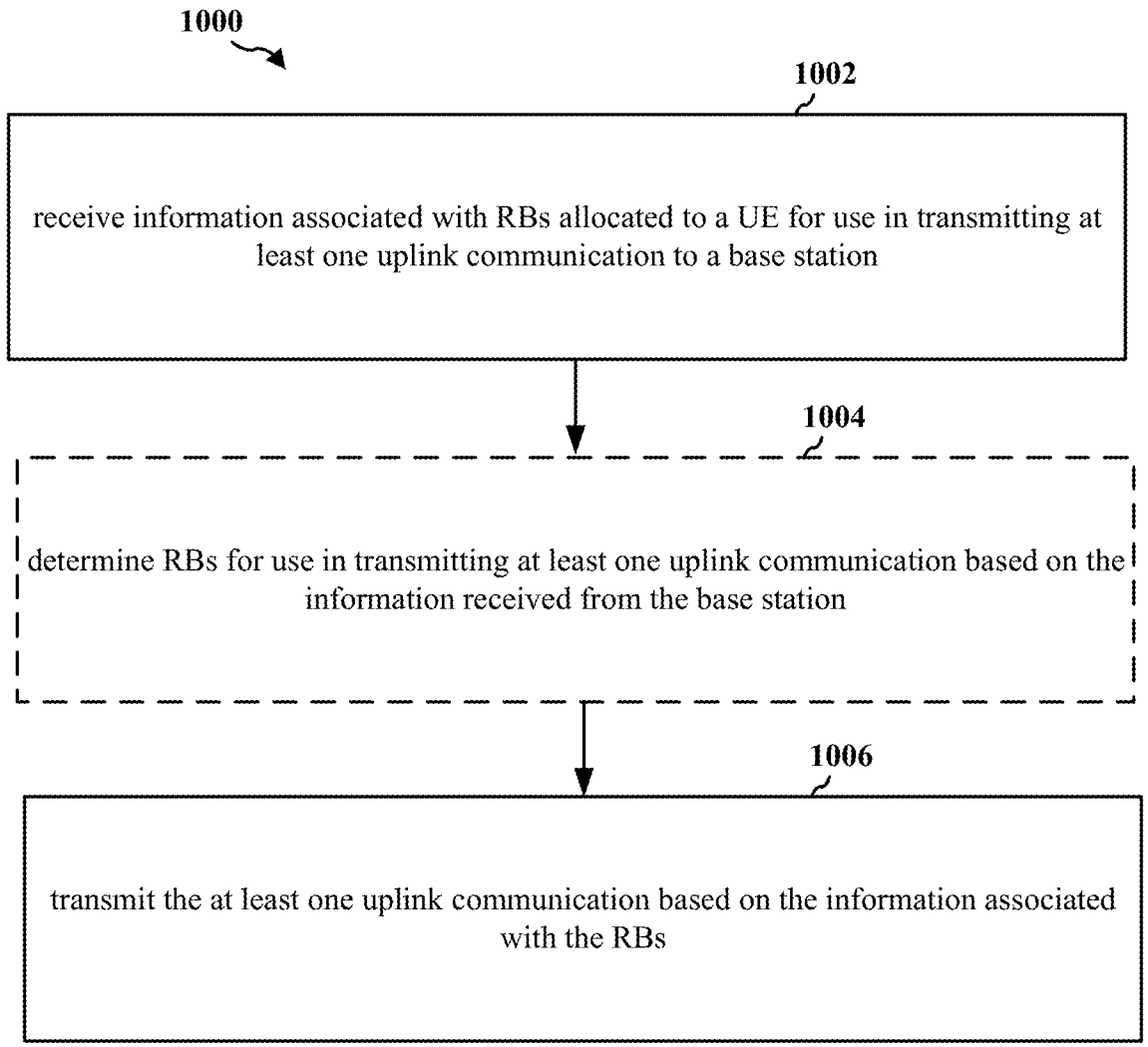
FIG. 10 is a flowchart of a method of wireless communication in accordance with certain aspects of the disclosure.

FIG. 10 is a flowchart 1000 of a method of wireless communication. The method may be performed by a UE (e.g., e.g., UE 104, 350, 406, 506, 606, 850, 1450, 2050, the apparatus 1102/1102', 1702/1702', 2302/2302'). In one aspect, the UE may be an NB-IoT device and/or an eMTC device. In FIG. 10, optional operations are indicated with dashed lines.

At 1002, the UE may receive information associated with RBs allocated to the UE for use in transmitting at least one uplink communication to a base station. In one aspect, the information may indicate a starting RB and a number of allocated RBs. In another aspect, the RBs may be restricted to a 5 MHz bandwidth. In a further aspect, the number of allocated RBs may be restricted to a multiple of $2^a \times 3^b \times 5^c$, where a, b, and c are each non-negative integers. In another aspect, the information associated with the RBs may include jointly coded information associated with the starting RB and the number of allocated RBs. For example, referring to FIG. 4A, base station 404 may restrict the starting RB and the number of RB allocated to the UE 406 to be within a 5 MHz bandwidth. Due to system requirements, the base station 404 may restrict the number of RBs allocated to the UE 406 to a multiple of $2^a \times 3^b \times 5^c$, where a, b, and c are each non-negative integers. When the base station 404 restricts the number of RBs allocated to the UE 406 to a multiple of $2^a \times 3^b \times 5^c$, there are sixteen possible allocation sizes or number of RBs (e.g., {1, 2, 3, 4, 5, 6, 8, 9, 12, 15, 16, 18, 20, 24, 25}) for a bandwidth of 5 MHz. Base station 404 may transmit information 405 associated with the starting RB and the number of allocated RBs to UE 406. Information 405 (e.g., signaling) associated with a starting RB and the number of allocated RBs may be transmitted by the base station 404 to the UE 406. Further, base station 404 may jointly code the bits associated with the number of allocated RBs and the bits associated with the starting RB to reduce the number of bits from 9 to 8. In one aspect, the number of bits used in joint coding may be the same as that of communicating starting RB and the number RBs independently. When the system bandwidth is less than 5 MHz, a legacy LTE resource indication value (RIV) mapping may be used to signal the allocation of RBs to the UE 406. An RIV is a number that may be used to specify UL resource allocation to UE 406. Conventionally, a base station uses two values (i.e., number of RBs and starting RB) to indicate the resource allocation to a UE. However, with RIV, a base station may indicate the number of allocated RBs and allocated starting RB in a single value.

In a first aspect at 1002, the information may indicate that the allocated RBs are restricted to one of four 5 MHz subbands within a 20 MHz bandwidth. For example, referring to FIGS. 4A and 4B, the information may indicate that the allocation of the RBs is restricted to within one of the four 5 MHz subbands (e.g., subband$_0$, subband$_1$, subband$_2$, or subband$_3$). Each of the four 5 MHz subbands may include 25 RBs (e.g., RB$_0$-RB$_{24}$).

In a second aspect at 1002, the information associated with the RBs may indicate within which of the four 5 MHz subbands the RBs are allocated. In one configuration, the four 5 MHz subbands may be non-overlapping subbands within the 20 MHz bandwidth. For example, referring to FIGS. 4A and 4B, the information 405 transmitted by the base station 404 may include a joint coding (e.g., 8 bits) of the number of RBs and starting RB, and indicate within which of the four 5 MHz subbands the starting RB and the number of RBs are allocated. An illustration of four 5 MHz subbands 434 within a 20 MHz system bandwidth 432 is seen in FIG. 4B. In one aspect, the four 5 MHz subbands may be non-overlapping subbands (e.g., not shown in FIG. 4B) within the 20 MHz bandwidth. For example, assume that base station 404 allocates RB$_2$-RB$_{20}$ in subband$_0$ to UE 406. Here, the information 405 transmitted by the base station 404 may indicate that 19 RBs beginning with $RB_2$ in $subband_0$ are allocated to UE 406.

At 1004, the UE may determine RBs for use in transmitting at least one UL communication based on the information received from the base station. For example, referring to FIG. 4A, UE 406 may use the information 405 received from the base station 404 to determine 407 the allocated RBs and then transmit one or more UL communications 409 to the base station 404 using the allocated RBs.

In a first aspect at 1004, the UE may determine that the RBs may be restricted to a minimum number of subbands within sixteen 6 RB subbands. For example, referring to FIGS. 4A and 4B, base station 404 may restrict the RBs allocated to UE 406 to a single subband within the sixteen subbands 438 when the number of allocated RBs is less than or equal to 6 RBs. For example, assume that base station 404 allocates 3 RBs in $subband_2$ to UE 406. In this example, the starting RB may not be greater than $RB_3$ in $subband_2$ so that the allocated RBs do not spill into a second subband (e.g., $subband_3$). In addition, assume that the allocated RBs start with $RB_1$ in $subband_2$. Therefore, $RB_1$-$RB_3$ in $subband_2$ are allocated to UE 406. Here, the information 405 transmitted by base station 404 may indicate that 3 RBs starting with $RB_1$ in $subband_2$ are allocated to UE 406, and the UE 406 may use the information 405 to determine 407 that $RB_1$-$RB_3$ in $subband_2$ are allocated for UL communications.

In a second aspect at 1004, the UE may determine that the RBs may be restricted to a single subband when the number of allocated RBs is less than or equal 6 RBs. For example, referring to FIGS. 4A and 4B, base station 404 may restrict the RBs allocated to UE 406 to a single subband within the sixteen subbands 438 when the number of allocated RBs is less than or equal to 6 RBs. For example, assume that base station 404 allocates 3 RBs in $subband_2$ to UE 406. In this example, the starting RB may not be greater than $RB_3$ in $subband_2$ so that the allocated RBs do not spill into a second subband (e.g., $subband_3$). In addition, assume that the allocated RBs start with $RB_1$ in $subband_2$. Therefore, $RB_1$-$RB_3$ in $subband_2$ are allocated to UE 406. Here, the information 405 transmitted by base station 404 may indicate that 3 RBs starting with $RB_1$ in $subband_2$ are allocated to UE 406, and the UE 406 may use the information 405 to determine 407 that $RB_1$-$RB_3$ in $subband_2$ are allocated for UL communications.

In a third aspect at 1004, the UE may determine that the RBs may be restricted to two consecutive subbands when the number of allocated RBs is between 7 RBs and 12 RBs. For example, referring to FIGS. 4A and 4B, base station 404 may restrict the RBs allocated to UE 406 to two consecutive subbands within the sixteen subbands 438 when the number of allocated RBs is between 7 RBs and 12 RBs. For example, assume that base station 404 allocates 8 RBs across $suband_7$ and $subband_8$ to UE 406. In this example, the starting RB may not be greater than $RB_4$ in $subband_7$ so that the allocated RBs do not spill into a third subband (e.g., $subband_9$). In addition, assume that the allocated RBs start with $RB_3$ in $subband_7$. Therefore, $RB_3$-$RB_5$ in $subband_7$ and $RB_0$-$RB_4$ in $subband_8$ are allocated to UE 406. Here, the information 405 transmitted by base station 404 may indicate that 8 RBs starting with $RB_3$ in $subband_7$ are allocated to UE 406, and the UE 406 may use the information 405 to determine 407 that $RB_3$-$RB_5$ in $subband_7$ and $RB_0$-$RB_4$ in $subband_8$ are allocated for UL communications. UE 406 may transmit one or more UL communications 409 to the base station 404 using $RB_3$-$RB_5$ in $subband_7$ and $RB_0$-$RB_4$ in $subband_8$.

In a fourth aspect at 1004, the UE may determine that the RBs are restricted to three consecutive subbands when the number of allocated RBs is between 13 RBs and 18 RBs. For example, referring to FIGS. 4A and 4B, base station 404 may restrict the RBs allocated to UE 406 to three consecutive subbands within the sixteen subbands 438 when the number of RBs is between 13 RBs and 18 RBs. For example, assume that base station 404 allocates 14 RBs across $subband_{10}$, $subband_{11}$, and $subband_{12}$ to UE 406. In this example, the starting RB may not be later than $RB_4$ in $subband_{10}$ so that the allocated RBs do not spill into a fourth subband (e.g., $subband_{13}$). In addition, assume that the allocated RBs start with $RB_0$ in $subband_{10}$. Therefore, $RB_0$-$RB_5$ in $subband_{10}$, $RB_0$-$RB_5$ in $subband_{11}$, and $RB_0$-$RB_1$ in $subband_{12}$ are allocated to UE 406. Here, the information 405 transmitted by the base station 404 may indicate that 14 RBs starting with $RB_0$ in $subband_{10}$ are allocated to UE 406, and the UE 406 may use the information 405 to determine 407 that $RB_0$-$RB_5$ in $subband_{10}$, $RB_0$-$RB_5$ in $subband_{11}$, and $RB_0$-$RB_1$ in $subband_{12}$ are allocated for UL communications. UE 406 may transmit one or more UL communications 409 to the base station 404 using $RB_0$-$RB_5$ in $subband_{10}$, $RB_0$-$RB_5$ in $subband_{11}$, and $RB_0$-$RB_1$ in $subband_{12}$.

In a fifth aspect at 1004, the UE may determine that the RBs are restricted to four consecutive subbands when the number of allocated RBs is between 19 RBs and 24 RBs. For example, referring to FIGS. 4A and 4B, base station 404 may restrict the RBs allocated to UE 406 to four consecutive subbands within the sixteen subbands 438 when the number of allocated RBs is between 19 RBs and 24 RBs. For example, assume that base station 404 allocates 22 RBs across $subband_3$, $subband_4$, $subband_5$, and $subband_6$ to UE 406. In this example, the starting RB may not be later than $RB_2$ in $subband_3$ so that the allocated RBs do not spill into a fifth subband (e.g., $subband_7$). In addition, assume that the allocated RBs start with $RB_1$ in $subband_3$. Therefore, $RB_1$-$RB_5$ in $subband_3$, $RB_0$-$RB_5$ in $subband_4$, $RB_0$-$RB_5$ in $subband_5$, and $RB_0$-$RB_4$ in $subband_6$ are allocated to UE 406. Here, the information 405 transmitted by the base station 404 may indicate that 22 RBs starting with $RB_1$ in $subband_3$ are allocated to UE 406, and the UE 406 may use the information 405 to determine 407 that $RB_1$-$RB_5$ in $subband_3$, $RB_0$-$RB_5$ in $subband_4$, $RB_0$-$RB_5$ in $subband_5$, and $RB_0$-$RB_4$ in $subband_6$ are allocated for UL communications. UE 406 may transmit one or more UL communications 409 to the base station 404 using $RB_1$-$RB_5$ in $subband_3$, $RB_0$-$RB_5$ in $subband_4$, $RB_0$-$RB_5$ in $subband_5$, and $RB_0$-$RB_4$ in $subband_6$.

In a sixth aspect at 1004, the UE may determine that the RBs are restricted to four consecutive subbands and a spill over RB in another subband when the number of allocated RBs is 25 RBs. For example, referring to FIGS. 4A and 4B, base station 404 may restrict the RBs allocated to UE 406 to four consecutive subbands and a single spill over RB in a fifth subband when the number of RBs is 25 RBs. For example, assume that base station 404 allocates 25 RBs across $subband_7$, $subband_8$, $subband_9$, $subband_{10}$, and $subband_{11}$ to UE 406. In this example, the starting RB may not be later than $RB_0$ in $subband_7$ so that only one RB spills into $subband_{11}$. Therefore, $RB_0$-$RB_5$ in $subband_7$, $RB_0$-$RB_5$ in $subband_8$, $RB_0$-$RB_5$ in $subband_9$, $RB_0$-$RB_5$ in $subband_{10}$, and $RB_0$ in $subband_{11}$ are allocated to UE 406. Here, the information 405 transmitted by the base station 404 may indicate that 25 RBs starting with $RB_0$ in $subband_7$ are allocated to the UE 406, and the UE 406 may use the information 405 to determine 407 that $RB_0$-$RB_5$ in $subband_7$, $RB_0$-$RB_5$ in $subband_8$, $RB_0$-$RB_5$ in $subband_9$, $RB_0$-

$RB_5$ in subband$_{10}$, and $RB_0$ in subband$_{11}$ are allocated for UL communications. UE 406 may transmit one or more UL communications 409 to the base station 404 using $RB_0$-$RB_5$ in subband$_7$, $RB_0$-$RB_5$ in subband$_8$, $RB_0$-$RB_5$ in subband$_9$, $RB_0$-$RB_5$ in subband$_{10}$, and $RB_0$ in subband$_{11}$.

In a seventh aspect at 1004, the UE may determine the RBs may be restricted to two consecutive subbands in a plurality of subbands. In an aspect, a first subband of the two consecutive subbands may have an even numbered index. In one configuration, the plurality of subbands include eight 2 RB subbands when the number of allocated RBs is between 7 RBs and 12 RBs. In another configuration, the plurality of subbands includes four 25 RB subbands when the number of allocated RBs is between 13 RBs and 25 RBs. For example, referring to FIGS. 4A and 4B, base station 404 may restrict the allocation of the RBs to two consecutive subbands in the plurality of subbands. In addition, a first subband of the two consecutive subbands may be restricted to a subband with an even numbered index. By restricting the allocated RBs to two consecutive subbands beginning with an even indexed subband, all of the allocated RBs may fit within the system bandwidth. In one configuration, the RBs allocated to UE 406 may be in two consecutive subbands selected from a group of eight 3 MHz subbands. An illustration of eight 3 MHz subbands 436 within a 20 MHz system bandwidth 432 is seen in FIG. 4B. In another configuration, the RBs allocated to UE 406 may be in two consecutive subbands selected from a group of four 5 MHz subbands. An illustration of four 5 MHz subbands 434 within a 20 MHz system bandwidth 432 is seen in FIG. 4B.

At 1006, the UE may transmit the at least one uplink communication based on the information associated with the RBs. For example, referring to FIG. 4A, UE 406 may use the information 405 received from the base station 404 to determine 407 the allocated RBs and then transmit one or more UL communications 409 to the base station 404 using the allocated RBs.

Figure 11:
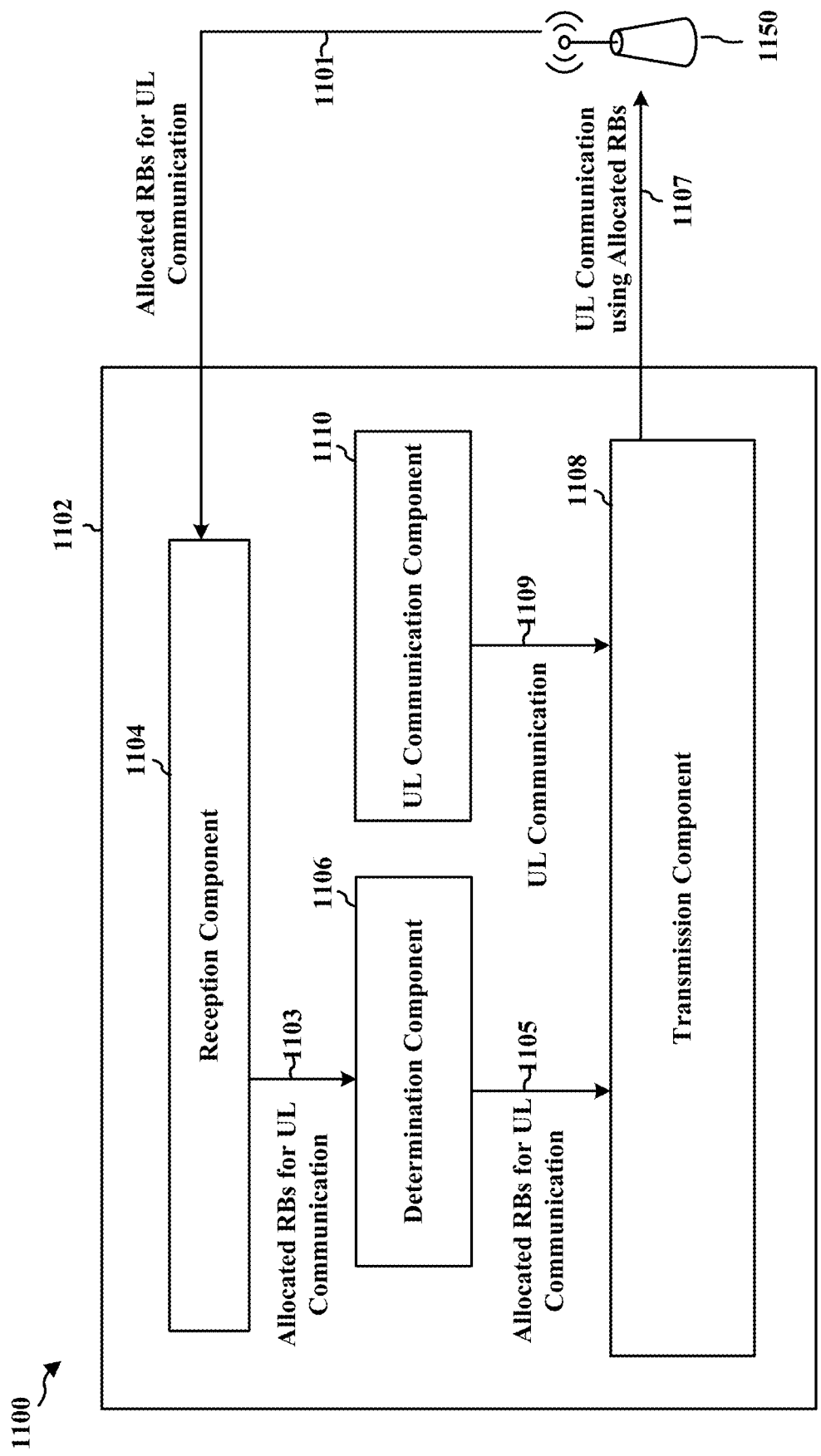
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE (e.g., UE 104, 350, 406, 506, 606, 850, 1450, 2050, the apparatus 1102', 1702/1702', 2302/2302') in communication with a base station 1150 (e.g., base station 102, 180, 404, 504, 604, 1750, 2350, eNB 310, the apparatus 802/802', 1402/1402', 2002/2002'). The apparatus may include a reception component 1104, a determination component 1106, a transmission component 1108, and a UL communication component 1110.

In certain configurations, the reception component 1104 may be configured to receive information 1101 associated with RBs allocated to the UE for use in transmitting at least one uplink communication to the base station 1150. In one aspect, the information may indicate a starting RB and a number of allocated RBs. In another aspect, the RBs may be restricted to a 5 MHz bandwidth. In a further aspect, the number of allocated RBs may be restricted to a multiple of $2^a \times 3^b \times 5^c$, where a, b, and c are each non-negative integers. In another aspect, the information associated with the RBs may include jointly coded information associated with the starting RB and the number of allocated RBs.

In certain aspects, the information 1101 may indicate that the allocated RBs are restricted to one of four 5 MHz subbands within a 20 MHz bandwidth. In certain other aspects, the information 1101 associated with the RBs may indicate within which of the four 5 MHz subbands the RBs are allocated. In one configuration, the four 5 MHz subbands may be non-overlapping subbands within the 20 MHz bandwidth.

In certain configurations, the reception component 1104 may be configured to send a signal 1103 associated with the allocated RBs to the determination component 1106.

In certain configurations, the determination component 1106 may be configured to determine RBs for use in transmitting at least one UL communication based on the information received from the base station 1150. In certain aspects, the determination component 1106 may be configured to determine that the RBs may be restricted to a minimum number of subbands within sixteen 6 RB subbands. In certain other aspects, the determination component 1106 may be configured to determine that the RBs may be restricted to a single subband when the number of allocated RBs is less than or equal 6 RBs. In certain other aspects, the determination component 1106 may be configured to determine that the RBs may be restricted to two consecutive subbands when the number of allocated RBs is between 7 RBs and 12 RBs. In certain other aspects, the determination component 1106 may be configured to determine that the RBs are restricted to three consecutive subbands when the number of allocated RBs is between 13 RBs and 18 RBs. In certain other aspects, the determination component 1106 may be configured to determine that the RBs are restricted to four consecutive subbands when the number of allocated RBs is between 19 RBs and 24 RBs. In certain other aspects, the determination component 1106 may be configured to determine that the RBs are restricted to four consecutive subbands and a spill over RB in another subband when the number of allocated RBs is 25 RBs. In certain other aspects, the determination component 1106 may be configured to determine the RBs may be restricted to two consecutive subbands in a plurality of subbands. In an aspect, a first subband of the two consecutive subbands may have an even numbered index. In one configuration, the plurality of subbands include eight 2 RB subbands when the number of allocated RBs is between 7 RBs and 12 RBs. In another configuration, the plurality of subbands includes four 25 RB subbands when the number of allocated RBs is between 13 RBs and 25 RBs. The determination component 1106 may be configured to send a signal 1105 associated with the allocated RBs for an uplink communication to the transmission component 1108.

In certain configurations, the UL communication component 1110 may be configured to generate a UL communication intended for the base station 1150. The UL communication component 1110 may send a signal 1109 associated with the UL communication to the transmission component 1108.

In certain configurations, the transmission component 1108 may be configured to transmit the at least one uplink communication 1107 based on the information associated with the RBs.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
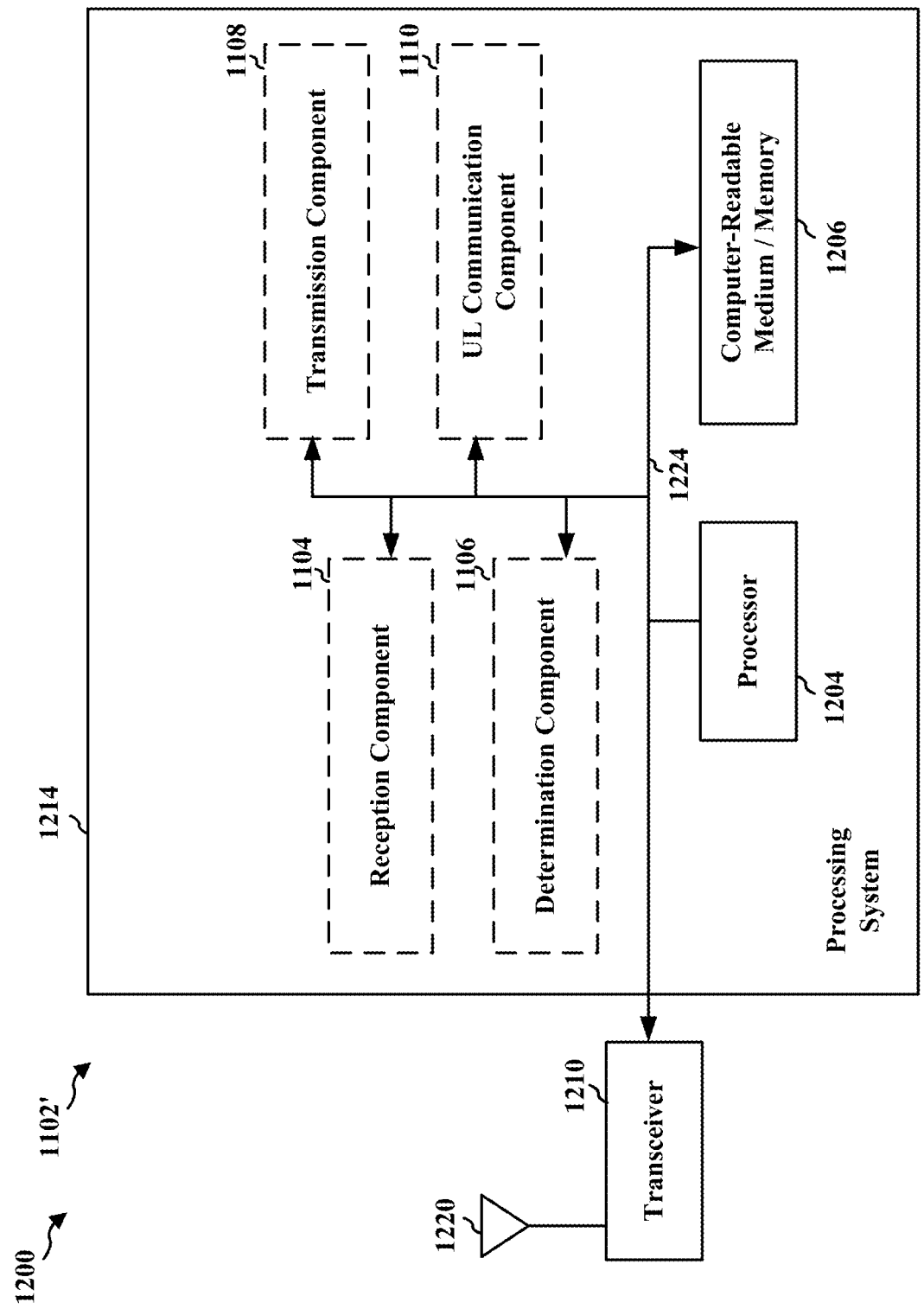
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In certain configurations, the apparatus 1102/1102' for wireless communication may include means for receiving information associated with RBs allocated to the UE for use in transmitting at least one uplink communication to a base station. In one aspect, the information may indicate a starting RB and a number of allocated RBs. In another aspect, the RBs may be restricted to a 5 MHz bandwidth. In a further aspect, the number of allocated RBs may be restricted to a multiple of $2^a \times 3^b \times 5^c$, where a, b, and c are each non-negative integers. In another aspect, the information associated with the RBs may include jointly coded information associated with the starting RB and the number of allocated RBs. In certain aspects, the information may indicate that the allocated RBs are restricted to one of four 5 MHz subbands within a 20 MHz bandwidth. In certain other aspects, the information associated with the RBs may indicate within which of the four 5 MHz subbands the RBs are allocated. In one configuration, the four 5 MHz subbands may be non-overlapping subbands within the 20 MHz bandwidth. In certain other configurations, the apparatus 1102/1102' for wireless communication may include means for determining RBs for use in transmitting at least one UL communication based on the information received from the base station. In certain implementations, the means for determining may be configured to determine that the RBs may be restricted to a minimum number of subbands within sixteen 6 RB subbands. In certain other implementations, the means for determining may be configured to determine that the RBs may be restricted to a single subband when the number of allocated RBs is less than or equal 6 RBs. In certain other implementations, the means for determining may be configured to determine that the RBs may be restricted to two consecutive subbands when the number of allocated RBs is between 7 RBs and 12 RBs. In certain other implementations, the means for determining may be configured to determine that the RBs are restricted to three consecutive subbands when the number of allocated RBs is between 13 RBs and 18 RBs. In certain other implementations, the means for determining may be configured to determine that the RBs are restricted to four consecutive subbands when the number of allocated RBs is between 19 RBs and 24 RBs. In certain other implementations, the means for determining may be configured to determine that the RBs are restricted to four consecutive subbands and a spill over RB in another subband when the number of allocated RBs is 25 RBs. In certain other implementations, the means for determining may be configured to determine the RBs may be restricted to two consecutive subbands in a plurality of subbands. In an aspect, a first subband of the two consecutive subbands may have an even numbered index. In one configuration, the plurality of subbands include eight 2 RB subbands when the number of allocated RBs is between 7 RBs and 12 RBs. In another configuration, the plurality of subbands includes four 25 RB subbands when the number of allocated RBs is between 13 RBs and 25 RBs. In certain configurations, the apparatus 1102/1102' for wireless communication may include means for transmitting the at least one uplink communication based on the information associated with the RBs. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
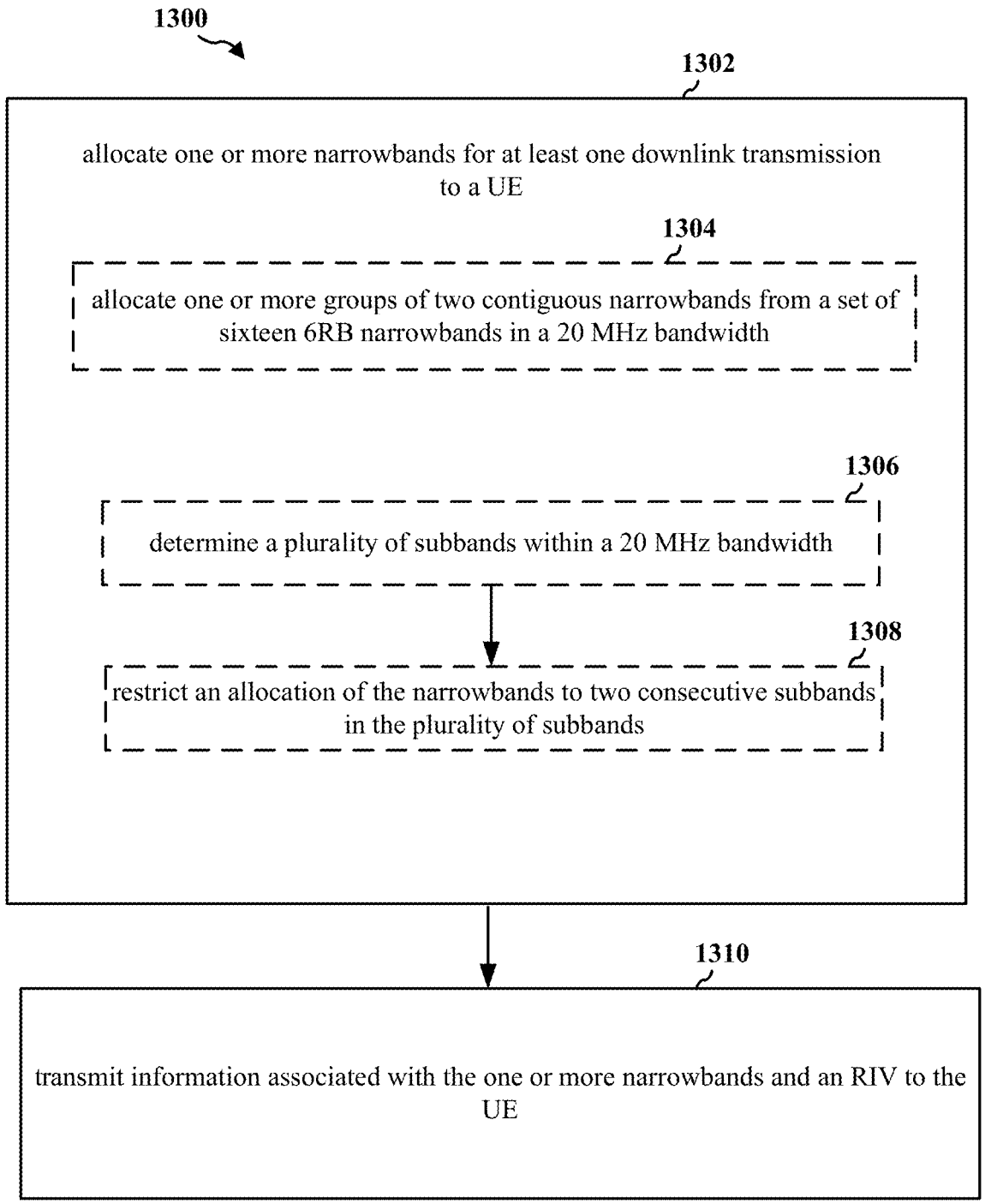
FIG. 13 is a flowchart of a method of wireless communication in accordance with certain aspects of the disclosure.

FIG. 13 is a flowchart 1300 of a method of wireless communication. The method may be performed by a base station (e.g., base station 102, 180, 404, 504, 604, 1150, 1750, 2350, eNB 310, the apparatus 802/802', 1402/1402', 2002/2002'). In FIG. 13, optional operations are indicated with dashed lines.

At 1302, the base station may allocate one or more narrowbands for at least one downlink transmission to a UE. In one aspect, the one or more narrowbands may be contained within a group of four contiguous narrowbands from a set of sixteen 6 RB narrowbands. For example, referring to FIG. 5, to enable narrowband communications that employ a larger channel bandwidth, the base station 504 may allocate RBs 511 across one or more subbands within a 20 MHz system bandwidth for DL communications with UE 506. When UE 506 is configured for narrowband communications with a maximum channel bandwidth of 5 MHz, the combination of subbands allocated by base station 504 may be contained to a group of four contiguous subbands selected from a set of sixteen 1.4 MHz subbands (e.g., see 438 in FIG. 4B). In other words, the allocation may be communicated to UE 506 in units of subbands and a common set of RBs within each subband. In one aspect, full flexibility of subband allocation (e.g., allocation of any of the subbands within the set of sixteen 1.4 MHz subbands) may be desirable. For example, assume that base station 504 allocates 4 RBs starting with $RB_1$ in $suband_7$, $subband_8$, $subband_9$, and $subband_{10}$ (e.g., see 438 in FIG. 4B) to UE 506. In other words, $RB_1$-$RB_5$ in each of $suband_7$, $subband_8$, $subband_9$, and $subband_{10}$ are allocated for DL communications. Here, the information 513 transmitted by base station 504 may include an RIV that indicates that 4 RBs starting with $RB_1$ in each of $subband_7$-$subband_{10}$ are allocated for DL communications.

At 1304, the base station may allocate one or more narrowbands by allocating one or more groups of two contiguous narrowbands from a set of sixteen 6 RB narrowbands in a 20 MHz bandwidth. In an aspect, the information associated with the one or more narrowbands may indicate which groups of two contiguous narrowbands are allocated to the UE. For example, referring to FIG. 5, when UE 506 is configured for narrowband communications using a 20 MHz channel bandwidth and the bandwidth used by base station 504 for DL communications is greater than 5 MHz (e.g., 10 MHz, 15 MHz, 20 MHz), subband allocation may be in groups of two contiguous subbands. Here, base station 504 may allocate 511 subbands by allocating one or more groups of two contiguous subbands from a set of sixteen 1.4 MHz subbands. The information 513 transmitted to the UE 506 may indicate the allocated groups of two contiguous subbands, an allocated common set of RBs in each subband, and a starting RB in each subband for DL communications. By indicating the allocation of subbands in groups of two, the number of bits used to indicate subband allocation may be reduced by half. In an aspect, information 513 may include joint coding of the RIV and the information associated with the allocated groups of two contiguous subbands. For example, assume that base station 504 allocates 4 RBs starting with $RB_1$ in each subband in subband $group_1$ (e.g., $suband_7$, $subband_8$) and subband $group_2$ (e.g., $subband_9$, $subband_{10}$) to UE 506 (e.g., see 438 in FIG. 4B). In other words, $RB_1$-$RB_4$ in each of $suband_7$, $subband_8$, $subband_9$, and $subband_{10}$ are allocated for DL communications. Here, the information 513 transmitted by the base station 504 may include an RIV that indicates that 4 RBs starting with $RB_1$ in each subband in subband $group_1$ and subband $group_2$ of $subband_7$-$subband_{10}$ are allocated for DL communications, and the UE 506 may use the information 513 to determine 515 that $RB_1$-$RB_4$ in each of $suband_7$, $subband_8$, $subband_9$, and $subband_{10}$ are allocated for DL communications 519. UE 506 may monitor 517 $RB_1$-$RB_4$ in each of $suband_7$, $subband_8$, $subband_9$, and $subband_{10}$ for the DL communications 519 from base station 404.

At 1306, the base station may allocate the narrowbands by determining a plurality of subbands within a 20 MHz bandwidth. In one aspect, the plurality of subbands may include four subbands. In another aspect, the four 5 MHz subbands are non-overlapping subbands within the 20 MHz bandwidth. For example, referring to FIG. 5, when UE 506 is configured for narrowband communications with a 20 MHz channel bandwidth and the DL channel bandwidth used by base station 504 is less than or equal to 5 MHz, the resource allocation mapping described supra with respect to a UE enabled with a 5 MHz DL channel bandwidth may be reused. Alternatively, when UE 506 is configured for narrowband communications using a 20 MHz channel bandwidth and the bandwidth used by base station 504 for DL communications is greater than 5 MHz (e.g., 10 MHz, 15 MHz, 20 MHz), subband allocation may be in groups of two contiguous subbands. Here, base station 504 may allocate 511 subbands by allocating one or more groups of two contiguous subbands from a set of sixteen 1.4 MHz subbands. The information 513 transmitted to the UE 506 may indicate the allocated groups of two contiguous subbands, an allocated common set of RBs in each subband, and a starting RB in each subband for DL communications. By indicating the allocation of subbands in groups of two, the number of bits used to indicate subband allocation may be reduced by half. In an aspect, information 513 may include joint coding of the RIV and the information associated with the allocated groups of two contiguous subbands. For example, assume that base station 504 allocates 4 RBs starting with $RB_1$ in each subband in subband $group_1$ (e.g., $suband_7$, $subband_8$) and subband $group_2$ (e.g., $subband_9$, $subband_{10}$) to UE 506 (e.g., see 438 in FIG. 4B). In other words, $RB_1$-$RB_4$ in each of $suband_7$, $subband_8$, $subband_9$, and $subband_{10}$ are allocated for DL communications. Here, the information 513 transmitted by the base station 504 may include an RIV that indicates that 4 RBs starting with $RB_1$ in each subband in subband $group_1$ and subband $group_2$ of $subband_7$-$subband_{10}$ are allocated for DL communications, and the UE 506 may use the information 513 to determine 515 that $RB_1$-$RB_4$ in each of $suband_7$, $subband_8$, $subband_9$, and $subband_{10}$ are allocated for DL communications 519. UE 506 may monitor 517 $RB_1$-$RB_4$ in each of $suband_7$, $subband_8$, $subband_9$, and $subband_{10}$ for the DL communications 519 from base station 404.

At 1308, the base station may allocate the one or more narrowbands by restricting an allocation of the narrowbands to two consecutive subbands in the plurality of subbands. In an aspect, a first subband of the two consecutive subbands may have an even numbered index. In one aspect, the information transmitted to the UE may indicate within which of the four 5 MHz subbands the common starting RB and the common number of RBs are allocated. For example, referring to FIG. 5, when UE 506 is configured for narrowband communications using a 20 MHz channel bandwidth and the bandwidth used by base station 504 for DL communications is greater than 5 MHz (e.g., 10 MHz, 15 MHz, 20 MHz), subband allocation may be in groups of two contiguous subbands. Here, base station 504 may allocate 511 subbands by allocating one or more groups of two contiguous subbands from a set of sixteen 1.4 MHz subbands.

At 1310, the base station may transmit information associated with the one or more narrowbands and an RIV to the UE. In an aspect, the RIV may indicate a common starting RB and a common set of RBs allocated for the at least one downlink transmission in each of the one or more narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV may include a subset of all possible valid combinations of starting RBs and number of RBs for at least one of the one or more narrowbands. In a further aspect, the information associated with the one or more narrowbands may indicate which narrowbands within the group of four contiguous narrowbands are allocated to the UE. Further, the RIV and the information associated with the one or more narrowbands may be jointly coded and transmitted to the UE. For example, referring to FIG. 5, base station 404 may transmit information 513 (e.g., DCI) associated with the allocated subbands and an RIV to the UE 506 that indicate which subbands and which RBs within the subbands the UE 506 should monitor for one or more DL communications. In one aspect, base station 404 may use a same RIV for each of the subbands allocated for the DL communications. The information 513 transmitted to the UE 506 may indicate the allocated groups of two contiguous subbands, an allocated common set of RBs in each subband, and a starting RB in each subband for DL communications. By indicating the allocation of subbands in groups of two, the number of bits used to indicate subband allocation may be reduced by half. In an aspect, information 513 may include joint coding of the RIV and the information associated with the allocated groups of two contiguous subbands.

In a first configuration at 1310, the RIV for each of the subbands may include all possible valid combinations of starting RBs and number of RBs that may be allocated for DL communications in that particular subband. When full mobility and channel state information (CSI) feedback are supported by UE 506 (e.g., coverage enhancement (CE) mode A), the information 513 may use 5 bits to indicate which subbands and which RBs in each of the subbands are allocated for DL communications. When UE 506 supports limited mobility and/or does not support CSI feedback (e.g., CE mode B), the information 513 may use 1 bit to indicate which subbands and which RBs in each of the subbands are allocated for DL communications. The first configuration may be employed when the channel bandwidth is less than or equal to 20 MHz when the UE 506 is operating in CE mode A. The first configuration may also be employed when the channel bandwidth is less than or equal to 5 MHz when UE 506 is operating in CE mode B.

In a second configuration at 1310, the RIV for each of the subbands may include a subset of all possible valid combinations of starting RBs and number of RBs that may be allocated for DL communications in that subband to reduce the RIV payload. In an aspect, the subset include less than all possible valid combinations. For CE mode A, base station 504 may allocate the following combinations for number of RB, starting RB: [{1,0}, {1,1}, {1,2}, {1,3}, {1,4}, {1,5}, {2,0}, {2,2}, {2,4}, {3,0}, {3,3}, {4,0}, {4,2}, {5,0}, {5,1}, {6,1}] and reduce RIV payload by 1 bit compared to legacy narrowband communication. Similarly for CE mode B, base station 504 may allocate all 6 RBs in each subband and include a bit for RIV in the information 513 transmitted to UE 506.

Figure 14:
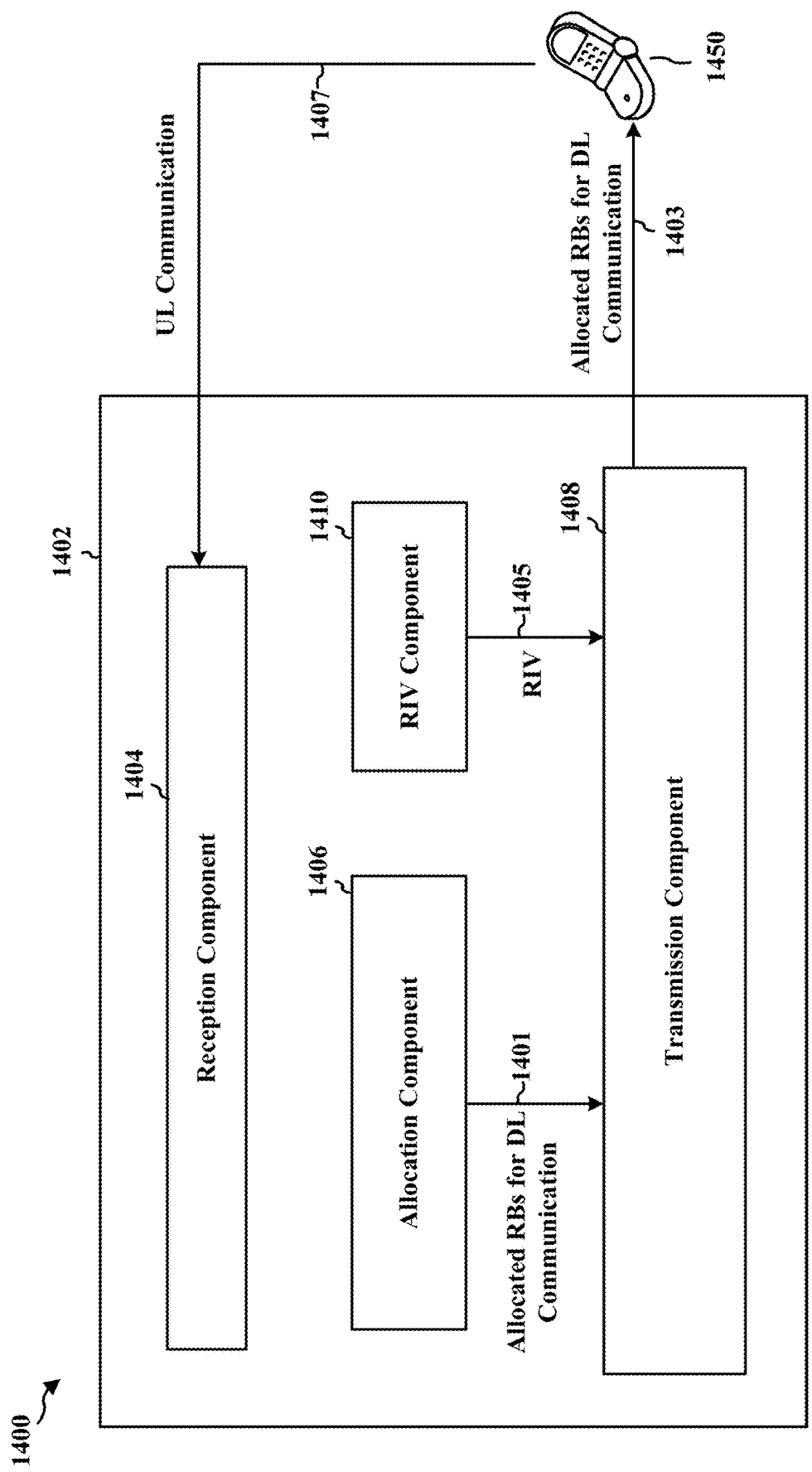
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be abase station (e.g., base station 102, 180, 404, 504, 604, 1150, 1750, 2350, eNB 310, the apparatus 802/802', 1402', 2002/2002') in communication with a UE 1450 (e.g., UE 104, 350, 406, 506, 606, 850, 2050, the apparatus 1102/1102', 1702/1702', 2302/2302'). The apparatus may include a reception component 1404, an allocation component 1406, a transmission component 1408, and an RIV component 1410.

In certain configurations, the allocation component 1406 may be configured to allocate one or more narrowbands for at least one downlink transmission to the UE 1450. In one aspect, the one or more narrowbands may be contained within a group of four contiguous narrowbands from a set of sixteen 6 RB narrowbands. In certain other configurations, the allocation component 1406 may be configured to allocate one or more narrowbands by allocating one or more groups of two contiguous narrowbands from a set of sixteen 6 RB narrowbands in a 20 MHz bandwidth. In an aspect, the information associated with the one or more narrowbands may indicate which groups of two contiguous narrowbands are allocated to the UE 1450 In certain other configurations, the allocation component 1406 may be configured to allocate the narrowbands by determining a plurality of subbands within a 20 MHz bandwidth. In certain other configurations, the allocation component 1406 may be configured to allocate the one or more narrowbands by restricting an allocation of the narrowbands to two consecutive subbands in the plurality of subbands. In an aspect, a first subband of the two consecutive subbands may have an even numbered index.

In certain configurations, the allocation component 1406 may be configured to send a signal 1401 associated with the allocated RBs for the downlink transmission to the transmission component 1408.

In certain configurations, the RIV component 1410 may be configured to generate an RIV that indicates a common starting RB and a common set of RBs allocated for the at least one downlink transmission in each of the one or more narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV may include a subset of all possible valid combinations of starting RBs and number of RBs for at least one of the one or more narrowbands. In a further aspect, the information associated with the one or more narrowbands may indicate which narrowbands within the group of four contiguous narrowbands are allocated to the UE. Further, the RIV and the information associated with the one or more narrowbands may be jointly coded and transmitted to the UE 1450. The RIV component 1410 may be configured to send a signal 1405 associated with the RIV to the transmission component 1408.

In certain configurations, the transmission component 1408 may be configured to transmit information 1403 associated with the one or more allocated narrowbands and the RIV to the UE 1450. In an aspect, the RIV may indicate a common starting RB and a common set of RBs allocated for the at least one downlink transmission in each of the one or more narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV may include a subset of all possible valid combinations of starting RBs and number of RBs for at least one of the one or more narrowbands. In a further aspect, the information associated with the one or more narrowbands may indicate which narrowbands within the group of four contiguous narrowbands are allocated to the UE. Further, the RIV and the information associated with the one or more narrowbands may be jointly coded and transmitted to the UE 1450. In certain aspects, the RIV for each of the subbands may include all possible valid combinations of starting RBs and number of RBs that may be allocated for DL communications in that particular subband. In certain other aspects, the RIV for each of the subbands may include a subset of all possible valid combinations of starting RBs and number of RBs that may be allocated for DL communications in that subband to reduce the RIV payload. In one aspect, the information transmitted to the UE indicates within which of the four 5 MHz subbands the common starting RB and the common number of RBs are allocated. In another aspect, the four 5 MHz subbands may be non-overlapping subbands within the 20 MHz bandwidth.

In certain configurations, the reception component 1404 may be configured to receive one or more UL communications 1407 from the UE 1450.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
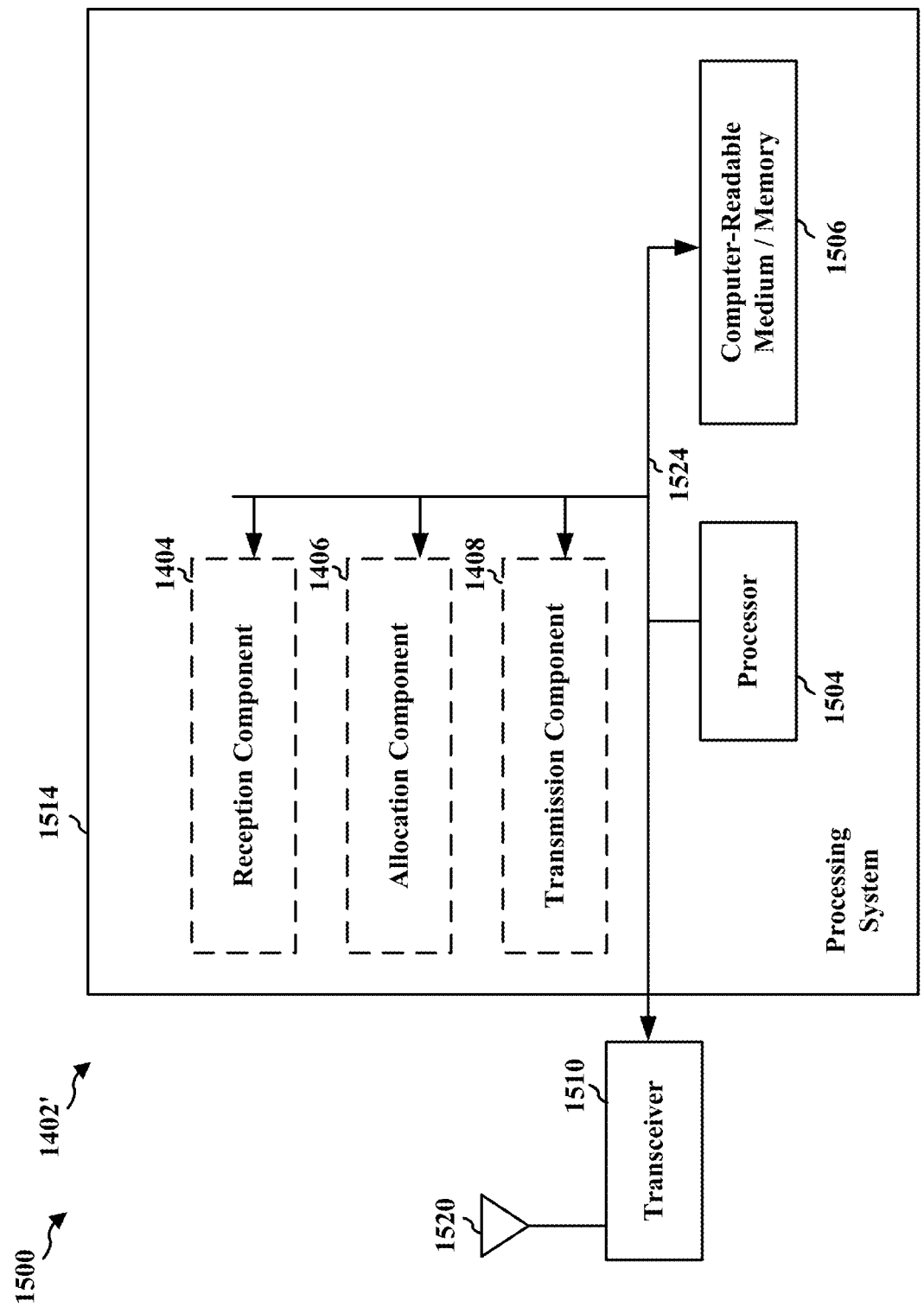
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1408, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375.

In certain configurations, the apparatus 1402/1402' for wireless communication may include means for allocating one or more narrowbands for at least one downlink transmission to a UE. In one aspect, the one or more narrowbands may be contained within a group of four contiguous narrowbands from a set of sixteen 6 RB narrowbands. In certain aspects, the means for allocating the one or more narrowbands may be configured to allocate one or more groups of two contiguous narrowbands from a set of sixteen 6 RB narrowbands in a 20 MHz bandwidth. In an aspect, the information associated with the one or more narrowbands may indicate which groups of two contiguous narrowbands are allocated to the UE. In certain aspects, the means for allocating the one or more narrowbands may be configured to determining a plurality of subbands within a 20 MHz bandwidth. In one aspect, the plurality of subbands may include eight 12 RB subbands (e.g., narrowbands) when the number of RBs allocated to the UE is between 7 RBs and 12 RBs. In another aspect, the plurality of subbands may include four 25 RB subbands (e.g., narrowbands) when the number of RBs allocated to the UE is between 13 RBs and 25 RBs. In certain other aspects, the means for allocating the one or more narrowbands may be configured to restrict an allocation of the narrowbands to two consecutive subbands in the plurality of subbands. In an aspect, a first subband of the two consecutive subbands may have an even numbered index. In certain other configurations, the apparatus 1402/1402' for wireless communication may include means for transmitting information associated with the one or more narrowbands and an RIV to the UE. In an aspect, the RIV may indicate a common starting RB and a common set of RBs allocated for the at least one downlink transmission in each of the one or more narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV may include a subset of all possible valid combinations of starting RBs and number of RBs for at least one of the one or more narrowbands. In a further aspect, the information associated with the one or more narrowbands may indicate which narrowbands within the group of four contiguous narrowbands are allocated to the UE. Further, the RIV and the information associated with the one or more narrowbands may be jointly coded and transmitted to the UE. In certain aspects, the RIV for each of the subbands may include all possible valid combinations of starting RBs and number of RBs that may be allocated for DL communications in that particular subband. In certain other aspects, the RIV for each of the subbands may include a subset of all possible valid combinations of starting RBs and number of RBs that may be allocated for DL communications in that subband to reduce the RIV payload. In an aspect, the subset include less than all possible valid combinations. In one aspect, the information transmitted to the UE may indicate within which of the four 5 MHz subbands the common starting RB and the common number of RBs are allocated. In another aspect, the four 5 MHz subbands may be non-overlapping subbands within the 20 MHz bandwidth. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
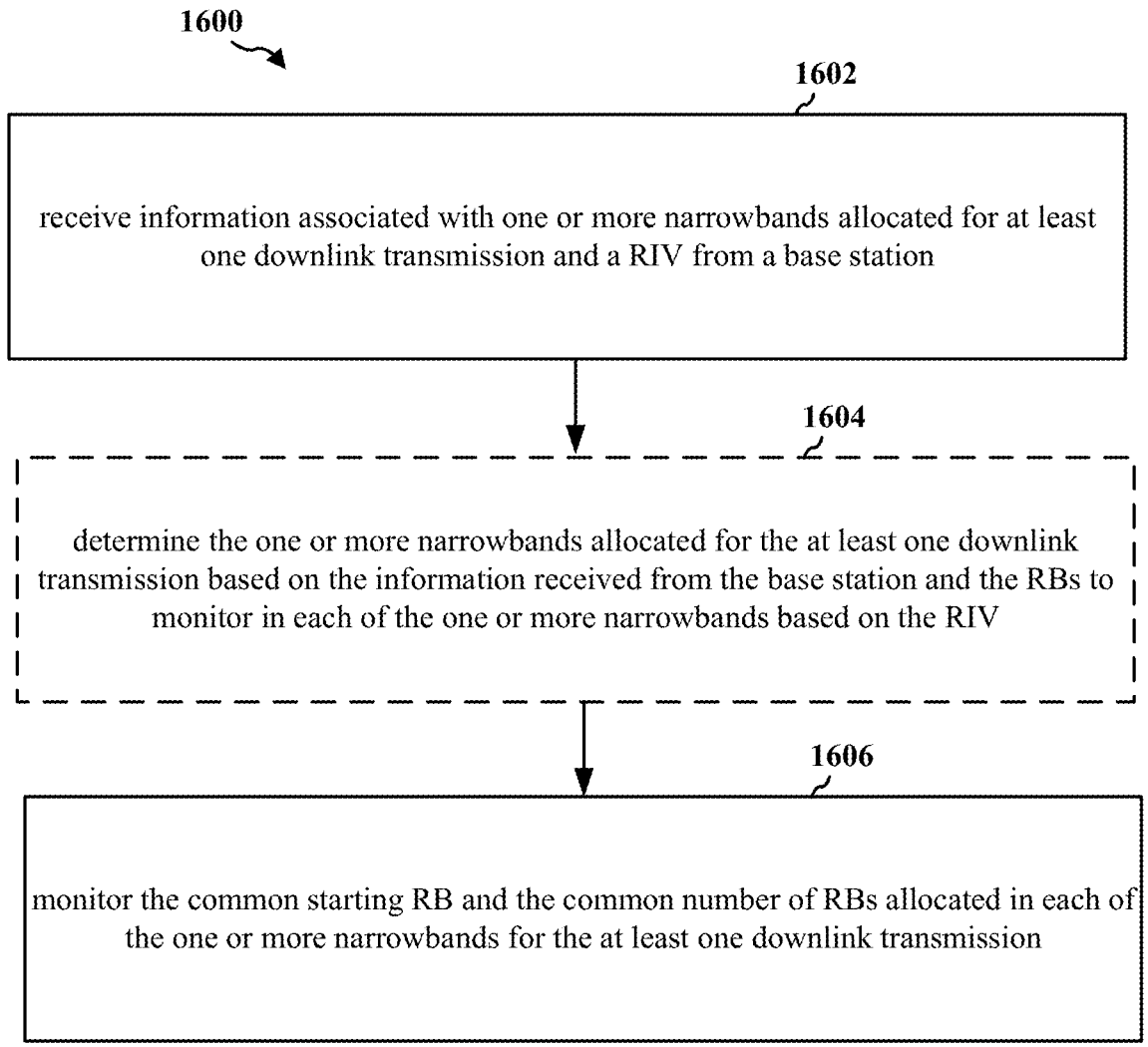
FIG. 16 is a flowchart of a method of wireless communication in accordance with certain aspects of the disclosure.

FIG. 16 is a flowchart 1600 of a method of wireless communication. The method may be performed by a UE (e.g., UE 104, 350, 406, 506, 606, 850, 1450, 2050, the apparatus 1102/1102', 1702/1702', 2302/2302'). In one aspect, the UE may be an NB-IoT device and/or an eMTC device. In FIG. 16, optional operations are indicated with dashed lines.

At 1602, the UE may receive information associated with one or more narrowbands allocated for at least one downlink transmission and an RIV from a base station. In an aspect, the RIV may indicate a common starting RB and a common set of RBs allocated in each of the one or more narrowbands. In one aspect, the one or more narrowbands may be contained within a group of four contiguous narrowbands from a set of sixteen 6 RB narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV includes a subset of all possible valid combinations of starting RBs and number of RBs for at least one of the one or more narrowbands. Further, the RIV and the information associated with the one or more narrowbands received by the UE may be jointly coded. For example, referring to FIG. 5, to enable narrowband communications that employ a larger channel bandwidth, the base station 504 may allocate RBs 511 across one or more subbands within a 20 MHz system bandwidth for DL communications with UE 506. When UE 506 is configured for narrowband communications with a maximum channel bandwidth of 5 MHz, the combination of subbands allocated by base station 504 may be contained to a group of four contiguous subbands selected from a set of sixteen 1.4 MHz subbands (e.g., see 438 in FIG. 4B). In other words, the allocation may be communicated to UE 506 in units of subbands and a common set of RBs within each subband. In one aspect, full flexibility of subband allocation (e.g., allocation of any of the subbands within the set of sixteen 1.4 MHz subbands) may be desirable. For example, assume that base station 504 allocates 4 RBs starting with $RB_1$ in $suband_7$, $subband_8$, $subband_9$, and $subband_{10}$ (e.g., see 438 in FIG. 4B) to UE 506. In other words, $RB_1$-$RB_5$ in each of $suband_7$, $subband_8$, $subband_9$, and $subband_{10}$ are allocated for DL communications. Here, the information 513 transmitted by base station 504 may include an RIV that indicates that 4 RBs starting with $RB_1$ in each of $subband_7$-$subband_{10}$ are allocated for DL communications. Still referring to FIG. 5, when UE 506 is configured for narrowband communications using a 20 MHz channel bandwidth and the bandwidth used by base station 504 for DL communications is greater than 5 MHz (e.g., 10 MHz, 15 MHz, 20 MHz), subband allocation may be in groups of two contiguous subbands. Here, base station 504 may allocate 511 subbands by allocating one or more groups of two contiguous subbands from a set of sixteen 1.4 MHz subbands. The information 513 received by the UE 506 may indicate the allocated groups of two contiguous subbands, an allocated common set of RBs in each subband, and a starting RB in each subband for DL communications. By indicating the allocation of subbands in groups of two, the number of bits used to indicate subband allocation may be reduced by half. In an aspect, information 513 may include joint coding of the RIV and the information associated with the allocated groups of two contiguous subbands. For example, assume that base station 504 allocates 4 RBs starting with $RB_1$ in each subband in subband $group_1$ (e.g., $suband_7$, $subband_8$) and subband $group_2$ (e.g., $subband_9$, $subband_{10}$) to UE 506 (e.g., see 438 in FIG. 4B). In other words, $RB_1$-$RB_4$ in each of $suband_7$, $subband_8$, $subband_9$, and $subband_{10}$ are allocated for DL communications. Here, the information 513 received by the UE 506 may include an RIV that indicates that 4 RBs starting with $RB_1$ in each subband in subband $group_1$ and subband $group_2$ of $subband_7$-$subband_{10}$ are allocated for DL communications, and the UE 506 may use the information 513 to determine 515 that $RB_1$-$RB_4$ in each of $suband_7$, $subband_8$, $subband_9$, and $subband_{10}$ are allocated for DL communications 519. UE 506 may monitor 517 $RB_1$-$RB_4$ in each of $suband_7$, $subband_8$, $subband_9$, and $subband_{10}$ for the DL communications 519 from base station 404.

At 1604, the UE may determine the one or more narrowbands allocated for the at least one downlink transmission based on the information received from the base station and the RBs to monitor in each of the one or more narrowbands based on the RIV. In one aspect, the UE may determine that the one or more narrowbands are contained within a group of four contiguous narrowbands from a set of sixteen 6 RB narrowbands. In another aspect, the UE may determine that the information associated with the one or more narrowbands indicates which narrowbands within the group of four contiguous narrowbands are allocated to the UE. In a further aspect, the UE may determine that the one or more narrowbands include one or more groups of two contiguous narrowbands from a set of sixteen 6 RB narrowbands in a 20 MHz bandwidth. Still further, the UE may determine that the information associated with the one or more narrowbands indicates which groups of contiguous narrowbands are allocated to the UE. In one aspect, the information transmitted to the UE may indicate within which of the four 5 MHz subbands the common starting RB and the common number of RBs are allocated. In another aspect, the four 5 MHz subbands may be non-overlapping subbands within the 20 MHz bandwidth.

For example, referring to FIG. 5, assume that base station 504 allocates 4 RBs starting with $RB_1$ in $suband_7$, $subband_8$, $subband_9$, and $subband_{10}$ (e.g., see 438 in FIG. 4B) to UE 506. In other words, $RB_1$-$RB_5$ in each of $suband_7$, $subband_8$, $subband_9$, and $subband_{10}$ are allocated for DL communications. Here, the information 513 received by UE 506 may include an RIV that indicates that 4 RBs starting with $RB_1$ in each of $subband_7$-$subband_{10}$ are allocated for DL communications, and the UE 506 may use the information 513 to determine 515 that $RB_1$-$RB_5$ in each of $suband_7$, $subband_8$, $subband_9$, and $subband_{10}$ are allocated for DL communications 519. UE 506 may monitor 517 $RB_1$-$RB_5$ in each of $suband_7$, $subband_8$, $subband_9$, and $subband_{10}$ for the DL communications 519 from base station 404. Alternatively, referring to FIG. 5, assume that base station 504 allocates 4 RBs starting with $RB_1$ in each subband in subband $group_1$ (e.g., $suband_7$, $subband_8$) and subband $group_2$ (e.g., $subband_9$, $subband_{10}$) to UE 506 (e.g., see 438 in FIG. 4B). In other words, $RB_1$-$RB_4$ in each of $suband_7$, $subband_8$, $subband_9$, and $subband_{10}$ are allocated for DL communications. Here, the information 513 received by the UE 506 may include an RIV that indicates that 4 RBs starting with $RB_1$ in each subband in subband $group_1$ and subband $group_2$ of $subband_7$-$subband_{10}$ are allocated for DL communications, and the UE 506 may use the information 513 to determine 515 that $RB_1$-$RB_4$ in each of $suband_7$, $subband_8$, $subband_9$, and $subband_{10}$ are allocated for DL communications 519.

UE 506 may monitor 517 RB$_1$-RB$_4$ in each of suband$_7$, subband$_8$, subband$_9$, and subband$_{10}$ for the DL communications 519 from base station 404.

At 1606, the UE may monitor the common starting RB and the common number of RBs allocated in each of the one or more narrowbands for the at least one downlink transmission. For example, referring to FIG. 5, UE 506 may monitor 517 RB$_1$-RB$_5$ in each of suband$_7$, subband$_8$, subband$_9$, and subband$_{10}$ for the DL communications 519 from base station 404. UE 506 may monitor 517 RB$_1$-RB$_4$ in each of suband$_7$, subband$_8$, subband$_9$, and subband$_{10}$ for the DL communications 519 from base station 404.

Figure 17:
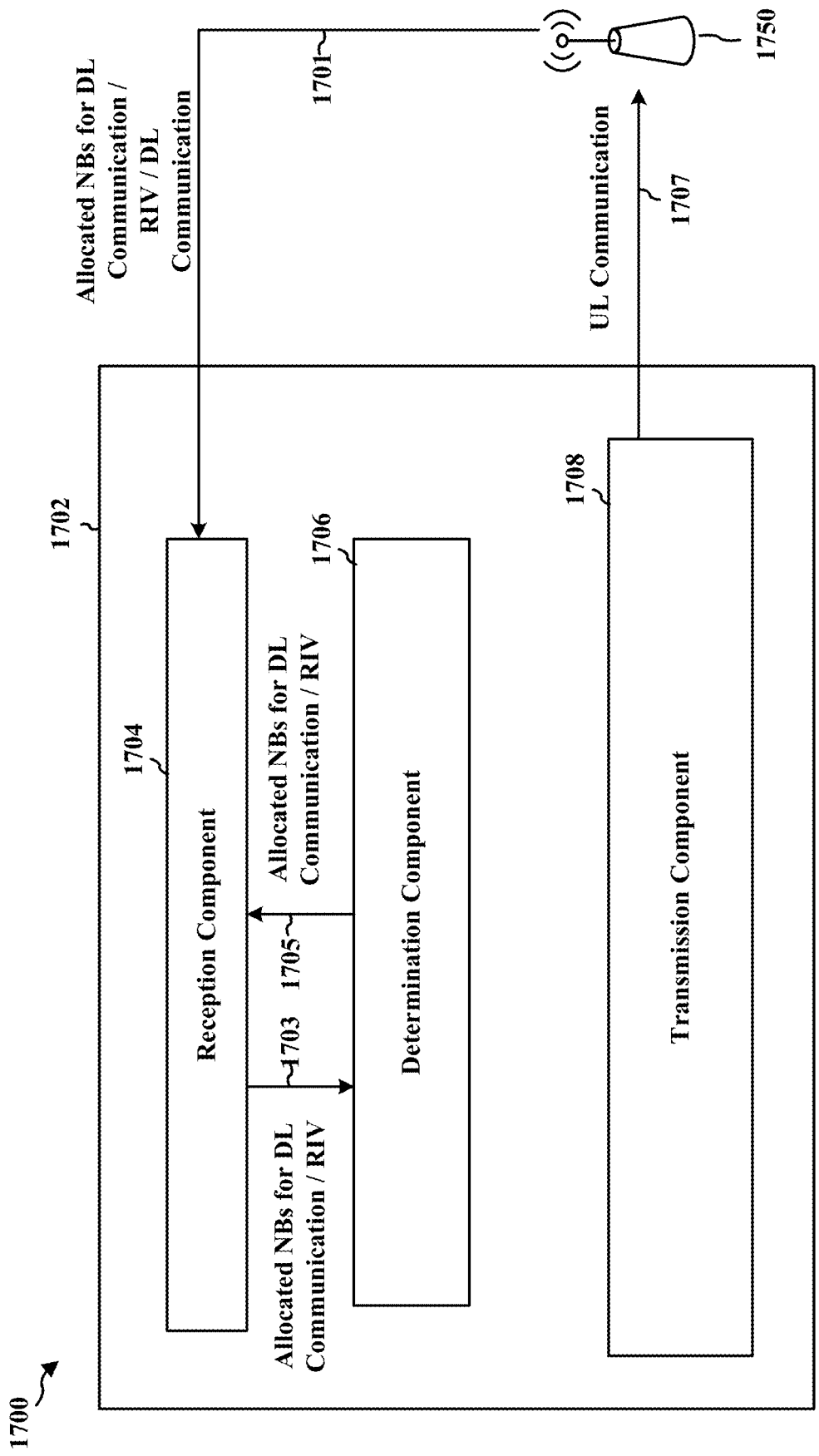
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a UE (e.g., UE 104, 350, 406, 506, 606, 850, 1450, 2050, the apparatus 1102/1102', 1702', 2302/2302') in communication with a base station 1750 (e.g., base station 102, 180, 404, 504, 604, 1150, 2350, eNB 310, the apparatus 802/802', 1402/1402', 2002/2002'). The apparatus may include a reception component 1704, a determination component 1706, and a transmission component 1708.

In certain configurations, the reception component 1704 may be configured to receive information 1701 associated with one or more narrowbands allocated for at least one downlink transmission and an RIV from the base station 1750. In an aspect, the RIV may indicate a common starting RB and a common set of RBs allocated in each of the one or more narrowbands. In one aspect, the one or more narrowbands may be contained within a group of four contiguous narrowbands from a set of sixteen 6 RB narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV includes a subset of all possible valid combinations of starting RBs and number of RBs for at least one of the one or more narrowbands. Further, the RIV and the information associated with the one or more narrowbands received by the UE may be jointly coded. The reception component 1704 may be configured to send a signal 1703 associated with the information received from the base station 1750 to the determination component 1706.

In certain configurations, the determination component 1706 may be configured to determine the one or more narrowbands allocated for the at least one downlink transmission based on the information received from the base station and the RBs to monitor in each of the one or more narrowbands based on the RIV. In one aspect, the determination component 1706 may be configured to determine that the one or more narrowbands are contained within a group of four contiguous narrowbands from a set of sixteen 6 RB narrowbands. In another aspect, the determination component 1706 may be configured to determine that the information associated with the one or more narrowbands indicates which narrowbands within the group of four contiguous narrowbands are allocated for the downlink communication. In a further aspect, the determination component 1706 may be configured to determine that the one or more narrowbands include one or more groups of two contiguous narrowbands from a set of sixteen 6 RB narrowbands in a 20 MHz bandwidth. Still further, the determination component 1706 may be configured to determine that the information associated with the one or more narrowbands indicates which groups of contiguous narrowbands are allocated for the downlink communication. In one aspect, the information transmitted to the UE may indicate within which of the four 5 MHz subbands the common starting RB and the common number of RBs are allocated. In another aspect, the four 5 MHz subbands may be non-overlapping subbands within the 20 MHz bandwidth. The determination component 1706 may be configured to send a signal 1705 associated with the narrowbands allocated for the downlink communication and/or the RIV to the reception component 1704.

In certain configurations, the reception component 1704 may be configured to monitor the common starting RB and the common number of RBs allocated in each of the one or more narrowbands for the at least one downlink transmission 1701.

In certain configurations, the transmission component 1708 may be configured to transmit one or more uplink communications 1707 to the base station 1750.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
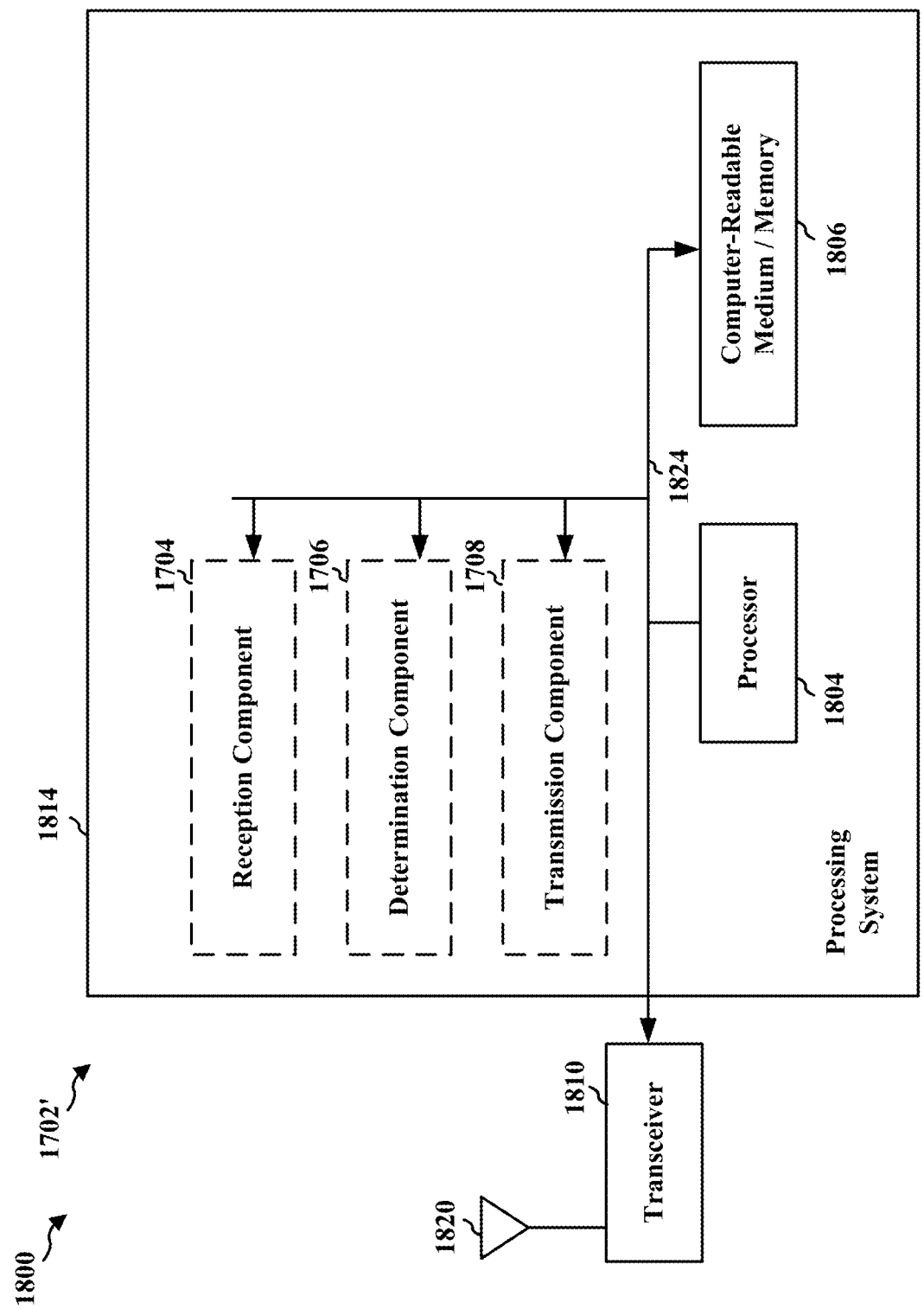
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1708, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359.

In certain configurations, the apparatus 1702/1702' for wireless communication may include means for receiving information associated with one or more narrowbands allocated for at least one downlink transmission and an RIV from a base station. In an aspect, the RIV may indicate a common starting RB and a common set of RBs allocated in each of the one or more narrowbands. In one aspect, the one or more narrowbands may be contained within a group of four contiguous narrowbands from a set of sixteen 6 RB narrowbands. In another aspect, a same RIV may be used for each of the one or more narrowbands allocated for the at least one downlink transmission. In a further aspect, the RIV may include all possible valid combinations of starting RBs and number of RBs for at least one of the one or more narrowbands. In another aspect, the RIV includes a subset of all possible valid combinations of starting RBs and number of RBs for at least one of the one or more narrowbands. Further, the RIV and the information associated with the one or more narrowbands received by the UE may be jointly coded. In certain configurations, the apparatus 1702/1702' for wireless communication may include means for determining the one or more narrowbands allocated for the at least one downlink transmission based on the information received from the base station and the RBs to monitor in each of the one or more narrowbands based on the RIV. In one aspect, the means for determining may be configured to determine that the one or more narrowbands are contained within a group of four contiguous narrowbands from a set of sixteen 6 RB narrowbands. In another aspect, the means for determining may be configured to determine that the information associated with the one or more narrowbands indicates which narrowbands within the group of four contiguous narrowbands are allocated to the UE. In a further aspect, the means for determining may be configured to determine that the one or more narrowbands include one or more groups of two contiguous narrowbands from a set of sixteen 6 RB narrowbands in a 20 MHz bandwidth. Still further, the means for determining may be configured to determine that the information associated with the one or more narrowbands indicates which groups of contiguous narrowbands are allocated to the UE. In certain other configurations, the apparatus 1702/1702' for wireless communication may include means for monitoring the common starting RB and the common number of RBs allocated in each of the one or more narrowbands for the at least one downlink transmission. In one aspect, the information transmitted to the UE may indicate within which of the four 5 MHz subbands the common starting RB and the common number of RBs are allocated. In another aspect, the four 5 MHz subbands may be non-overlapping subbands within the 20 MHz bandwidth. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
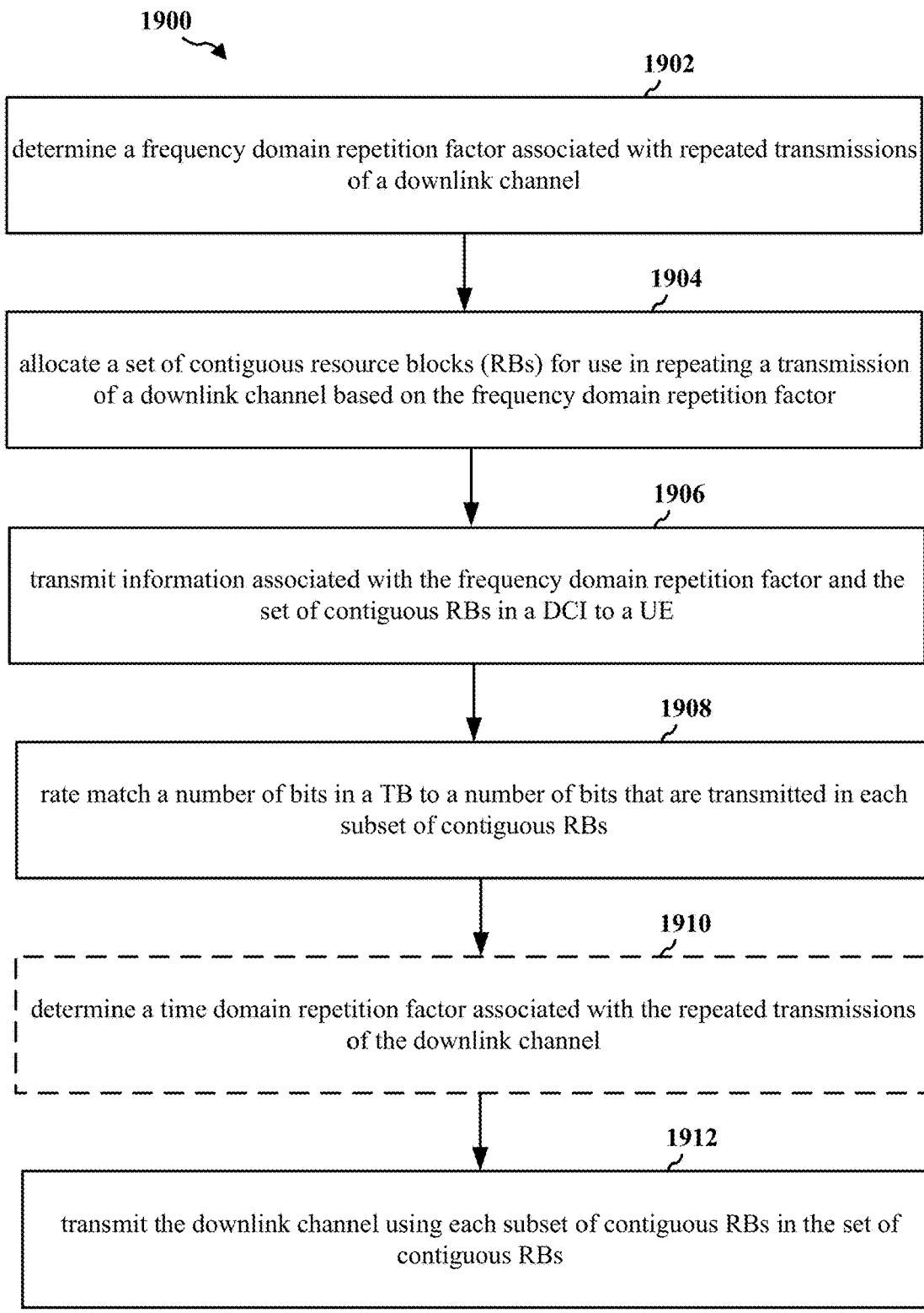
FIG. 19 is a flowchart of a method of wireless communication in accordance with certain aspects of the disclosure.

FIG. 19 is a flowchart 1900 of a method of wireless communication. The method may be performed by a base station (e.g., base station 102, 180, 404, 504, 604, 1150, 1750, 2350, eNB 310, the apparatus 802/802', 1402/1402', 2002/2002'). In FIG. 19, optional operations are indicated with dashed lines.

At 1902, the base station may determine a frequency domain repetition factor associated with repeated transmissions of a downlink channel. In an aspect, the frequency domain repetition factor may be associated with at least one of a coverage mode, a MCS, a resource allocation, or a time domain repetition factor. For example, referring to FIG. 6, base station 604 may determine 603 a frequency domain repetition factor associated with repeated transmissions of a DL channel. For example, the frequency domain repetition factor may be in units of RBs.

At 1904, the base station may allocate a set of contiguous RBs for use in repeating a transmission of a downlink channel based on the frequency domain repetition factor. In an aspect, each repeated transmission may be associated with a subset of RBs in the set of contiguous RBs. For example, referring to FIG. 6, base station 604 may allocate 605 a set of contiguous RBs for use in repeating a transmission of the DL channel based on the frequency domain repetition factor. For example, each repeated transmission of the DL channel may be associated with a subset of RBs in the set of contiguous RBs.

At 1906, the base station may transmit information associated with the frequency domain repetition factor and the set of contiguous RBs in a DCI to a UE. For example, referring to FIG. 6, base station 604 may transmit information associated with the frequency domain repetition factor and the set of contiguous RBs in a DCI 607 to UE 606.

At 1908, the base station may rate match a number of bits in a TB to a number of bits that are transmitted in each subset of contiguous RBs. In one aspect, a size of the TB is a function of the frequency domain repetition factor, a number of RBs in each subset of contiguous RBs, and a MCS. For example, referring to FIG. 6, base station 604 may rate match 609 a number of bits in a TB to the number of bits that are transmitted in each subset of contiguous RBs. In one aspect, a size of the TB may be a function of the frequency domain repetition factor, a number of RBs in each subset of contiguous RBs, and an MCS. For example, the TB size in conventional systems is a function of number of RBs and MCS.

At 1910, the base station may determine a time domain repetition factor associated with the repeated transmissions of the downlink channel. For example, referring to FIG. 6, base station 604 may also determine 611 a time domain repetition factor associated with the repeated transmissions of the DL channel. Here, the transmission of the DL channel 615 may be repeated across a frequency domain and a time domain.

At 1912, the base station may transmit the downlink channel using each subset of contiguous RBs in the set of contiguous RBs. In an aspect, a repetition of the downlink channel may be distributed in frequency in blocks of rate matched RBs. In another aspect, a transmission of the downlink channel may be repeated across a frequency domain and a time domain. For example, referring to FIG. 6, the DL channel 615 may be transmitted using each subset of contiguous RBs in the set of contiguous RBs. In an aspect, a repetition of the DL channel may be distributed in frequency in blocks of rate matched RBs. That is, if the DL channel without repetition requires $N_0$ RBs (e.g., subset of the contiguous RBs), then the base station 604 may perform rate matching of the DL channel over the first $N_0$ RBs of the allocation, and then repeat the same for the next $N_0$ RBs and so on until all the sets of contiguous RBs in the allocation are used. Optionally, base station 604 may also determine 611 a time domain repetition factor associated with the repeated transmissions of the DL channel. Here, the transmission of the DL channel 615 may be repeated across a frequency domain and a time domain.

Figure 20:
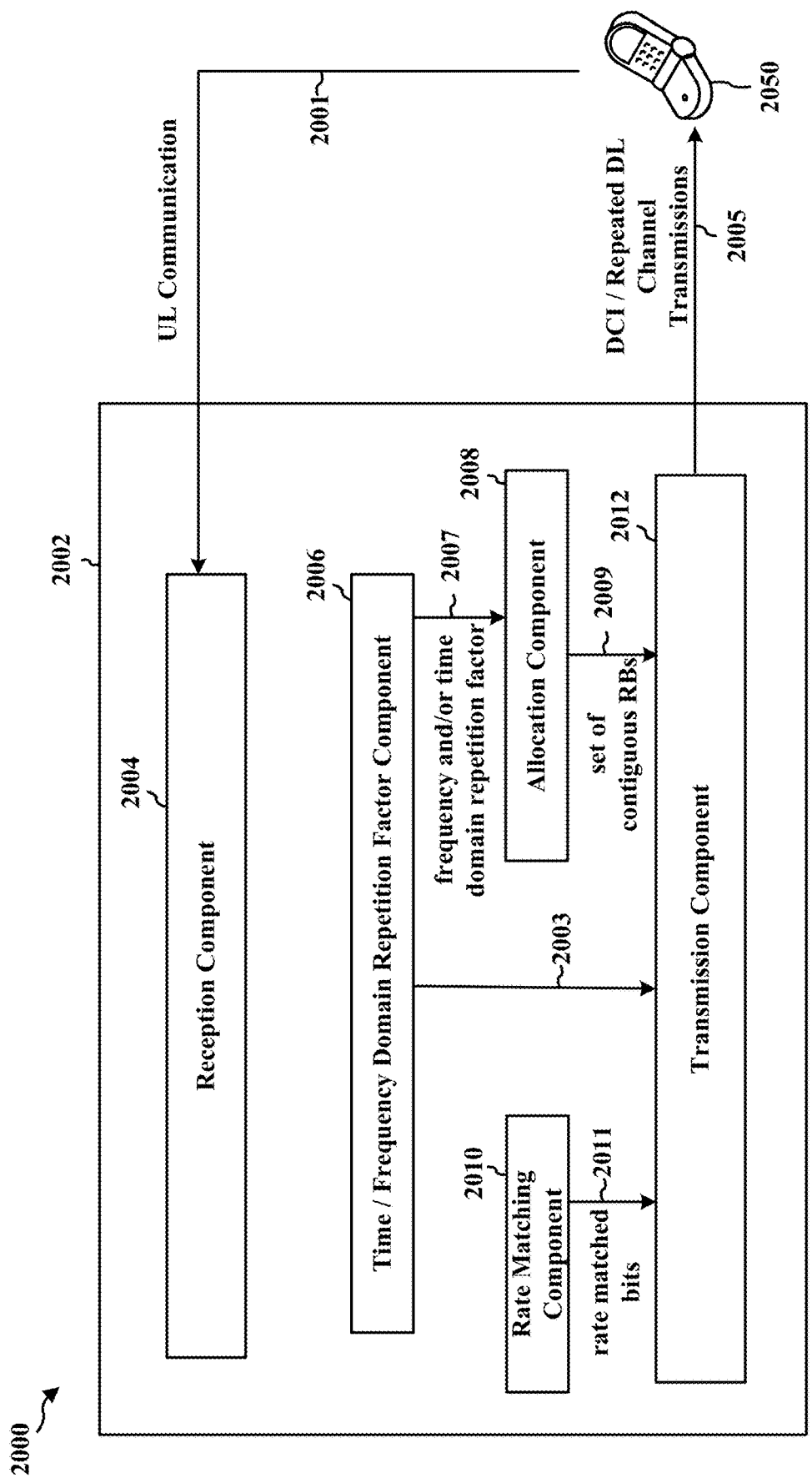
FIG. 20 is a conceptual data flow diagram illustrating the data flow between different means/components in an exemplary apparatus.

FIG. 20 is a conceptual data flow diagram 2000 illustrating the data flow between different means/components in an exemplary apparatus 2002. The apparatus may be abase station (e.g., base station 102, 180, 404, 504, 604, 1150, 1750, 2350, eNB 310, the apparatus 802/802', 1402/1402', 2002') in communication with a UE 2050 (e.g., UE 104, 350, 406, 506, 606, 850, 1450, the apparatus 1102/1102', 1702/1702', 2302/2302'). The apparatus may include a reception component 2004, a time/frequency domain repetition factor component 2006, an allocation component 2008, a rate matching component 2010, and a transmission component 2012.

In certain configurations, the time/frequency domain repetition factor component 2006 may be configured to determine a frequency domain repetition factor associated with repeated transmissions of a downlink channel. In an aspect, the frequency domain repetition factor may be associated with at least one of a coverage mode, a MCS, a resource allocation, or a time domain repetition factor. In certain aspects, the time/frequency domain repetition factor component 2006 may be configured to send a signal 2003, 2007 associated with the frequency domain repetition factor to one or more of the transmission component 2012 and/or the allocation component 2008.

In certain other configurations, the time/frequency domain repetition factor component 2006 may be configured to determine a time domain repetition factor associated with the repeated transmissions of the downlink channel. The time/frequency domain repetition factor component 2006 may be configured to send a signal 2007 associated with the time domain repetition factor to one or more of the transmission component 2012 and/or the allocation component 2008.

In certain configurations, the allocation component 2008 may be configured to allocate a set of contiguous RBs for use in repeating a transmission of a downlink channel based on the frequency domain repetition factor. In an aspect, each repeated transmission may be associated with a subset of RBs in the set of contiguous RBs. The allocation component 2008 may be configured to send a signal 2009 associated with the set of contiguous RBs to the transmission component 2012.

In certain configurations, the rate matching component 2010 may be configured to rate match a number of bits in a TB to a number of bits that are transmitted in each subset of contiguous RBs. In one aspect, a size of the TB is a function of the frequency domain repetition factor, a number of RBs in each subset of contiguous RBs, and a MCS. The rate matching component 2010 may be configured to send a signal 2011 associated with the rate matched bits to the transmission component 2012.

In certain configurations, the transmission component 2012 may be configured to transmit information 2005 associated with the frequency domain repetition factor and the set of contiguous RBs in a DCI to the UE 2050.

In certain configurations, the reception component 2004 may be configured to receive one or more uplink communications 2001 from the UE 2050.

The apparatus may include additional components that perform each of the blocks of the algorithm in the aforementioned flowchart of FIG. 19. As such, each block in the aforementioned flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
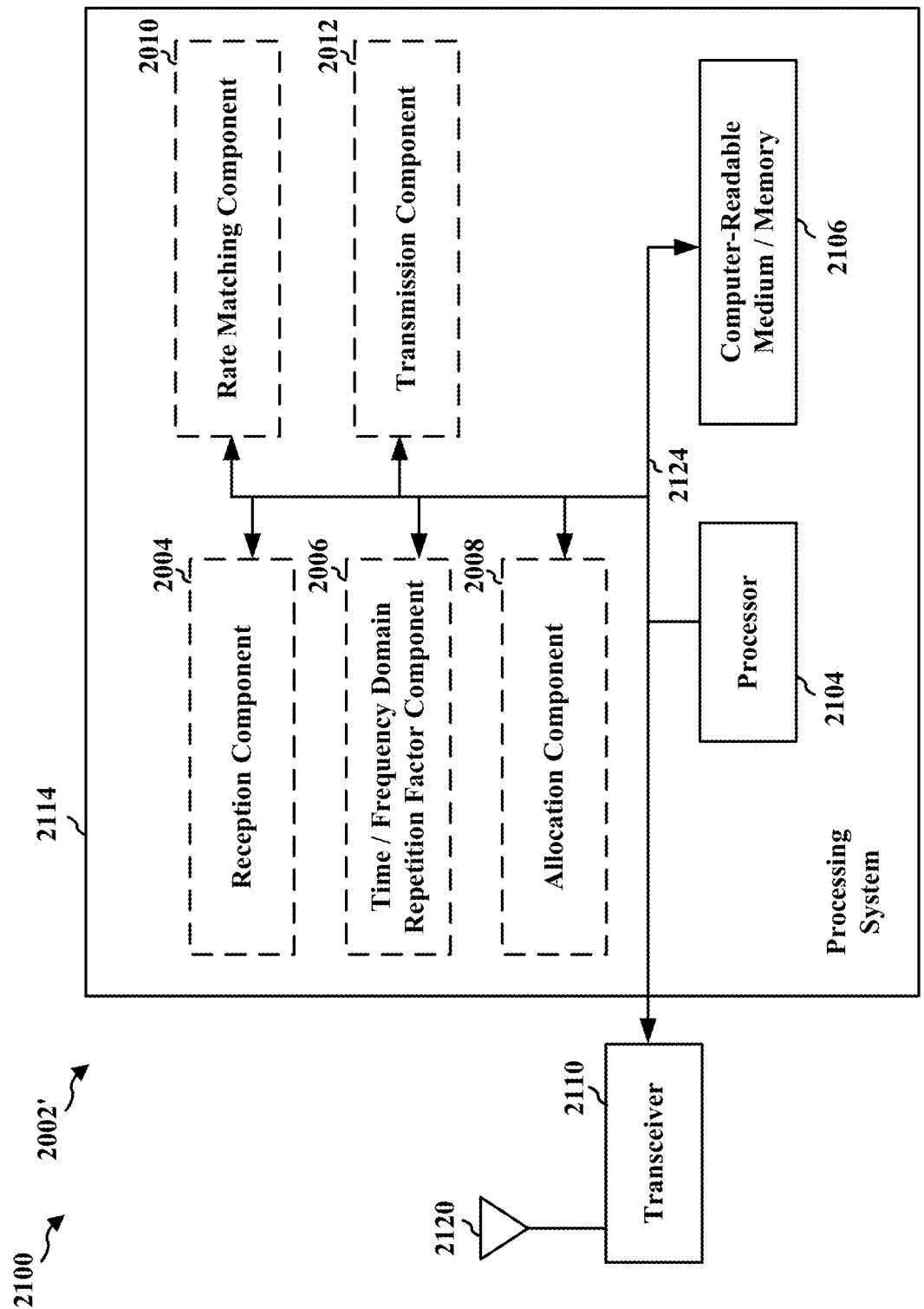
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012 and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2012, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012. The components may be software components running in the processor 2104, resident/stored in the computer readable medium/memory 2106, one or more hardware components coupled to the processor 2104, or some combination thereof. The processing system 2114 may be a component of the base station 310 and may include the memory 376 and/or at least one of the TX processor 316, the RX processor 370, and the controller/processor 375.

In certain configurations, the apparatus 2002/2002' for wireless communication may include means for determining a frequency domain repetition factor associated with repeated transmissions of a downlink channel. In an aspect, the frequency domain repetition factor may be associated with at least one of a coverage mode, a MCS, a resource allocation, or a time domain repetition factor. In certain other configurations, the apparatus 2002/2002' for wireless communication may include means for allocating a set of contiguous RBs for use in repeating a transmission of a downlink channel based on the frequency domain repetition factor. In an aspect, each repeated transmission may be associated with a subset of RBs in the set of contiguous RBs. In certain other configurations, the apparatus 2002/2002' for wireless communication may include means for transmitting information associated with the frequency domain repetition factor and the set of contiguous RBs in a DCI to a UE. In certain other configurations, the apparatus 2002/2002' for wireless communication may include means for rate matching a number of bits in a TB to a number of bits that are transmitted in each subset of contiguous RBs. In one aspect, a size of the TB is a function of the frequency domain repetition factor, a number of RBs in each subset of contiguous RBs, and a MCS. In certain other configurations, the apparatus 2002/2002' for wireless communication may include means for determine a time domain repetition factor associated with the repeated transmissions of the downlink channel. The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 22:
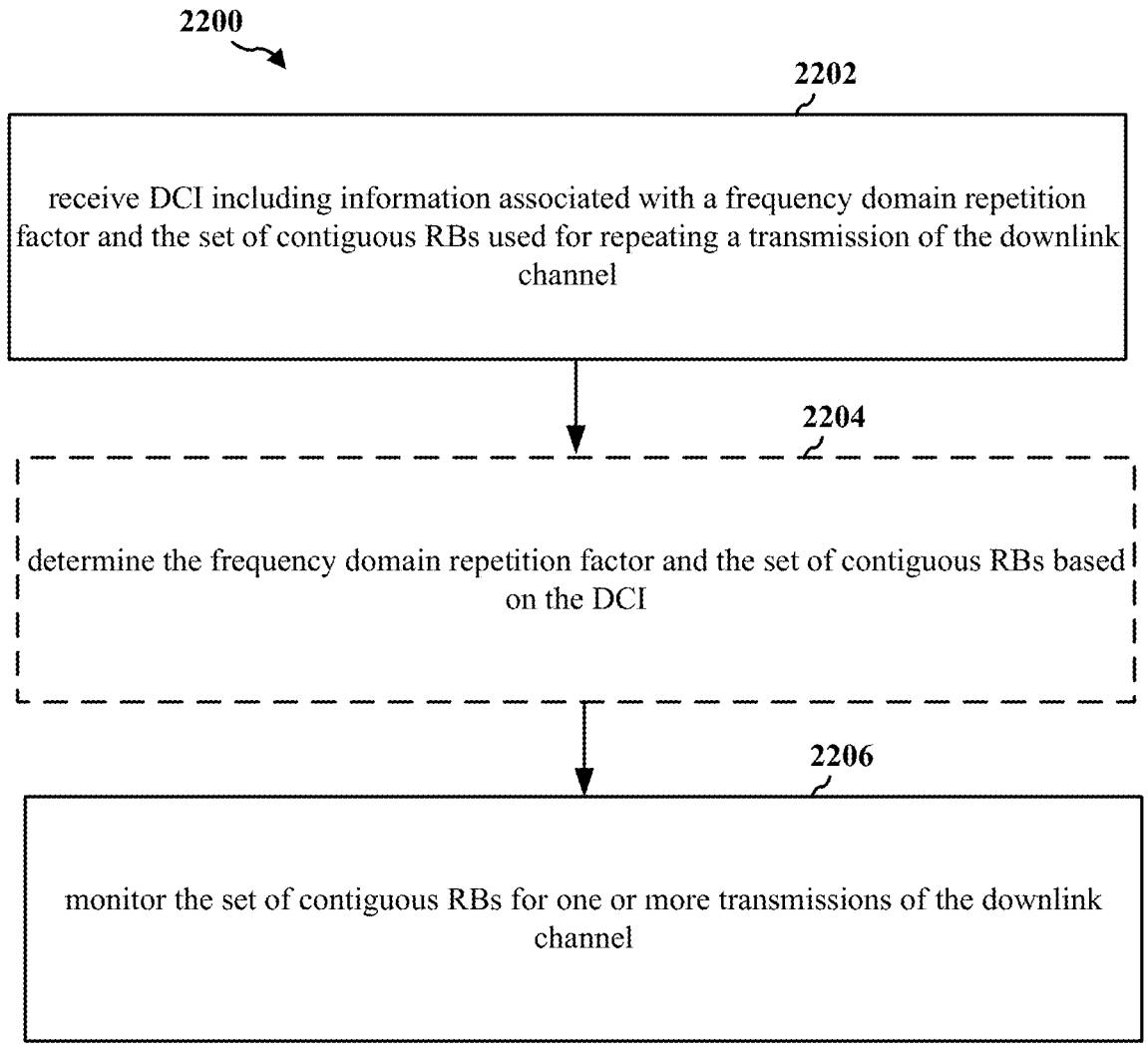
FIG. 22 is a flowchart of a method of wireless communication in accordance with certain aspects of the disclosure.

FIG. 22 is a flowchart 2200 of a method of wireless communication. The method may be performed by a UE (e.g., UE 104, 350, 406, 506, 606, 850, 1450, 2050, the apparatus 1102/1102', 1702/1702', 2302/2302'). In one aspect, the UE may be an NB-IoT device and/or an eMTC device. In FIG. 22, optional operations are indicated with dashed lines.

At 2202, the UE may receive DCI from a base station. In certain aspects, the DCI may include information associated with a frequency domain repetition factor and a set of contiguous RBs used for repeating a transmission of the downlink channel. In an aspect, a repetition of the downlink channel may be distributed in frequency in blocks of rate matched RBs. For example, referring to FIG. 6, UE 606 may receive information associated with the frequency domain repetition factor and the set of contiguous RBs in a DCI 607 from base station 604.

At 2204, the UE may determine the frequency domain repetition factor and the set of contiguous RBs based on the DCI. In one aspect, the frequency domain repetition factor is associated with at least one of a coverage mode, a MCS, a resource allocation, or a time domain repetition factor. In another aspect, a size of a TB associated with the rate matched RBs is a function of the frequency domain repetition factor, a number of RBs in each subset of contiguous RBs, and a MCS. For example, referring to FIG. 6, UE 606 may determine the frequency domain repetition factor and the set of contiguous RBs based on the DCI.

At 2206, the UE may monitor the set of contiguous RBs for one or more transmissions of the downlink channel. In one aspect, the one or more transmissions of the downlink channel may be repeated across a frequency domain and a time domain. For example, referring to FIG. 6, the UE may monitor 613 for repeated transmissions of the DL channel based on the DCI 607 transmitted by base station 604. The UE may combine the repeated transmissions to increase reliability of receiving the DL channel.

Figure 23:
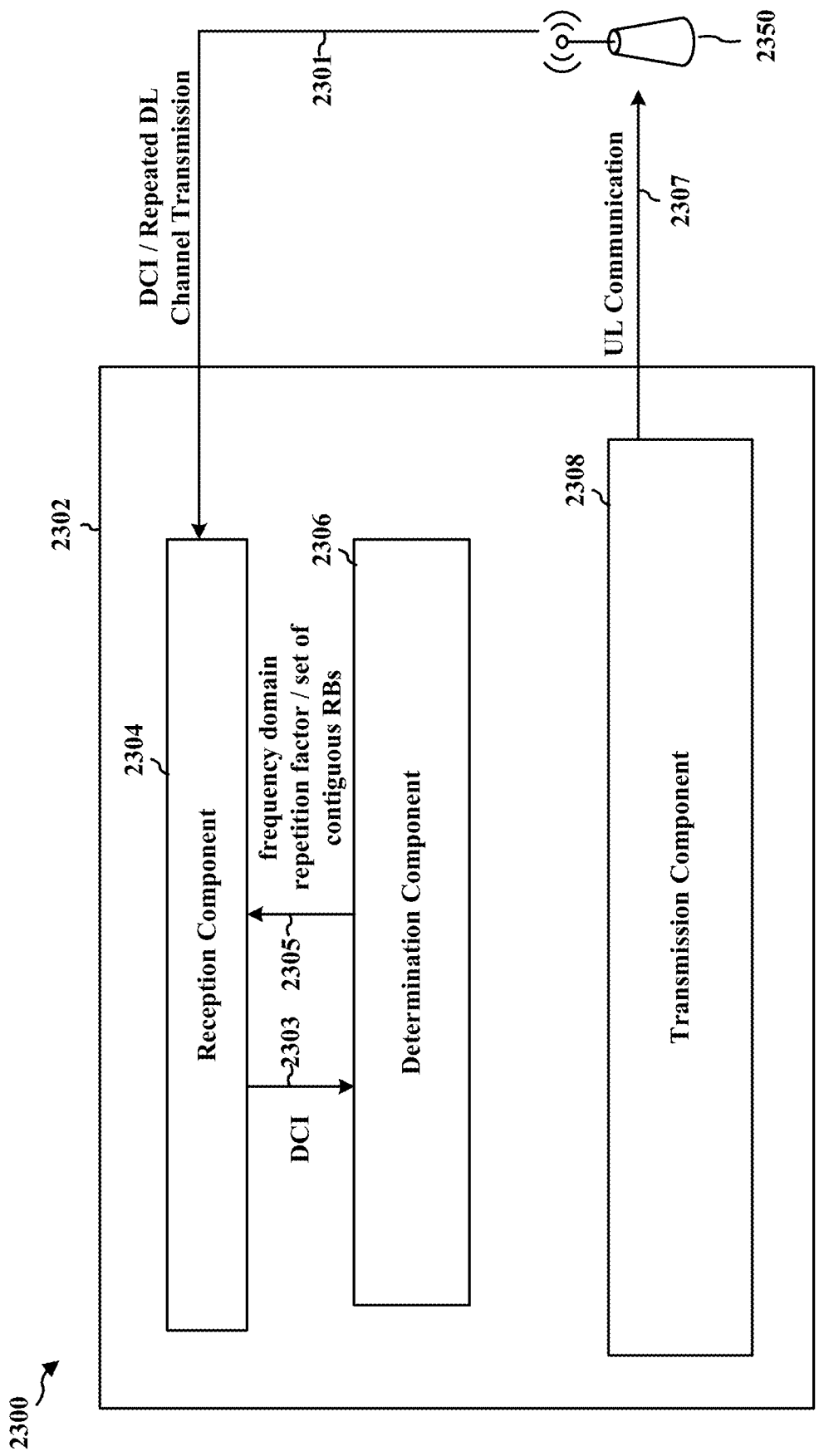
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a UE (e.g., UE 104, 350, 406, 506, 606, 850, 1450, 2050, the apparatus 1102/1102', 1702/1702', 2302') in communication with a base station 2350 (e.g., base station 102, 180, 404, 504, 604, 1150, 1750, eNB 310, the apparatus 802/802', 1402/1402', 2002/2002'). The apparatus may include a reception component 2304, a determination component 2306, and a transmission component 2308.

In certain configurations, the reception component 2304 may be configured to receive DCI 2301 from the base station 2350. In certain aspects, the DCI may include information associated with a frequency domain repetition factor and a set of contiguous RBs used for repeating a transmission of the downlink channel. In an aspect, a repetition of the downlink channel may be distributed in frequency in blocks of rate matched RBs. The reception component 2304 may be configured to send a signal 2303 associated with the DCI to the determination component 2306.

In certain configurations, the determination component 2306 may be configured to determine the frequency domain repetition factor and the set of contiguous RBs based on the DCI. In one aspect, the frequency domain repetition factor is associated with at least one of a coverage mode, a MCS, a resource allocation, or a time domain repetition factor. In another aspect, a size of a TB associated with the rate matched RBs is a function of the frequency domain repetition factor, a number of RBs in each subset of contiguous RBs, and a MCS. The determination component 2306 may be configured to send a signal 2305 associated with the determined frequency domain repetition factor and the set of contiguous RBs to the reception component 2304.

In certain configurations, the reception component 2304 may be configured to monitor the set of contiguous RBs for one or more transmissions of the downlink channel 2301. In one aspect, the one or more transmissions of the downlink channel may be repeated across a frequency domain and a time domain.

In certain configurations, the transmission component 2308 may be configured to transmit one or more uplink communications 2307 to the base station 2350.

The apparatus may include additional components that perform each of the blocks of the algorithm in the aforementioned flowchart of FIG. 22. As such, each block in the aforementioned flowchart of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
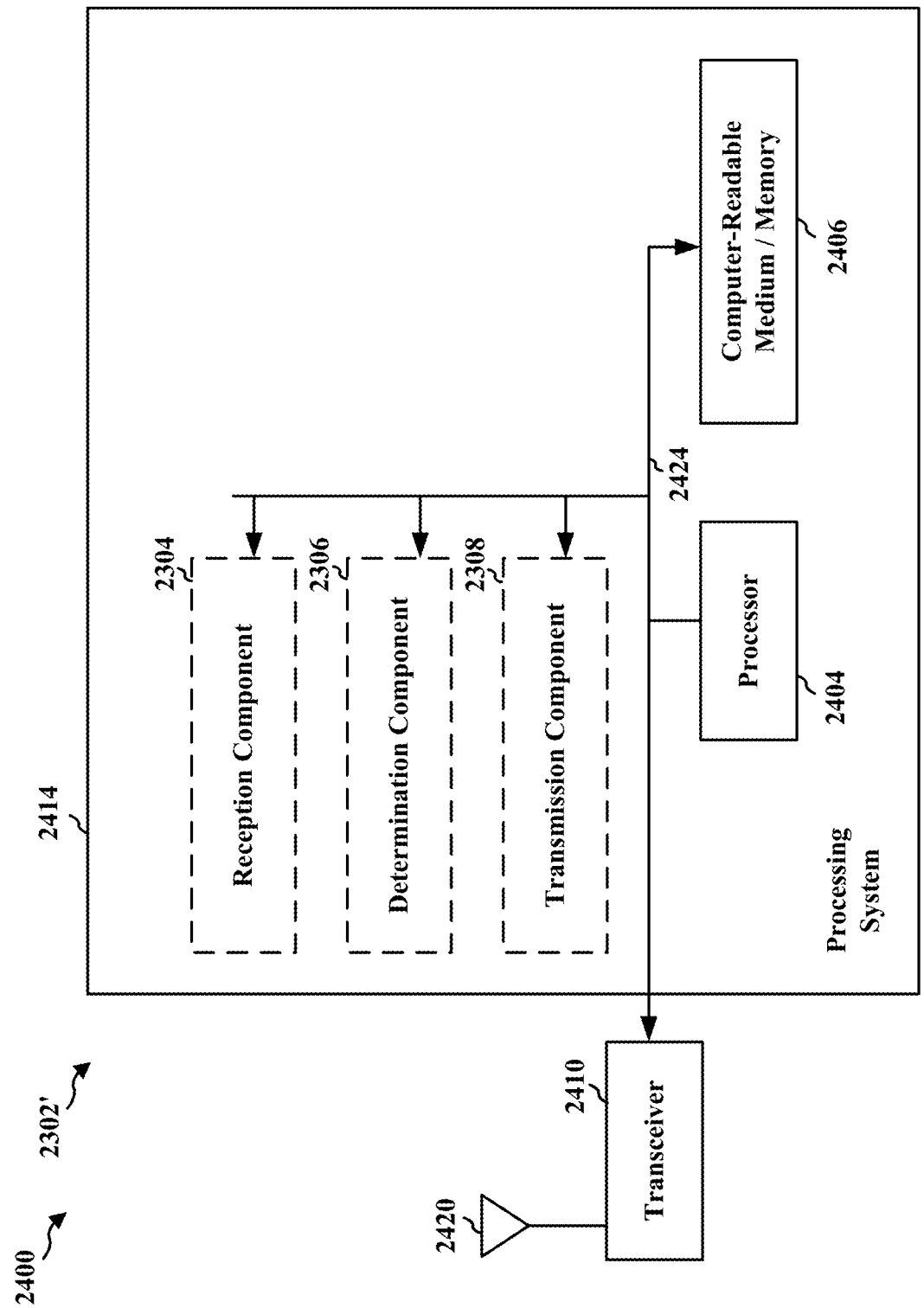
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2308, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308. The components may be software components running in the processor 2404, resident/stored in the computer readable medium/memory 2406, one or more hardware components coupled to the processor 2404, or some combination thereof. The processing system 2414 may be a component of the UE 350 and may include the memory 360 and/or at least one of the TX processor 368, the RX processor 356, and the controller/processor 359.

In certain configurations, the apparatus 2302/2302' for wireless communication may include means for receiving DCI from a base station. In certain aspects, the DCI may include information associated with a frequency domain repetition factor and a set of contiguous RBs used for repeating a transmission of the downlink channel. In an aspect, a repetition of the downlink channel may be distributed in frequency in blocks of rate matched RBs. In certain other configurations, the apparatus 2302/2302' for wireless communication may include means for determine the frequency domain repetition factor and the set of contiguous RBs based on the DCI. In one aspect, the frequency domain repetition factor is associated with at least one of a coverage mode, a MCS, a resource allocation, or a time domain repetition factor. In another aspect, a size of a TB associated with the rate matched RBs is a function of the frequency domain repetition factor, a number of RBs in each subset of contiguous RBs, and a MCS. In certain other configurations, the apparatus 2302/2302' for wireless communication may include means for monitor the set of contiguous RBs for one or more transmissions of the downlink channel. In one aspect, the one or more transmissions of the downlink channel may be repeated across a frequency domain and a time domain. The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
    allocating one or more narrowbands for at least one downlink transmission to a user equipment (UE), the one or more narrowbands being allocated from a group of narrowbands; and
    transmitting information associated with the one or more narrowbands and a resource indicator value (RIV) to the UE, a same RIV indicating a common starting RB and a common set of RBs allocated for the at least one downlink transmission in each of the one or more narrowbands allocated from the group of narrowbands.

2. The method of claim 1, wherein the same RIV is used for each of multiple narrowbands allocated from the group of narrowbands for the at least one downlink transmission.

3. The method of claim 2, wherein the RIV is capable of indicating all possible valid combinations of starting RBs and number of RBs for at least one of the one or more narrowbands.

4. The method of claim 1, wherein the RIV includes a subset of all possible valid combinations of starting RBs and number of RBs for at least one of the one or more narrowbands.

5. The method of claim 1, wherein the one or more narrowbands are contained within a group of four contiguous narrowbands from a set of sixteen 6 RB narrowbands.

6. The method of claim 5, wherein the information associated with the one or more narrowbands indicates which narrowbands within the group of four contiguous narrowbands are allocated to the UE.

7. The method of claim 1, wherein the allocating one or more narrowbands comprises:
allocating one or more groups of two contiguous narrowbands from a set of sixteen 6 RB narrowbands in a 20 megahertz (MHz) bandwidth, the information associated with the one or more narrowbands indicating which groups of two contiguous narrowbands are allocated to the UE.

8. The method of claim 1, wherein the RIV and the information associated with the one or more narrowbands are jointly coded and transmitted to the UE.

9. The method of claim 1, wherein the allocating the one or more narrowbands comprises:
determining four 5 MHz subbands within a 20 MHz bandwidth; and
restricting an allocation of the narrowbands to within one of the four 5 MHz subbands.

10. The method of claim 9, wherein the information transmitted to the UE indicates within which of the four 5 MHz subbands the common starting RB and the common number of RBs are allocated.

11. The method of claim 9, wherein the four 5 MHz subbands are non-overlapping subbands within the 20 MHz bandwidth.

12. A method of wireless communication by a user equipment (UE), comprising:
receiving information associated with one or more narrowbands allocated from a group of narrowbands for at least one downlink transmission and a resource indicator value (RIV) from a base station, a same RIV indicating a common starting RB and a common set of RBs allocated in each of the one or more narrowbands allocated from the group of narrowbands; and
monitoring the common starting RB and the common number of RBs allocated in each of the one or more narrowbands for the at least one downlink transmission.

13. The method of claim 12, wherein the same RIV is used for each of multiple narrowbands allocated from the group of narrowbands for the at least one downlink transmission.

14. The method of claim 13, wherein the RIV is capable of indicating all possible valid combinations of starting RBs and number of RBs for at least one of the one or more narrowbands.

15. The method of claim 12, wherein the RIV includes a subset of all possible valid combinations of starting RBs and number of RBs for at least one of the one or more narrowbands.

16. The method of claim 12, wherein the one or more narrowbands are contained within a group of four contiguous narrowbands from a set of sixteen 6 RB narrowbands.

17. The method of claim 16, wherein the information associated with the one or more narrowbands indicates which narrowbands within the group of four contiguous narrowbands are allocated to the UE.

18. The method of claim 12, wherein:
the one or more narrowbands include one or more groups of two contiguous narrowbands from a set of sixteen 6 RB narrowbands in a 20 megahertz (MHz) bandwidth, and
the information associated with the one or more narrowbands indicates which groups of contiguous narrowbands are allocated to the UE.

19. The method of claim 12, wherein the RIV and the information associated with the one or more narrowbands received by the UE are jointly coded.

20. The method of claim 12, wherein the one or more narrowbands are restricted to one of four 5 MHz subbands within a 20 MHz bandwidth.

21. The method of claim 20, wherein the information associated with the RBs indicates within which of the four 5 MHz subbands the RBs are allocated.

22. The method of claim 20, wherein the four 5 MHz subbands are non-overlapping subbands within the 20 MHz bandwidth.

23. An apparatus for wireless communication by a base station, comprising:
means for allocating one or more narrowbands for at least one downlink transmission to a user equipment (UE), the one or more narrowbands being allocated from a group of narrowbands; and
means for transmitting information associated with the one or more narrowbands and a resource indicator value (RIV) to the UE, a same RIV indicating a common starting RB and a common set of RBs allocated for the at least one downlink transmission in each of the one or more narrowbands allocated from the group of narrowbands.

24. The apparatus of claim 23, wherein the same RIV is used for each of multiple narrowbands allocated from the group of narrowbands for the at least one downlink transmission.

25. The apparatus of claim 24, wherein the RIV is capable of indicating all possible valid combinations of starting RBs and number of RBs for at least one of the one or more narrowbands.

26. The apparatus of claim 23, wherein the RIV includes a subset of all possible valid combinations of starting RBs and number of RBs for at least one of the one or more narrowbands.

27. The apparatus of claim 23, wherein the one or more narrowbands are contained within a group of four contiguous narrowbands from a set of sixteen 6 RB narrowbands.

28. The apparatus of claim 27, wherein the information associated with the one or more narrowbands indicates which narrowbands within the group of four contiguous narrowbands are allocated to the UE.

29. The apparatus of claim 23, wherein the means for allocating one or more narrowbands is configured to:
allocate one or more groups of two contiguous narrowbands from a set of sixteen 6 RB narrowbands in a 20 megahertz (MHz) bandwidth, the information associated with the one or more narrowbands indicating which groups of two contiguous narrowbands are allocated to the UE.

30. The apparatus of claim 23, wherein the RIV and the information associated with the one or more narrowbands are jointly coded and transmitted to the UE.

31. The apparatus of claim 23, wherein the means for allocating the one or more narrowbands is configured to:
determine four 5 MHz subbands within a 20 MHz bandwidth; and
restrict an allocation of one or more narrowbands to within one of the four 5 MHz subbands.

32. The apparatus of claim 31, wherein the information transmitted to the UE indicates within which of the four 5 MHz subbands the common starting RB and the common number of RBs are allocated.

33. The apparatus of claim 31, wherein the four 5 MHz subbands are non-overlapping subbands within the 20 MHz bandwidth.

34. An apparatus for wireless communication by a user equipment (UE), comprising:
means for receiving information associated with one or more narrowbands allocated from a group of narrowbands for at least one downlink transmission and a resource indicator value (MV) from a base station, a same RIV indicating a common starting RB and a common set of RBs allocated in each of the one or more narrowbands allocated from the group of narrowbands; and
means for monitoring the common starting RB and the common number of RBs allocated in each of the one or more narrowbands for the at least one downlink transmission.

35. The apparatus of claim 34, wherein the same RIV is used for each of multiple narrowbands allocated from the group of narrowbands for the at least one downlink transmission.

36. The apparatus of claim 35, wherein the RIV is capable of indicating all possible valid combinations of starting RBs and number of RBs for at least one of the one or more narrowbands.

37. The apparatus of claim 34, wherein the RIV includes a subset of all possible valid combinations of starting RBs and number of RBs for at least one of the one or more narrowbands.

38. The apparatus of claim 34, wherein the one or more narrowbands are contained within a group of four contiguous narrowbands from a set of sixteen 6 RB narrowbands.

39. The apparatus of claim 38, wherein the information associated with the one or more narrowbands indicates which narrowbands within the group of four contiguous narrowbands are allocated to the UE.

40. The apparatus of claim 34, wherein:
the one or more narrowbands include one or more groups of two contiguous narrowbands from a set of sixteen 6 RB narrowbands in a 20 megahertz (MHz) bandwidth, and
the information associated with the one or more narrowbands indicates which groups of contiguous narrowbands are allocated to the UE.

41. The apparatus of claim 34, wherein the RIV and the information associated with the one or more narrowbands received by the UE are jointly coded.

42. The apparatus of claim 34, wherein the one or more narrowbands are restricted to one of four 5 MHz subbands within a 20 MHz bandwidth.

43. The apparatus of claim 42, wherein the information associated with the RBs indicates within which of the four 5 MHz subbands the RBs are allocated.

44. The apparatus of claim 42, wherein the four 5 MHz subbands are non-overlapping subbands within the 20 MHz bandwidth.

45. An apparatus for wireless communication by a base station, comprising:
a memory; and
at least one processor coupled to the memory and configured to:
allocate one or more narrowbands for at least one downlink transmission to a user equipment (UE), the one or more narrowbands being allocated from a group of narrowbands; and
transmit information associated with the one or more narrowbands and a resource indicator value (RIV) to the UE, a same RIV indicating a common starting RB and a common set of RBs allocated for the at least one downlink transmission in each of the one or more narrowbands allocated from the group of narrowbands.

46. The apparatus of claim 45, wherein the same RIV is used for each of multiple narrowbands allocated from the group of narrowbands for the at least one downlink transmission.

47. The apparatus of claim 46, wherein the RIV is capable of indicating all possible valid combinations of starting RBs and number of RBs for at least one of the one or more narrowbands.

48. The apparatus of claim 45, wherein the RIV includes a subset of all possible valid combinations of starting RBs and number of RBs for at least one of the one or more narrowbands.

49. The apparatus of claim 45, wherein the one or more narrowbands are contained within a group of four contiguous narrowbands from a set of sixteen 6 RB narrowbands.

50. The apparatus of claim 49, wherein the information associated with the one or more narrowbands indicates which narrowbands within the group of four contiguous narrowbands are allocated to the UE.

51. The apparatus of claim 45, wherein the at least one processor is configured to allocate one or more narrowbands by:
allocating one or more groups of two contiguous narrowbands from a set of sixteen 6 RB narrowbands in a 20 megahertz (MHz) bandwidth, the information associated with the one or more narrowbands indicating which groups of two contiguous narrowbands are allocated to the UE.

52. The apparatus of claim 45, wherein the RIV and the information associated with the one or more narrowbands are jointly coded and transmitted to the UE.

53. The apparatus of claim 45, wherein the at least one processor is configured to allocate the one or more narrowbands by:
determining four 5 MHz subbands within a 20 MHz bandwidth; and
restricting an allocation of the one or more narrowbands to within one of the four 5 MHz subbands.

54. The apparatus of claim 53, wherein the information transmitted to the UE indicates within which of the four 5 MHz subbands the common starting RB and the common number of RBs are allocated.

55. The apparatus of claim 53, wherein the four 5 MHz subbands are non-overlapping subbands within the 20 MHz bandwidth.

56. An apparatus for wireless communication by a user equipment (UE), comprising:
a memory; and
at least one processor coupled to the memory and configured to:

receive information associated with one or more narrowbands allocated from a group of narrowbands for at least one downlink transmission and a resource indicator value (RIV) from a base station, a same RIV indicating a common starting RB and a common set of RBs allocated in each of the one or more narrowbands allocated from the group of narrowbands; and monitor the common starting RB and the common number of RBs allocated in each of the one or more narrowbands for the at least one downlink transmission.

57. The apparatus of claim 56, wherein the same RIV is used for each of multiple narrowbands allocated from the group of narrowbands for the at least one downlink transmission.

58. The apparatus of claim 57, wherein the RIV is capable of indicating all possible valid combinations of starting RBs and number of RBs for at least one of the one or more narrowbands.

59. The apparatus of claim 56, wherein the RIV includes a subset of all possible valid combinations of starting RBs and number of RBs for at least one of the one or more narrowbands.

60. The apparatus of claim 56, wherein the one or more narrowbands are contained within a group of four contiguous narrowbands from a set of sixteen 6 RB narrowbands.

61. The apparatus of claim 60, wherein the information associated with the one or more narrowbands indicates which narrowbands within the group of four contiguous narrowbands are allocated to the UE.

62. The apparatus of claim 56, wherein:
the one or more narrowbands include one or more groups of two contiguous narrowbands from a set of sixteen 6 RB narrowbands in a 20 megahertz (MHz) bandwidth, and
the information associated with the one or more narrowbands indicates which groups of contiguous narrowbands are allocated to the UE.

63. The apparatus of claim 56, wherein the RIV and the information associated with the one or more narrowbands received by the UE are jointly coded.

64. The apparatus of claim 56, wherein the one or more narrowbands are restricted to one of four 5 MHz subbands within a 20 MHz bandwidth.

65. The apparatus of claim 64, wherein the information associated with the RBs indicates within which of the four 5 MHz subbands the RBs are allocated.

66. The apparatus of claim 64, wherein the four 5 MHz subbands are non-overlapping subbands within the 20 MHz bandwidth.

67. A non-transitory computer-readable medium storing computer executable code at a base station, comprising code to:
allocate one or more narrowbands for at least one downlink transmission to a user equipment (UE), the one or more narrowbands being allocated from a group of narrowbands; and
transmit information associated with the one or more narrowbands and a resource indicator value (RIV) to the UE, a same RIV indicating a common starting RB and a common set of RBs allocated for the at least one downlink transmission in each of the one or more narrowbands allocated from the group of narrowbands.

68. The computer-readable medium of claim 67, wherein the same RIV is used for each of multiple narrowbands allocated from the group of narrowbands for the at least one downlink transmission.

69. The computer-readable medium of claim 68, wherein the RIV is capable of indicating all possible valid combinations of starting RBs and number of RBs for at least one of the one or more narrowbands.

70. The computer-readable medium of claim 67, wherein the RIV includes a subset of all possible valid combinations of starting RBs and number of RBs for at least one of the one or more narrowbands.

71. The computer-readable medium of claim 67, wherein the one or more narrowbands are contained within a group of four contiguous narrowbands from a set of sixteen 6 RB narrowbands.

72. The computer-readable medium of claim 71, wherein the information associated with the one or more narrowbands indicates which narrowbands within the group of four contiguous narrowbands are allocated to the UE.

73. The computer-readable medium of claim 67, wherein the code is configured to allocate one or more narrowbands by:
allocating one or more groups of two contiguous narrowbands from a set of sixteen 6 RB narrowbands in a 20 megahertz (MHz) bandwidth, the information associated with the one or more narrowbands indicating which groups of two contiguous narrowbands are allocated to the UE.

74. The computer-readable medium of claim 67, wherein the RIV and the information associated with the one or more narrowbands are jointly coded and transmitted to the UE.

75. The computer-readable medium of claim 67, wherein the code to allocate the one or more narrowband is configured to:
determine four 5 MHz subbands within a 20 MHz bandwidth; and
restrict an allocation of the one or more narrowbands to within one of the four 5 MHz subbands.

76. The computer-readable medium of claim 75, wherein the information transmitted to the UE indicates within which of the four 5 MHz subbands the common starting RB and the common number of RBs are allocated.

77. The computer-readable medium of claim 75, wherein the four 5 MHz subbands are non-overlapping subbands within the 20 MHz bandwidth.

78. A non-transitory computer-readable medium storing computer executable code at a user equipment (UE), comprising code to:
receive information associated with one or more narrowbands allocated from a group of narrowbands for at least one downlink transmission and a resource indicator value (RIV) from a base station, a same RIV indicating a common starting RB and a common set of RBs allocated in each of the one or more narrowbands allocated from the group of narrowbands; and
monitor the common starting RB and the common number of RBs allocated in each of the one or more narrowbands for the at least one downlink transmission.

79. The computer-readable medium of claim 78, wherein the same RIV is used for each of multiple narrowbands allocated from the group of narrowbands for the at least one downlink transmission.

80. The computer-readable medium of claim 79, wherein the RIV is capable of indicating all possible valid combinations of starting RBs and number of RBs for at least one of the one or more narrowbands.

81. The computer-readable medium of claim 78, wherein the RIV includes a subset of all possible valid combinations of starting RBs and number of RBs for at least one of the one or more narrowbands.

82. The computer-readable medium of claim 78, wherein the one or more narrowbands are contained within a group of four contiguous narrowbands from a set of sixteen 6 RB narrowbands.

83. The computer-readable medium of claim 82, wherein the information associated with the one or more narrowbands indicates which narrowbands within the group of four contiguous narrowbands are allocated to the UE.

84. The computer-readable medium of claim 78, wherein:
the one or more narrowbands include one or more groups of two contiguous narrowbands from a set of sixteen 6 RB narrowbands in a 20 megahertz (MHz) bandwidth, and
the information associated with the one or more narrowbands indicates which groups of contiguous narrowbands are allocated to the UE.

85. The computer-readable medium of claim 78, wherein the RIV and the information associated with the one or more narrowbands received by the UE are jointly coded.

86. The computer-readable medium of claim 78, wherein the one or more narrowbands are restricted to one of four 5 MHz subbands within a 20 MHz bandwidth.

87. The computer-readable medium of claim 86, wherein the information associated with the RBs indicates within which of the four 5 MHz subbands the RBs are allocated.

88. The computer-readable medium of claim 86, wherein the four 5 MHz subbands are non-overlapping subbands within the 20 MHz bandwidth.

* * * * *